United States Patent
Sharp et al.

(10) Patent No.: US 6,380,997 B1
(45) Date of Patent: Apr. 30, 2002

(54) ACHROMATIC POLARIZATION INVERTERS FOR DISPLAYING INVERSE FRAMES IN DC BALANCED LIQUID CRYSTAL DISPLAYS

(75) Inventors: Gary D. Sharp, Boulder; Kristina M. Johnson, Longmont; Michael G. Robinson; Jianmin Chen, both of Boulder, all of CO (US)

(73) Assignee: ColorLink, Inc., Boulder, CO (US)

( * ) Notice: Subject to any disclaimer, the term of this patent is extended or adjusted under 35 U.S.C. 154(b) by 0 days.

(21) Appl. No.: 09/466,053

(22) Filed: Dec. 17, 1999

Related U.S. Application Data

(63) Continuation-in-part of application No. 09/215,208, filed on Dec. 18, 1998, now Pat. No. 6,078,374, which is a continuation-in-part of application No. 08/901,837, filed on Jul. 28, 1997, now Pat. No. 6,046,786, which is a continuation of application No. 08/419,593, filed on Apr. 7, 1995, now Pat. No. 5,658,490.

(60) Provisional application No. 60/113,005, filed on Dec. 18, 1998, provisional application No. 60/121,494, filed on Feb. 24, 1999, and provisional application No. 60/134,535, filed on May 17, 1999.

(51) Int. Cl.[7] ................. G02F 1/1335; C09K 19/52
(52) U.S. Cl. ................. 349/119; 349/117; 349/113; 349/100; 252/299.01
(58) Field of Search ................. 349/117–121, 100, 349/171, 113; 252/299.01

(56) References Cited

U.S. PATENT DOCUMENTS

| | | | |
|---|---|---|---|
| 4,711,530 A | 12/1987 | Nakanowatari et al. | 349/121 |
| 4,770,500 A | 9/1988 | Kalmanash et al. | 349/80 |
| 4,772,104 A | 9/1988 | Buhrer | 359/497 |
| 4,884,876 A | 12/1989 | Lipton et al. | 349/33 |
| 4,967,268 A | 10/1990 | Lipton et al. | 348/56 |
| 5,020,882 A | 6/1991 | Makow | 349/74 |

(List continued on next page.)

FOREIGN PATENT DOCUMENTS

| | | |
|---|---|---|
| JP | 56137307 A | 10/1981 |
| JP | 63182987 A | 7/1988 |
| JP | 03028823 A | 7/1991 |
| JP | 04207774 A | 7/1992 |
| JP | Hei 7-84218 | 3/1995 |
| WO | WO 90/09614 | 8/1990 |

OTHER PUBLICATIONS

Sharp, Gary Dean, "Chiral smectic liquid crystal tunable optical filters and modulators", 1992.

P. Hariharan et al., "Achromatic phase–shifters: 2. A quantized ferroelectric liquid–crystal system", 2319 Optics Communications 117 (1995) May 15, Nos. 1/2, Amsterdam, NL, pp. 13–15.

Douglas J. McKnight "Continuous view of de–balanced images on a ferroelectric liquid–crystal spatial light modulator", Optical Society of America (1994).

(List continued on next page.)

Primary Examiner—William I. Sikes
Assistant Examiner—Tarifur R. Chowdhury
(74) Attorney, Agent, or Firm—Fleshner & Kim, LLP

(57) ABSTRACT

This invention provides achromatic compound retarders, achromatic polarization switches, and achromatic shutters using the liquid crystal compound retarders. It further provides achromatic variable retardance smectic and nematic liquid crystal retarders. The achromatic compound retarders according to the invention are used to create achromatic inverters for display applications. The display comprises one or more retarders having in-plane retardance and in-plane orientation, at least one of the retarders being an actively controlled liquid crystal retarder, and a ferroelectric liquid crystal display, wherein the one or more retarders work in combination with the ferroelectric liquid crystal display to provide four states of brightness.

29 Claims, 46 Drawing Sheets

U.S. PATENT DOCUMENTS

| | | | |
|---|---|---|---|
| 5,033,825 A | | 7/1991 | Ishikawa et al. ............. 349/102 |
| 5,117,032 A | | 5/1992 | Lipton .......................... 558/34 |
| 5,117,302 A | | 5/1992 | Lipton et al. .................. 348/58 |
| 5,122,890 A | | 6/1992 | Makow ........................ 349/96 |
| 5,126,864 A | | 6/1992 | Akiyama et al. ............. 349/75 |
| 5,132,826 A | * | 7/1992 | Johnson et al. ............... 359/93 |
| 5,168,381 A | * | 12/1992 | Walba .......................... 359/53 |
| 5,187,603 A | * | 2/1993 | Bos .............................. 359/73 |
| 5,231,521 A | * | 7/1993 | Johnson et al. ............... 359/93 |
| 5,237,438 A | | 8/1993 | Miyashita et al. ........... 349/119 |
| 5,243,455 A | * | 9/1993 | Johnson et al. ............... 359/93 |
| 5,247,378 A | | 9/1993 | Miller .......................... 349/18 |
| 5,347,378 A | | 9/1994 | Handschy et al. ............. 349/7 |
| 5,495,263 A | | 2/1996 | Dalton et al. .................. 345/3 |
| 5,528,393 A | * | 6/1996 | Sharp et al. ................... 359/53 |
| 5,565,933 A | | 10/1996 | Reinsch ....................... 348/742 |
| 5,568,283 A | * | 10/1996 | Mitsutake et al. ............. 359/53 |
| 5,615,025 A | * | 3/1997 | Kaneko et al. ................ 349/74 |
| 5,619,355 A | | 4/1997 | Sharp et al. ................... 349/78 |
| 5,627,666 A | * | 5/1997 | Sharp et al. ................... 349/74 |
| 5,658,490 A | | 8/1997 | Sharp et al. ................. 349/117 |
| 5,771,028 A | | 6/1998 | Dalton et al. .................. 345/3 |
| 5,784,139 A | | 7/1998 | Chigrinov et al. .......... 349/117 |
| 5,818,548 A | | 10/1998 | Funfschilling et al. ........ 349/33 |
| 5,847,790 A | * | 12/1998 | Anderson et al. ........... 349/100 |
| 5,870,159 A | * | 2/1999 | Sharp .......................... 349/121 |
| 5,892,559 A | | 4/1999 | Sharp .......................... 349/80 |
| 6,130,731 A | * | 10/2000 | Andersson et al. ........... 349/77 |
| 6,141,071 A | * | 10/2000 | Sharp .......................... 349/121 |

OTHER PUBLICATIONS

Alan M. Title et al., "Achromatic retardation plates",, SIPE vol.308 Polarizers and Applications (1981),pp. 120–125.

M.F. Flynn, et al., "Viewing Angle and Color–Uniformity Optimization of the Pi Cell", SID 95 Digest, pp. 801–804.

Alan M. Title, "Improvement of Birefringent Filters. 2:Achromatic Waveplates",, Jan. 1975/vol. 14 No. 1/Applied Optics, pp. 229–237.

McIntyre, C.M. and Harris, S.E., "Achromatic Wave Plates for the Visible Spectrum," J. Opt. Soc. Of America (Dec. 1968) 58(12):1575–1580.

Koester, Charles J., "Achromatic Combinations of Half–Wave Plates," J. Opt. Soc. Of America (Apr. 1959) 49(4):405–409.

Panchratnam, S., "Achromatic Combinations of Birefringent Plates," Indian Academy Science Proceed. (1955) 41:130–136.

Panchratnam, S., "Achromatic Combinations of Birefringent Plates, Part II, An Achromatic Quarter–Wave Plate", Indian Academy Science Proceed. (1955) 41:137–144.

* cited by examiner

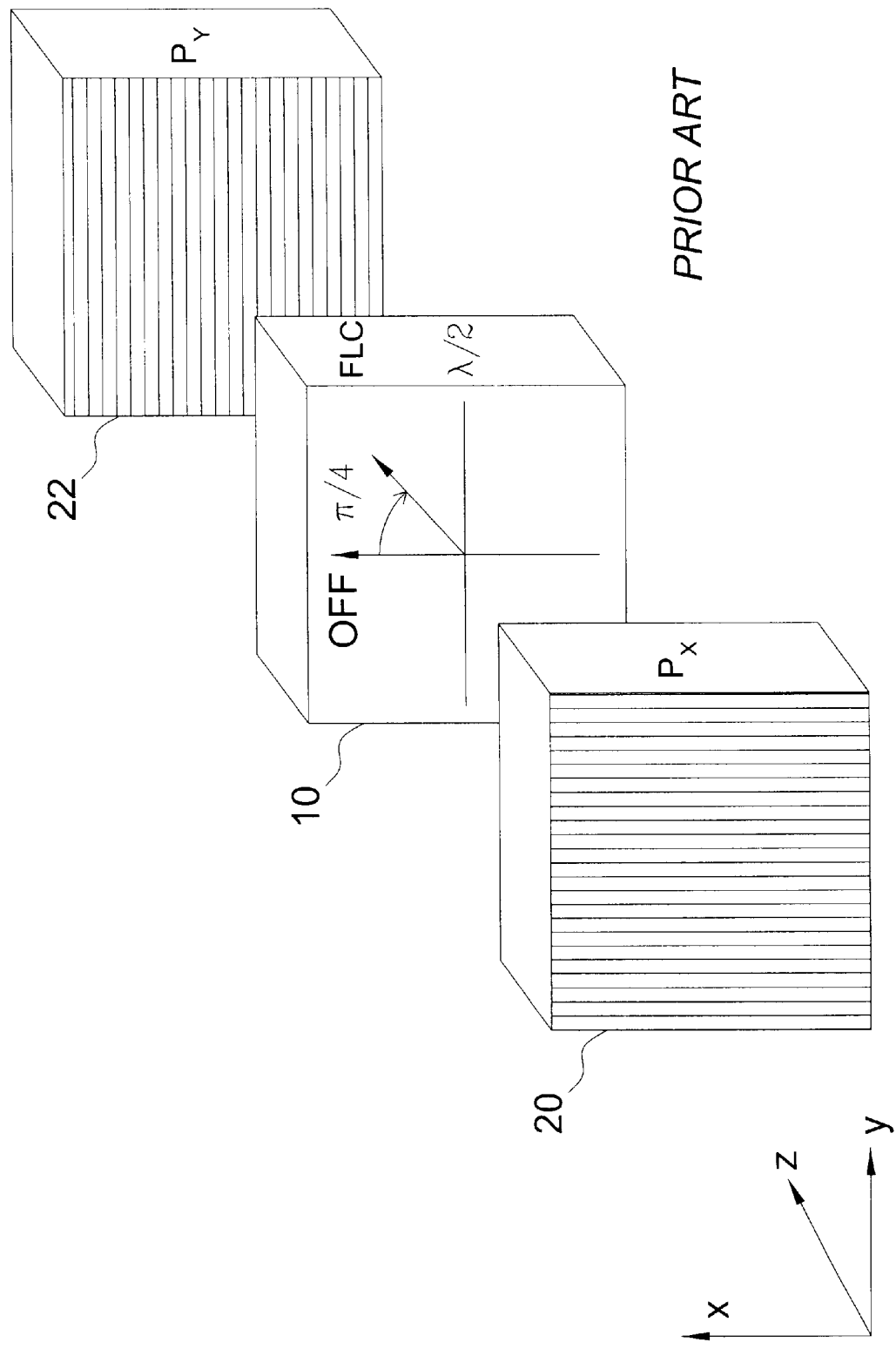

| N | M | LCD Panel Orientation | NLC Retardance | NLC Orientation | Output |
|---|---|---|---|---|---|
| 0 | 1 | 0 | 0 | - | OFF |
| 0 | 1 | 45° | 0 | - | ON |
| 1 | 3 | 45° | 180° | -67.5° | OFF |
| 1 | 3 | 0 | 180° | -67.5° | ON |

FIG. 16

| N | M | LCD Panel Orientation | NLC Retardance | NLC Orientation | Output |
|---|---|---|---|---|---|
| 1 | 3 | 120° | 0 | - | OFF |
| 1 | 3 | 75° | 0 | - | ON |
| 2 | 5 | 75° | 180° | -67.5° | OFF |
| 2 | 5 | 120° | 180° | -67.5° | ON |

FIG. 17

| $\alpha_2$ (Passive) | $\alpha'$ (FLC) | $\Delta'$ | Trans OFF3 | NOTES | $\alpha$ (FLC) | $\Delta$ | Trans ON3 | NOTES | $\alpha_1$ (NLC) | Trans($\alpha$) OFF5 | Trans($\alpha'$) ON5 | NOTES |
|---|---|---|---|---|---|---|---|---|---|---|---|---|
| 0° | 90° | 90° | 0 | Most Stable Axis | 45° | 45° | >67% | Zero-Order Half-Wave | -67.5° | <-27 db | >86% | → |
| 5.0° | 100° | 85° | <-57 db | → | 55° | 50° | >80% | → | -67.5° | <-27 db | >86% | → |
| 7.5° | 105° | 82.5° | <-46 db | → | 60° | 52.5° | >85% | → | -67.5° | <-27.5 db | >85% | ON Balanced With M=3 |
| 10.0° | 110° | 80° | <-40 db | → | 65° | 55° | >88% | → | -67.5° | <-28 db | >84% | ← |
| 15.0° | 120° | 75° | <-29 db | → | 75° | 60° | >91% | Most Stable Retardance | -67.5° | <-30 db | >80% | ← |
| 20.0° | 130° | 70° | <-22 db | Least Stable Axis | 85° | 65° | >89% | ← | -67.5° | <-38 db | >72% | ← |

FIG. 18

| LC Retarder Orientation ($\alpha_1$) | FLC Display Panel Orientation ($\alpha_2$) | FLC Display Output |
|---|---|---|
| +11.25° | +67.5° | Achromatic White |
| -11.25° | -67.5° (+112.5°) | Achromatic White |
| +11.25° | -67.5° (+112.5°) | High Contrast Black |
| -11.25° | +67.5° | High Contrast Black |

FIG. 20

PASSIVE
High reflecting state1

PASSIVE
High reflecting state2

PASSIVE
Low reflecting state1

PASSIVE
Low reflecting state2

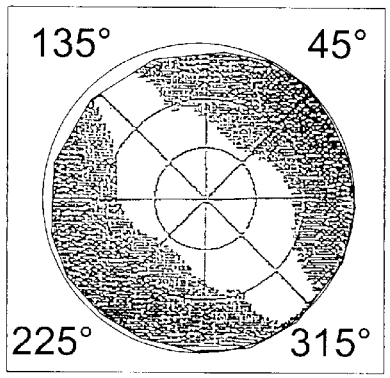
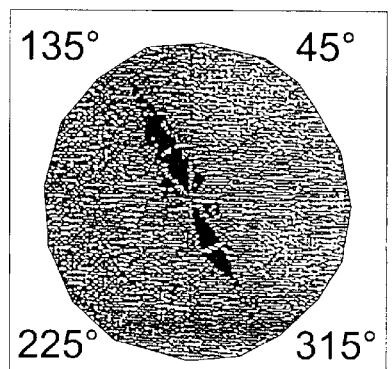
FIG. 38c          FIG. 38d
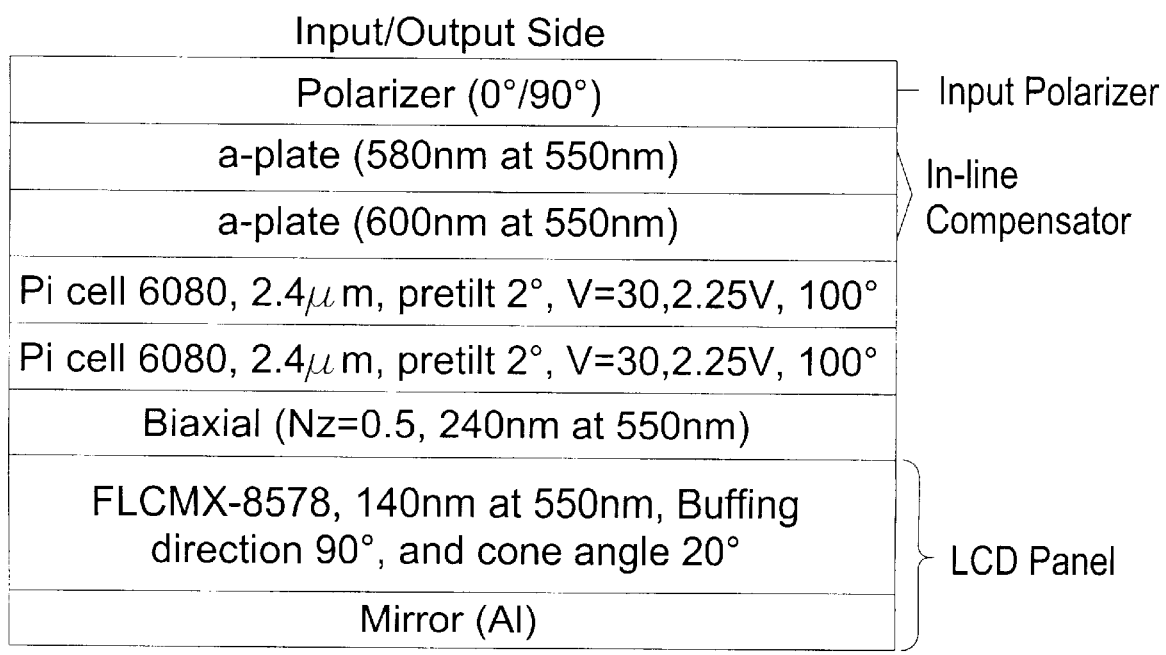
FIG. 39

ACHROMATIC POLARIZATION INVERTERS FOR DISPLAYING INVERSE FRAMES IN DC BALANCED LIQUID CRYSTAL DISPLAYS

CROSS-REFERENCE TO RELATED APPLICATIONS

This application is a continuation-in-part of U.S. patent application Ser. No. 09/215,208, filed Dec. 18, 1998, now U.S. Pat. No. 6,078,374, which is a continuation-in-part of U.S. patent application Ser. No. 08/901,837, filed Jul. 28, 1997, now U.S. Pat. No. 6,046,786, which is a continuation of U.S. patent application Ser. No. 08/419,593, filed Apr. 7, 1995 (U.S. Pat. No. 5,658,490), all of which are herein incorporated by reference in their entirety. This application also claims priority from U.S Provisional Applications Nos. 60/113,005, filed Dec. 18, 1998, Ser. No. 60/121,494, filed Feb. 24, 1999 Ser. No. 60/134,535, filed May 17, 1999.

BACKGROUND OF THE INVENTION

1. Field of the Invention

The present invention relates generally to compound retarders. More specifically, the present invention is directed to the use in display devices of achromatic compound retarders that exhibit an achromatic composite optic axis orientation and/or an achromatic composite compound retardance at each of at least two composite retarder orientation states. Further, the present invention is directed to the use of such achromatic compound retarders to create achromatic inverters for display applications.

2. Background of the Related Art

Liquid crystal retarders are increasingly utilized within optical devices such as tunable filters, amplitude modulators and light shutters. Planar aligned smectic liquid crystal devices function as rotative waveplates wherein application of an electric field rotates the orientation of the optic axis but does not vary the birefringence. In contrast, homeotropically aligned smectic liquid crystals, homogeneous aligned nematic devices, and nematic pi-cells function as variable retarders, wherein application of an electric field varies the birefringence. Chromaticity is a property of birefringent elements, both passive and active liquid crystals. There are two main components to chromaticity: (1) dispersion, which is the change in the birefringence ($\Delta n$) with wavelength $\lambda$; and (2) the explicit dependence of retardance on $1/\lambda$ due to the wavelength dependent optical pathlength. Both components contribute to increased birefringence with decreased wavelength. A birefringent material having a particular retardance at a design wavelength has higher retardance at shorter wavelengths and lower retardance at longer wavelengths. Chromaticity places limitations on the spectral operating range of birefringent optical devices.

Chromaticity compensation for passive retarders was addressed by S. Pancharatnam, Proc. Indian Acad. Sci. A41, 137 [1955], and by A. M. Title, Appl. Opt. 14, 229 [1975], both of which are herein incorporated by reference in their entirety. The wavelength dependence of passive birefringent materials can be reduced by replacing single retarders with compound retarders. The principle behind an achromatic compound retarder is that a stack of waveplates with proper retardance and relative orientation can be selected to produce a structure which behaves as a pure retarder with wavelength insensitive retardance. Pancharatnam showed, using the Poincare sphere and spherical trigonometry, that such a device can be implemented using a minimum of three films of identical retarder material. A Jones calculus analysis by Title (supra) verified the conditions imposed on the structure in order to achieve this result: (1) the requirement that the composite structure behave as a pure retarder (no rotation) forces the input and output retarders to be oriented parallel and to have equal retardance; and (2) first-order stability of the compound retarder optic axis and retardance with respect to wavelength requires that the central retarder be a half-wave plate. These conditions yield design equations that determine the retardance of the external elements and their orientation relative to the central retarder for a particular achromatic retardance. Because these design equations specify a unique orientation of the central retarder and a unique retardance for the external retarders, they have never been applied to active liquid crystal devices and the problem of active retarder chromaticity remains.

For the specific example of an achromatic half-wave retarder, the design equations dictate that the external retarders are also half-wave plates and that the orientation of the external retarders relative to the central retarder is $\pi/3$. By mechanically rotating the entire structure, wavelength insensitive polarization modulation is feasible. Furthermore, Title showed that the compound half-wave retarder can be halved, and one section mechanically rotated with respect to the other half to achieve achromatic variable retardance. Electromechanical rotation of such compound half-wave retarders has been used extensively to tune polarization interference filters for astronomical imaging spectrometers.

The primary application of ferroelectric liquid crystals (FLCs) has been shutters and arrays of shutters. In the current art, on- and off-states of an FLC shutter (FIG. 1) are generated by reorienting the optic axis of FLC retarder 10 between $\pi/4$ and 0 with respect to bounding crossed or parallel polarizers 20 and 22. In the off-state, x-polarized light is not rotated by the liquid crystal cell and is blocked by the exit polarizer. In the on-state, the polarization is rotated 90° and is therefore transmitted by the exit polarizer.

For maximum intensity modulation, the cell gap is selected to yield a half-wave retardance at the appropriate design wavelength. The on-state transmission of x-polarized light is theoretically unity at the design wavelength, neglecting absorption, reflection and scattering losses. At other wavelengths the transmission decreases. The ideal transmission function for an FLC shutter as in FIG. 1 is given by $$T = \begin{cases} 1 - \sin^2\delta/2 & \text{ON} \quad (\alpha = \pi/4) \\ 0 & \text{OFF} \quad (\alpha = 0) \end{cases} \quad (1)$$

where $\delta$ is the deviation from half-wave retardance with wavelength. This expression indicates a second-order dependence of transmission loss on $\delta$. The off-state transmission is in principle zero, but in practice it is typically limited to less than 1000:1 due to depolarization by defects, the existence of multiple domains having different alignments, and fluctuations in the tilt-angle with temperature.

High transmission through FLC shutters over broad wavelength bands is feasible for devices of zero-order retardance, but it is ultimately limited by the inverse-wavelength dependence of retardation and the rather large birefringence dispersion of liquid crystal materials. For instance, a visible FLC shutter device that equalizes on-state loss at 400 nm and 700 nm requires a half-wave retarder centered at 480 nm. A zero-order FLC device with this retardance, using typical FLC birefringence data, has a thickness of roughly 1.3 microns. The transmission loss at the extreme wavelengths, due to the departure from half-wave retardance, is approximately 40%. This significantly limits the brightness of FLC displays and the operating band of FLC shutters and light modulators. In systems incorporating multiple FLC devices, such as tunable optical filters or field-sequential display color shutters, this source of light loss can have a devastating impact on overall throughput and spectral purity.

The above references are incorporated by reference herein where appropriate for appropriate teachings of additional or alternative details, features and/or technical background.

SUMMARY OF THE INVENTION

This invention provides achromatic compound retarders, achromatic polarization switches, and achromatic shutters using the achromatic compound retarders. It further provides achromatic variable retarders utilizing smectic liquid crystals. An achromatic shutter according to this invention is demonstrated which provides excellent on-state transmission over the entire visible, $\geq 94\%$ from 400 nm to 700 nm after normalization for polarizer loss, and high contrast, 1000:1 from 450 nm to 650 nm.

One embodiment of the achromatic compound retarder of this invention comprises a central rotatable smectic liquid crystal half-wave retarder and two external passive retarders positioned in series with and on either side of the liquid crystal retarder. The external retarders are equal in retardance and oriented parallel to each other. Design equations determine the retardance of the external elements and their orientation relative to the central retarder to obtain a particular retardance for the compound structure. A reflective version of the achromatic compound retarder described above is constructed with a smectic liquid crystal quarter-wave retarder positioned between a single passive retarder and a reflector.

In the achromatic compound retarders of this invention there is, in general, an orientation of the central retarder for which the structure has maximum achromaticity in both orientation and retardance. Important aspects of this invention are the discoveries that (1) the composite retardance at the design wavelength does not change when the optic axis orientation of the central retarder is changed and (2) there are optic axis orientations of the central retarder for which the optic axis orientation of the compound retarder is stable (achromatic) even though the composite retardance is not achromatic.

The central retarder may comprise a liquid crystal retarder, as described above. In the case of a smectic liquid crystal cell, application of an electric field rotates the optic axis between two or more orientations. One of the orientations provides maximum achromaticity of the compound retardance. As discussed above, there is also at least one other optic axis orientation for which the optic axis of the compound retarder is achromatic, even though the composite retardance is not. Furthermore, the composite retardance at the design wavelength does not change when the optic axis orientation of the smectic liquid crystal cell is changed.

The central retarder may also comprise a spatially switched planar-aligned passive retarder, in which the orientation of the optic axis varies as a function of position on the spatially switched passive retarder. The spatially switched passive retarder has at least two optic axis orientations states, with one of the orientations causing the retardance of the compound retarder to be substantially achromatic, and the second orientation causing the optic axis orientation of the compound retarder to be substantially achromatic, even though the composite retardance may not be.

The achromatic properties discussed above are utilized in the achromatic polarization switch of this invention, comprising a linear polarizer and the compound achromatic retarder, and in the achromatic shutter of this invention, comprising the compound achromatic retarder positioned between a pair of polarizers. In one optic axis orientation state of the central retarder (the "ON-state") the compound retarder is achromatic and in a second optic axis orientation state of the central retarder (the "OFF-state") the compound retarder is oriented parallel to one polarizer and the light therefore does not "see" the compound retarder. In the off-state, fixed retardance with wavelength is therefore not necessary. Providing achromatic orientation of the compound retarder in the off-state yields high contrast shutters. Reflection-mode shutters are further provided in this invention.

In alternative liquid crystal compound retarder embodiments, the rotatable smectic liquid crystal half-wave retarder is replaced by first and second liquid crystal variable birefringence retarders. The first and second variable birefringence retarders have first and second fixed optic axis orientations, respectively, and retardances which can be switched between zero and half-wave. In operation, when one retarder is switched to zero retardance, the other is switched to half-wave, and vice-versa, so that the composite retardance of the pair is a half-wave retardance with orientation switchable between the first and second optic axis orientations.

The achromatic variable retardance smectic liquid crystal compound retarder of this invention comprises an active section rotatable with respect to a passive section. The active section comprises two liquid crystal retarders: a half-wave plate and a quarter-wave plate oriented at angles $\alpha_2$ and $\alpha_2+\pi/3$, respectively, where the angle $\alpha_2$ is electronically switchable. The passive section comprises two retarders: a quarter-wave plate and a half-wave plate oriented at angles $\alpha_1$ and $\alpha_1+\pi/3$, respectively, where the angle $\alpha_1$ is fixed. The quarter-wave plates are positioned between the half-wave plates. The composite retardance of the compound structure is $2(\pi/2-\alpha_2+\alpha_1)$. To vary the retardance, the liquid crystal retarders in the active section are both rotated.

The planar-aligned smectic liquid crystal cells of this invention have continuously or discretely electronically rotatable optic axes. The smectic liquid crystal cells can utilize SmC* and SmA* liquid crystals, as well as distorted helix ferroelectric (DHF), antiferroelectric, and achiral ferroelectric liquid crystals. The variable birefringence liquid crystal cells of this invention can include homogeneously aligned nematic liquid crystals, pi-cells, and homeotropically aligned smectic liquid crystal cells.

The present invention may be achieved in whole or in part by an achromatic compound retarder that exhibits a compound retardance and a compound optic axis, comprising: (1) a first passive retarder unit having a predetermined retardance at a design wavelength, and having a predetermined optic axis orientation; (2) a second passive retarder unit having the same retardance as the first passive retarder unit at the design wavelength, and having substantially the same optic axis orientation as the first passive retarder unit; and (3) a central retarder unit positioned between the first and second retarder units, the central retarder unit having a retardance $\pi$ at the design wavelength, and having an optic axis orientation that varies as a function of position on the central retarder unit, wherein the optic axis orientation varies between at least a first orientation state, in which the compound retardance is substantially achromatic, and a second orientation state.

The present invention may also be achieved in whole or in part by a reflection mode achromatic compound retarder, comprising: (1) a first passive retarder unit having a predetermined retardance at a design wavelength, and having a predetermined optic axis orientation; (2) a reflector; and (3) a spatially switched retarder unit positioned between the first retarder unit and the reflector, the spatially switched retarder unit having a retardance $\pi/2$ at the design wavelength, and having an optic axis orientation that varies as a function of position on the central retarder unit, wherein the optic axis orientation varies between at least a first orientation state, in which the compound retardance is substantially achromatic, and a second orientation state.

The present invention may also be achieved in whole or in part by an achromatic compound retarder that exhibits a composite optic axis orientation and a composite retardance, comprising: (1) a first passive retarder unit having a predetermined retardance at a design wavelength, and having a predetermined optic axis orientation; (2) a second passive retarder unit having the same retardance as the first passive retarder unit at the design wavelength, and having substantially the same optic axis orientation as the first passive retarder unit; and (3) a central retarder unit positioned between the first and second retarder units, the central retarder unit having a retardance $\pi$ at the design wavelength, and having an optic axis orientation that switches between at least two orientation states as a function of position on the central retarder unit, wherein the composite optic axis orientation and/or the composite retardance is substantially achromatic at two orientation states of the central retarder unit.

The compound retarder according to the invention can also be employed to provide a novel achromatic inverter in a reflective or transmissive type display. The achromatic inverter works in combination with a liquid crystal display panel to provide four states of intensity or brightness, two high and two low, so that the reflective or transmissive display is capable of displaying an inverse image frame.

In particular, in accordance with one embodiment of the invention, a reflective display comprises one or more retarders having in-plane retardance and in-plane orientation, at least one of the retarders being an active retarder, and a ferroelectric liquid crystal display. The one or more retarders work in combination with the ferroelectric liquid crystal display to provide four states of brightness.

In accordance with another embodiment of the invention, a reflective display comprises a linear polarizer, an actively controlled liquid crystal retarder and a ferroelectric liquid crystal display. In accordance with a further embodiment, a reflective display comprises a polarizing beam splitter, an actively controlled liquid crystal retarder and a ferroelectric liquid crystal display. In both embodiments, the actively controlled liquid crystal retarder and the ferroelectric liquid crystal display are both switchable between at least two orientations to provide four states of brightness. In accordance with still another embodiment, a transmissive display comprises a first linear polarizer, a first actively controlled liquid crystal retarder and a ferroelectric liquid crystal display, a second actively controlled liquid crystal retarded and a second linear polarizer.

The active retarder can be either a smectic or a nematic liquid crystal retarder. In the accordance with another embodiment of the invention, a reflective display comprises a linear polarizer, an actively controlled nematic liquid crystal retarder and a ferroelectric liquid crystal display. In accordance with a further embodiment, a reflective display comprises a polarizing beam splitter, an actively controlled nematic liquid crystal retarder and a ferroelectric liquid crystal display. In both embodiments, the actively controlled nematic liquid crystal retarder and the ferroelectric liquid crystal display are both switchable between at least two orientations to provide in combination four states of brightness. Additionally, a passive retarder can be provided between the actively controlled nematic liquid crystal retarder and a ferroelectric liquid crystal display. Further, the actively controlled nematic liquid crystal retarder can comprise one or more pi-cells. Where one or more pi-cells are employed as the actively controlled nematic liquid crystal retarder, a passive retarder can be located between the one or more pi-cells and the ferroelectric liquid crystal display or between adjacent pi-cells. Further, in addition to the one or more pi-cells, the display may include additional actively controlled liquid crystal retarders, arranged adjacent to the one or more pi-cells or in between the one or more pi-cells.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 is a light shutter comprising a ferroelectric liquid crystal between crossed polarizers;

FIG. 16 is a table that illustrates that the optimal modulation of a conventional LCD panel is between an OFF-state orientation of 0 ($\pi/2$) and an ON-state orientations of $\pm\pi/4$;

FIG. 17 is a table illustrating that when a passive retarder is oriented at 7.5°, the LCD panel rotates between 60° (ON), and 105° (OFF);

FIG. 18 is a table illustrating the performance of achromatic inverters based on 3–7 layer compound retarders;

FIG. 20 is a table that shows the output of one pixel of the FLC display of FIG. 19(b) for different orientations of the LC retarder and the FLC retarder;

FIGS. 38(a)–38(d) illustrate a total of four states of intensity of the embodiment of FIG. 36;

FIG. 39 shows the basic structure of another reflective display according to the invention;

DETAILED DESCRIPTION OF PREFERRED EMBODIMENTS

The elements in the devices of this invention are optically coupled in series. The orientation of a polarizer refers to the orientation of the transmitting axis, and the orientation of a birefringent element refers to the orientation of the principal optic axis of that element. Orientations are herein defined with respect to an arbitrary axis in a plane perpendicular to the light propagation axis z. This arbitrary axis is labeled the "x" axis in the figures. In the illustrations of birefringent elements, the orientation is shown by arrow-headed lines and the retardance is labeled on the side of the element. When the retardance is switchable between two values, the values are both labeled on the side and are separated by a comma. The retardance refers to the retardance at a design wavelength. Note that a π retardance is equal to a half-wave ($\lambda/2$) retardance.

The term fixed retarder refers to a birefringent element wherein the orientation and retardance can not be electronically modulated. The term active retarder refers to a birefringent element wherein the orientation and/or the retardance can be electronically modulated. Rotatable liquid crystal retarders of this invention have electronically rotatable orientation and fixed retardance at the design wavelength. Liquid crystal variable retarders or, equivalently, liquid crystal variable birefringence retarders have electronically variable retardance (birefringence) and fixed orientation. The term compound retarder is used for a group of two or more retarders which function as a single retarder. The composite retardance of a compound retarder is characterized by an orientation and a retardance.

A spatially switched retarder refers to an active or passive retarder in which the orientation and/or the retardance varies as a function of position on the retarder.

The terms design wavelength and design frequency ($\upsilon_0$) refer to the wavelength and frequency at which the individual retarders within the compound retarder provide the specified retardance. The term achromatic retarder refers to a retarder with minimal first-order dependence of both the retardance and the orientation on the deviation of the incident light from the design frequency ($\Delta\upsilon/\upsilon_0$). The term achromatic orientation refers to an orientation of the optic axis with minimal first-order dependence on the deviation of the incident light from the design frequency.

Figure 2A:
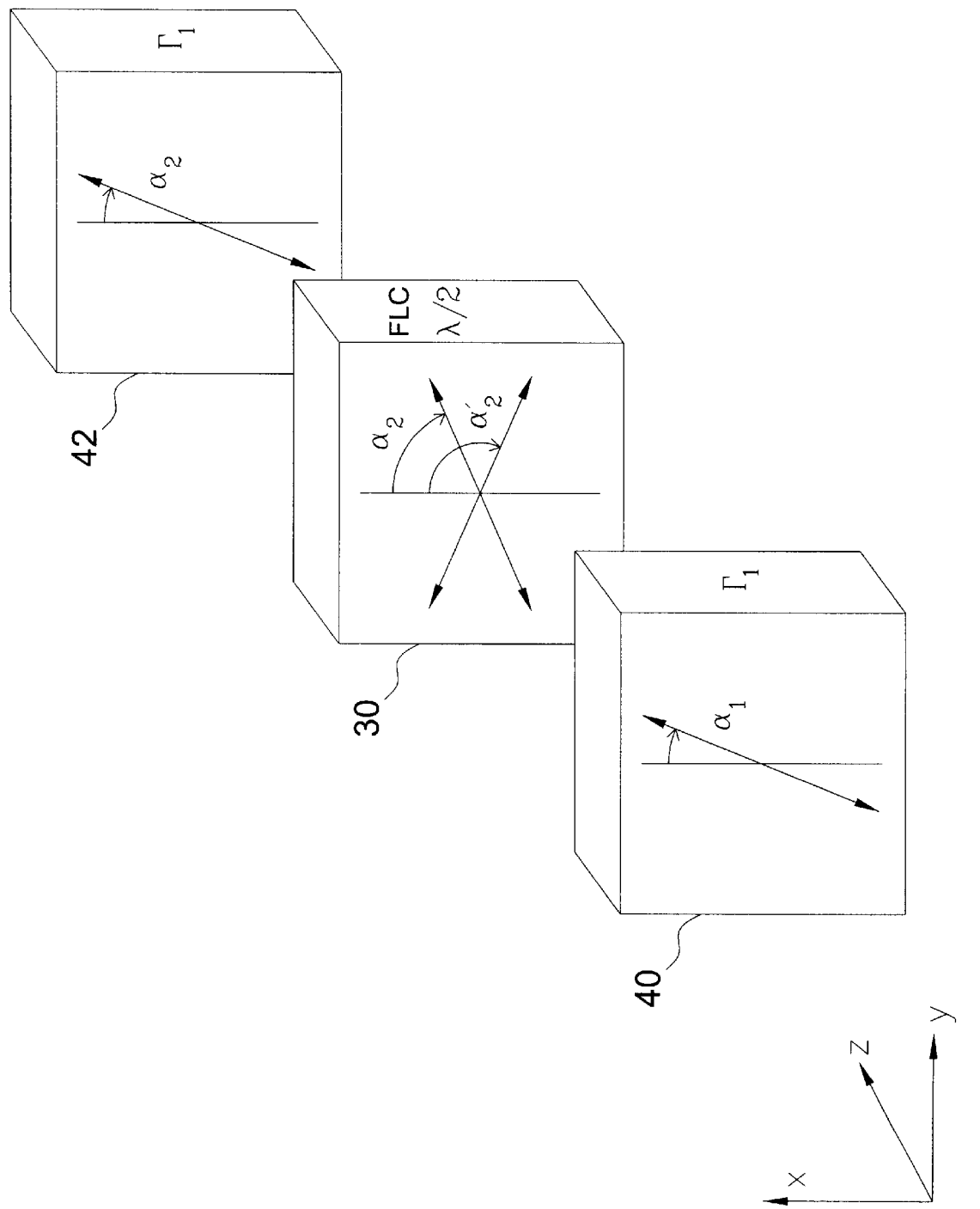
FIG. 2(a) illustrates a first embodiment of an achromatic compound retarder, in accordance with the present invention.

A first embodiment of the achromatic compound retarder of this invention FIG. 2a) comprises planar-aligned smectic liquid crystal retarder 30 having an orientation which is electronically rotatable between angles $\alpha_2$ and $\alpha_2'$. These orientations are herein termed the on-state and the off-state, respectively. Retarder 30 provides a half-wave retardance ($\Gamma_2^0=\pi$) at the design wavelength. Outer retarders 40 and 42, with orientation $\alpha_1$ and retardance $\Gamma_1^0$ at the design wavelength, are positioned on either side of central retarder 30. In an alternative embodiment, the outer retarders 40 and 42 are crossed instead of parallel. In this application the design equations are derived for the case of parallel retarders. Analogous equations can be derived for crossed retarders.

In this embodiment, the central retarder is an FLC, but it can be any material with an electronically rotatable optic axis, including planar aligned SmC* and SmA* liquid crystals, as well as distorted helix ferroelectric (DHF), antiferroelectric, and achiral ferroelectric liquid crystals. The retarder switches between at least two orientations, $\alpha_2$ and $\alpha_2'$. It can, depending on the liquid crystal employed and the electric field applied, rotate continuously between a range of orientations including $\alpha_2$ and $\alpha_2'$, switch between bistable states $\alpha_2$ and $\alpha_2'$, or be switched between two or more discreet but not necessarily stable orientations.

Figure 2B:
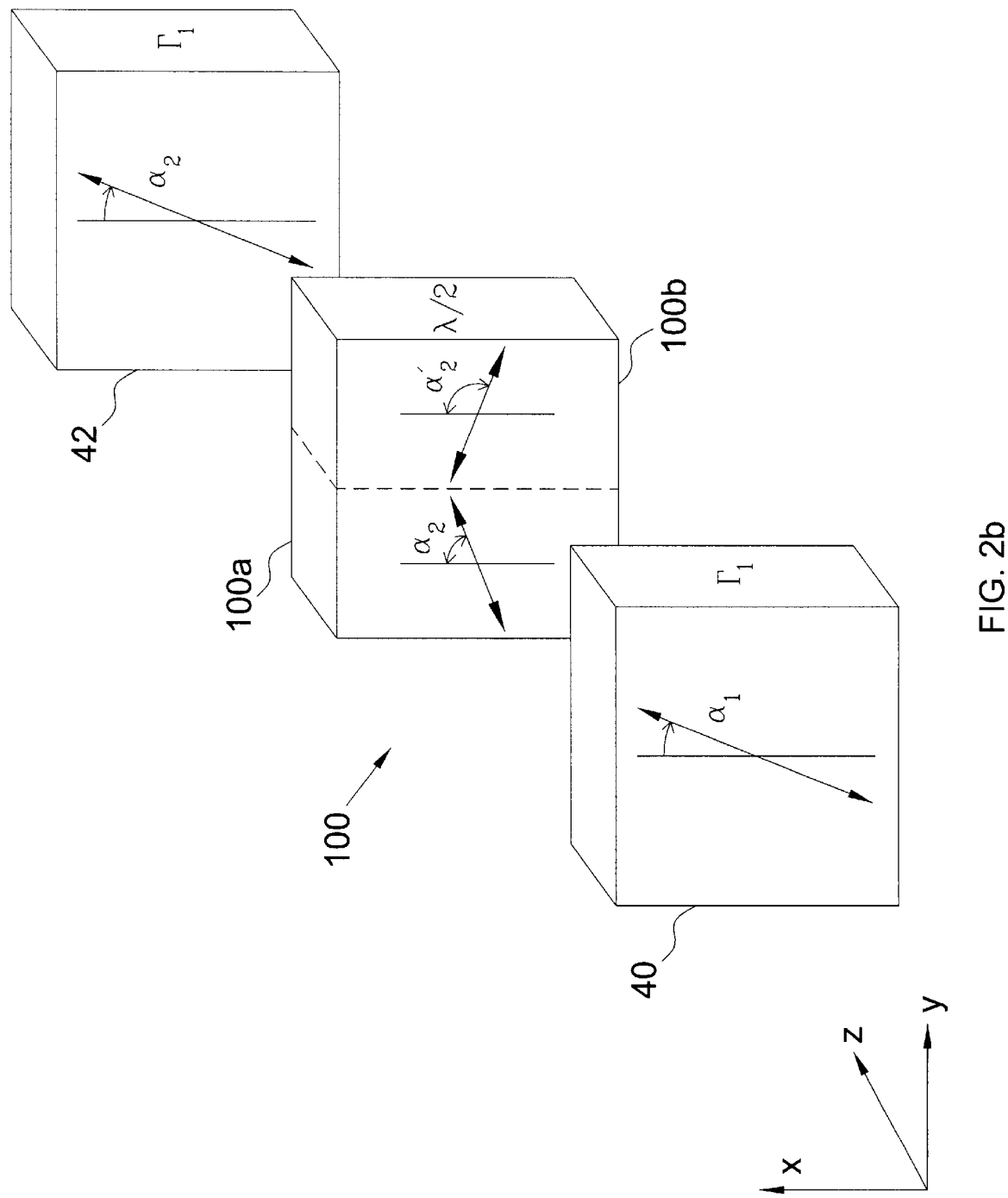
FIG. 2(b) illustrates a second embodiment of an achromatic compound retarder, in accordance with the present invention.

In a second embodiment of the achromatic compound retarder (FIG. 2(b)), rotatable retarder 30 is replaced by a spatially switched retarder 100. The spatially switched retarder 100 is prefereably a planar-aligned passive retarder with an optic axis orientation that varies as a function of position on the spatially switched retarder 100. In the embodiment shown in FIG. 2(b), the spatially switched retarder 100 has a fixed optic axis orientation $\alpha_2$ in one portion 100a of the retarder 100, and an optic axis orientation $\alpha_2'$ in a second portion 100b of the spatially switched retarder 100. The retardance of the spatially switched retarder 100 at the design wavelength is preferably fixed and the same in both the first and second retarder portions 100a and 100b.

Similar to the embodiment shown in FIG. 2(a), the orientations $\alpha_2$ and $\alpha_2'$ are termed the on-state and the off-state, respectively. The spatially switched retarder 100 preferably provides a half-wave retardance ($\Gamma_2^0=\pi$) at the design wavelength in both the first portion 100a and the second portion 100b. The spatially switched retarder 100 is divided into at least two portions 100a and 100b, with respective optic axis orientations $\alpha_2$ and $\alpha_2'$. However, the spatially switched retarder 100 can be divided into additional portions that exhibit other optic axis orientations.

The spatially switched retarder 100 can be any birefringent material. Suitable materials include crystalline materials, such as mica or quartz, stretched polymeric films, such as mylar or polycarbonates, and polymer liquid crystal films.

Figure 2C:
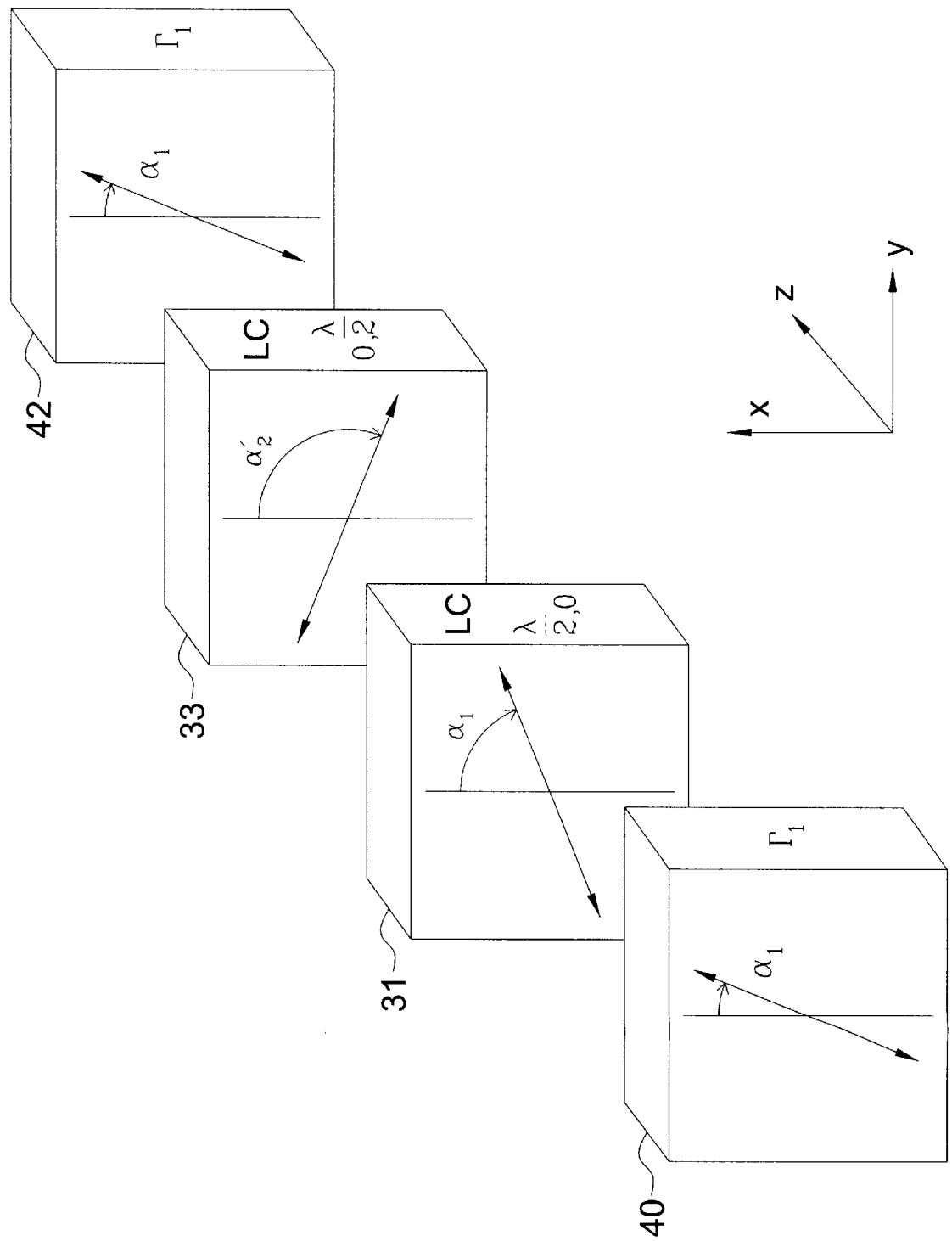
FIG. 2(c) illustrates a third embodiment of an achromatic compound retarder, in accordance with the present invention.

In a third embodiment of the achromatic compound retarder (FIG. 2(c)), rotatable retarder 30 is replaced by variable retarders 31 and 33 having fixed orientations of $\alpha_2$ and $\alpha_2'$, respectively. The retardance of 31 and 33 can be switched between zero and half-wave. The retardances are synchronously switched which, as used herein, means that when one has zero retardance the other has half-wave retardance and vice-versa. Thus the composite retardance of 31 and 33 is always a half-wave and the composite orientation is Liquid crystal variable retarders 31 and 33 can include, but are not limited to, homogeneously aligned nematic cells, nematic π-cells, and homeotropically aligned smectic liquid crystal retarders. As is known in the art, homogeneously aligned nematic cells and nematic π-cells are sometimes incapable of being electrically driven to zero retardance. In this case, the liquid crystal cell can be combined ("shimmed") with a passive retarder to compensate for the residual retardance. The passive retarder is oriented orthogonal to the liquid crystal retarder if the birefringence has the same sign and parallel if the birefringence has opposite sign. In the present invention, variable retarders 31 and 33 optionally include passive retarders to compensate for non-zero residual retardance.

This invention is described herein with the rotatable liquid crystal retarder (FIG. 2(a)) as the representative species of FIGS. 2(a)–2(c). It is to be understood that in all embodiments of the present invention that utilize a tunable retarder, a liquid crystal rotatable retarder can, in the manner of FIG. 2(c), be replaced by a pair of liquid crystal variable retarders. The species of FIG. 2(a) is preferred over the species of FIG. 2(c) for several reasons. The construction is simpler because it uses a single liquid crystal cell instead of two active cells. In addition, the switching speed of smectic liquid crystals is orders of magnitude faster than nematics. Finally, the field of view is greater.

The passive outer retarders can be any birefringent material. As discussed above, in connection with the spatially switched retarder, suitable materials include crystalline materials, such as mica or quartz, stretched polymeric films, such as mylar or polycarbonates, and polymer liquid crystal films. In a preferred embodiment, the dispersion of the passive outer retarders is approximately matched to the dispersion of the central retarder. Mylar, for example, has a similar dispersion to some FLCs.

The achromatic compound retarder of this invention is designed to be achromatic in the on-state when the central retarder is oriented at $\alpha_2$. For achromaticity of the orientation and retardance, one solution for the relative orientations of the retarders is:

$$\cos 2\Delta = \frac{-\pi}{2\Gamma_1^0} \quad (2)$$

where $\Delta = \alpha_2 - \alpha_1$. In addition there are isolated orientations for specific design frequencies that also yield achromatic orientation and retardance. The retardance, $\Gamma$, of the compound retarder is obtained from $$\cos(\Gamma/2) = \frac{\pi}{2} \frac{\sin \Gamma_1^0}{\Gamma_1^0} \quad (3)$$

The orientation, $\Omega + \alpha_1$, of the compound retarder is obtained from $$\tan 2(\Omega) = \frac{\tan 2\Delta}{\cos \Gamma_1^0} \quad (4)$$

where $\Omega$ is the orientation of the compound retarder with respect to the orientation of the outside passive retarders.

Based on the above design equations, the retardance of the outer retarders and the relative orientations of the retarders can be chosen to provide the desired retardance of the compound retarder and to ensure achromaticity. For example, for an achromatic compound half-wave retarder ($\Gamma = \pi$), Eq. 3 provides the solution $\Gamma_1^0 = \pi$, and Eq. 2 provides the relative orientation of the retarders as $\Delta = 60°$. Eq. 4 gives the relative orientation of the compound retarder as $\Omega = 30°$. Therefore, to obtain an orientation of $\Omega + \alpha_1 = 45°$ for the compound half-wave retarder, the outer retarders are oriented at $\alpha_1 = 15°$. Since $\Delta = 60°$, the orientation of the central retarder must then be $\alpha_2 = 75°$. Similarly, for an achromatic compound quarter-wave retarder ($\Gamma = \pi/2$), the equations yield $\Gamma_1^0 = 115°$, $\Delta = 71°$, and $\Omega = 31°$. Thus, for an orientation of $\Omega + \alpha_1 = 45°$, the outer retarders are oriented at $\alpha_1 = 14°$ and the central retarder is at $\alpha_2 = 85°$.

In the achromatic compound retarder of FIG. 2(a), the liquid crystal central retarder has an optic axis rotatable between $\alpha_2$ and $\alpha_2'$. When the liquid crystal retarder is at $\alpha_2'$, the orientation relative to the outer passive retarders is $\Delta' = \alpha_2' - \alpha_1$ and the orientation of the compound retarder relative to the outer retarders is $\Omega'$. Since Eq. 2 gives a unique solution for the absolute value of $\Delta$, at which the compound retarder is achromatic, it teaches against changing the orientation of the central retarder with respect to the outer retarders. An aspect of the present invention is the discovery that (1) at orientations $\alpha_2'$ of the central retarder which do not satisfy Eq. 2, the composite retardance $\Gamma$ is nevertheless unchanged at the design wavelength and (2) there are orientations $\alpha_2'$ of the central retarder for which, even though the composite retarder is not achromatic, the optic axis orientation is stable with respect to wavelength.

A further aspect of this invention is the realization that in many devices the composite retardance does not affect device output in certain switching states and, therefore, it need not be achromatic in those states. In particular, when the compound retarder is oriented parallel to a polarizer, the polarized light is not modulated by the retarder and hence any chromaticity of the retardance is unimportant. Only stability of the orientation of the optic axis is required so that the orientation remains parallel to the polarizer throughout the operating wavelength range. These properties lead to numerous useful devices utilizing the compound retarder with a rotatable or spatially switched central retarder.

In a preferred embodiment of the achromatic compound retarder, the optic axis orientation of the compound retarder is achromatic when the central retarder is oriented at $\alpha_2'$. The first order term of the frequency dependence of the orientation of the retardation axis is $$\left.\frac{\partial \Omega}{\partial \epsilon}\right|_{\epsilon=0} = -e^{-i2\Gamma_1^0} \frac{\tan 2\Delta \cos^2 2\Omega \sin \Gamma_1^0}{2\cos 2\Delta} (\Gamma_1^0 \cos 2\Delta + \frac{\pi}{2}) \quad (5)$$

where $\epsilon$ is the relative frequency difference $\Delta v/v_0$. Note that in the on-state, wherein Eq. 2 is satisfied, Eq. 5 gives $\partial \Omega/\partial \epsilon = 0$. This confirms that the on-state orientation is achromatic. For off-state orientations, $\alpha_2'$, Eq. 5 can be used to determine the magnitude of $\partial \Omega'/\partial \epsilon$. For the special case of an achromatic half-wave retarder, $\Gamma_1^0 = \pi$, and $\sin \Gamma_1^0 = 0$, so $\partial \Omega/\partial \epsilon = 0$ for all values of $\alpha_2'$, i.e., the optic axis orientation is achromatic at all orientations.

Figure 3A:
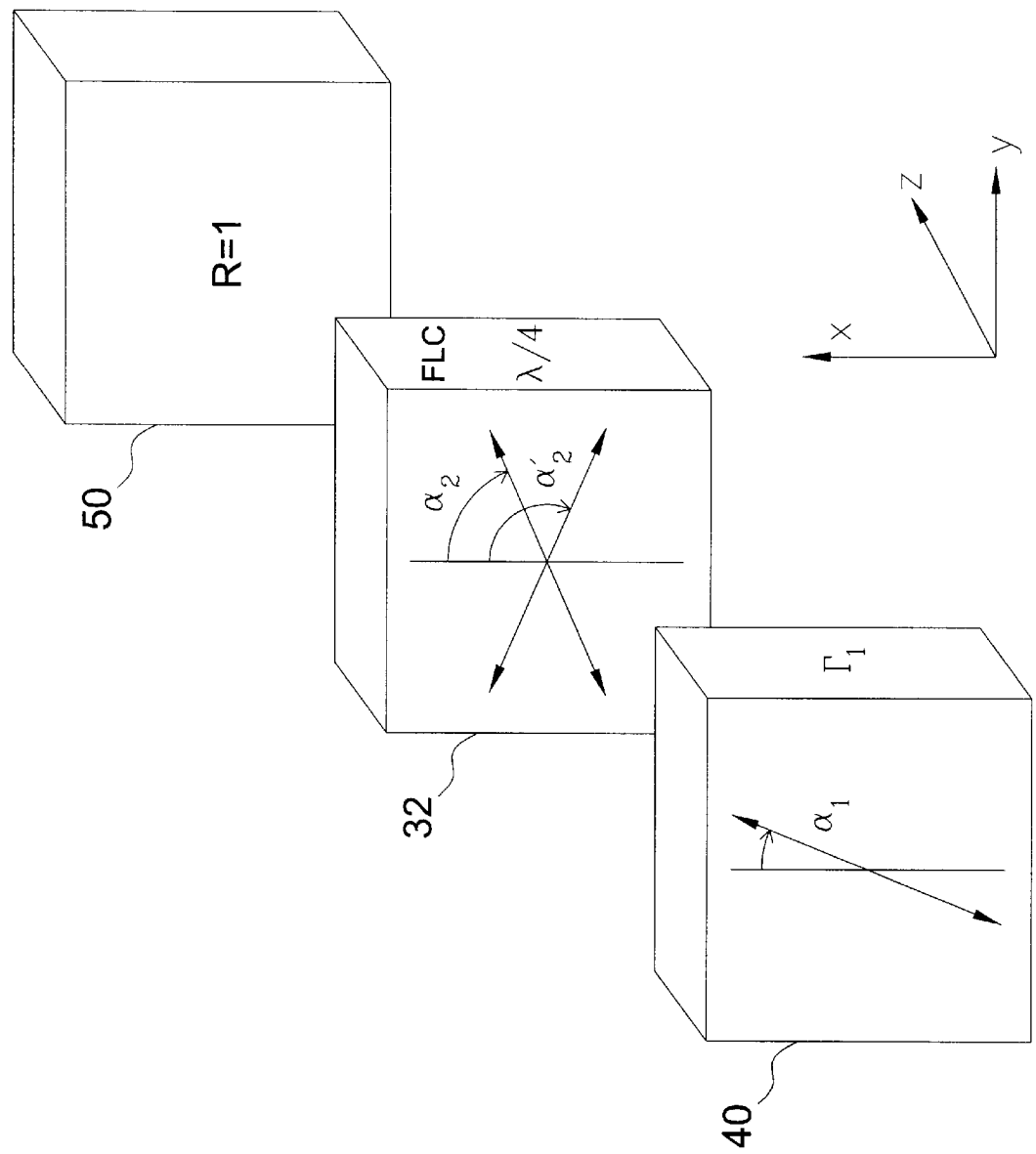
FIG. 3(a) is a reflective achromatic compound retarder, in accordance with the present invention.
Figure 3B:
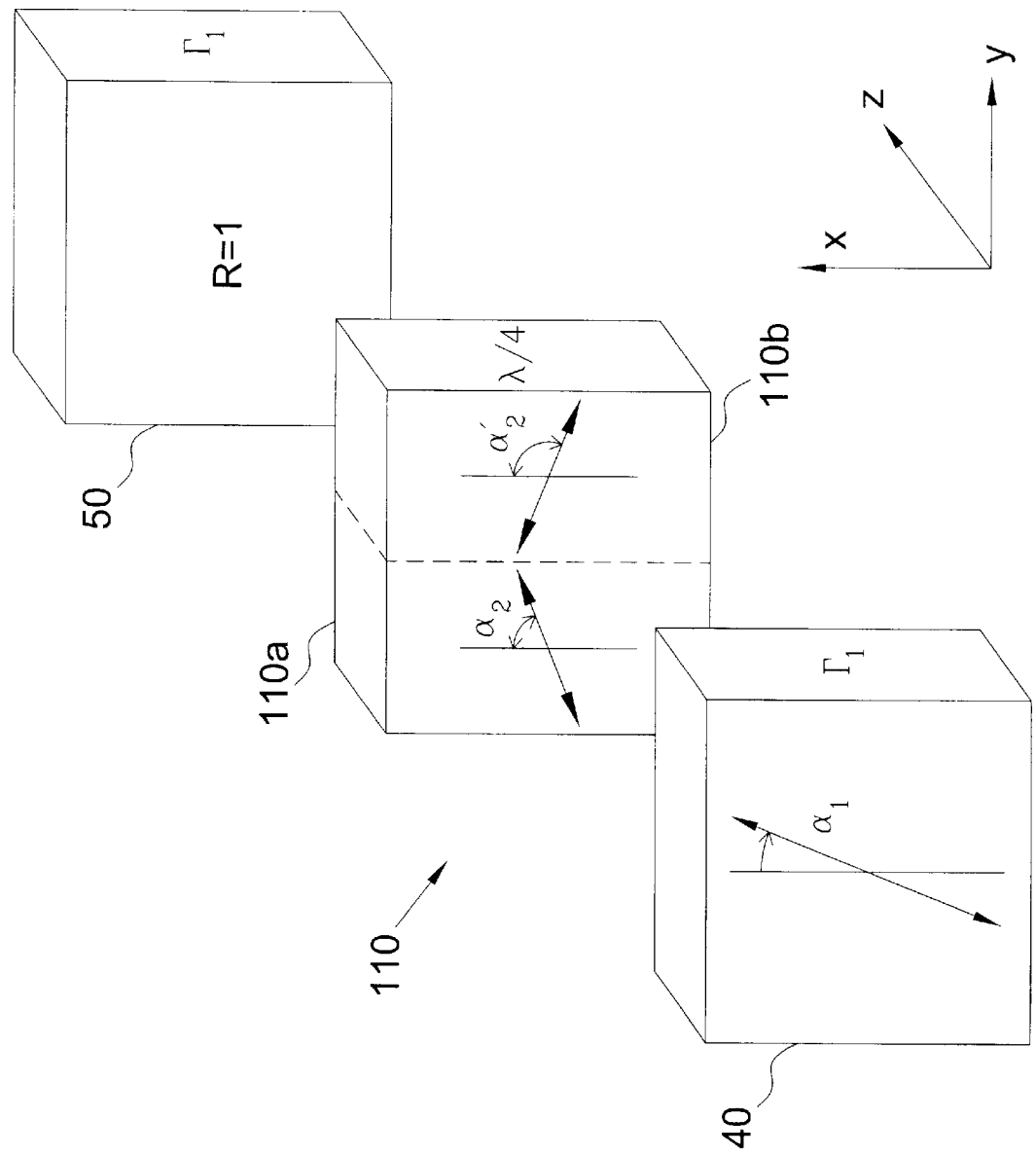
FIG. 3(b) illustrates a second embodiment of a reflective achromatic compound retarder, in accordance with the present invention.

Because of the symmetry of the achromatic retarder, it can be implemented in reflection-mode, as illustrated in FIGS. 3(a) and 3(b). FIG. 3(a) is the reflection-mode embodiment of the retarder of FIG. 2(a), and utilizes a single passive retarder 40, with retardance $\Gamma_1^0$ and orientation $\alpha_1$, liquid crystal quarter-wave retarder 32, with orientation switchable between $\alpha_2$ and $\alpha_2'$, and reflector 50. Because the reflector 50 creates a second pass through the liquid crystal quarter-wave retarder 32, the net retardance of the liquid crystal quarter-wave retarder 32 is a half wave. A forward and return pass through the reflection-mode device is equivalent to a single pass through the compound retarder of FIG. 2a. The reflection-mode embodiment of the retarder of FIG. 2(c) (not shown) uses a pair of variable retarders switchable between zero and quarter-wave retardance in lieu of rotatable quarter-wave retarder 32 in FIG. 3(a). FIG. 3(b) illustrates a reflection mode embodiment of the retarder of FIG. 2(b), and utilizes a spatially switched quarter-wave retarder 110, with retarder portions 110a and 110b, in lieu of the liquid crystal quarter-wave retarder 32 of FIG. 3(a).

The reflector in the embodiments shown in FIGS. 3(a) and 3(b) has R=1 but it can also have R<1. The reflector can transmit an optical signal for addressing the liquid crystal retarder of FIG. 3(a).

This invention further includes devices employing the achromatic compound retarders described above. The polarization switch of this invention comprises a linear polarizer in combination with the achromatic compound retarder. The polarizer can be neutral with wavelength or can be a pleochroic polarizer. Light is linearly polarized by the polarizer and the polarization is modulated by the achromatic compound retarder. For the case of a half-wave achromatic compound retarder, the polarization remains linear and the orientation is rotated. Other achromatic compound retarder embodiments produce elliptically polarized light. The polarization switch functions as a polarization receiver when light is incident directly on the achromatic compound retarder rather than on the polarizer.

In a preferred embodiment, the achromatic compound retarder is achromatic in the on-state ($\alpha_2$) and is oriented parallel to the polarizer in the off-state ($\alpha_2'$). With this preferred off-state orientation, achromaticity of the composite retardance is not needed because, with the orientation of the achromatic compound retarder parallel to the polarizer, the polarized light does not "see" the achromatic compound retarder and is not modulated by it. In a more preferred embodiment, the orientation of the achromatic compound retarder is stable in the off-state, i.e., $\partial \Omega'/\partial \epsilon$ is small. In the most preferred embodiment, the orientation of the achromatic compound retarder is achromatic, i.e., $\partial \Omega'/\partial \epsilon$ is zero.

Figure 4:
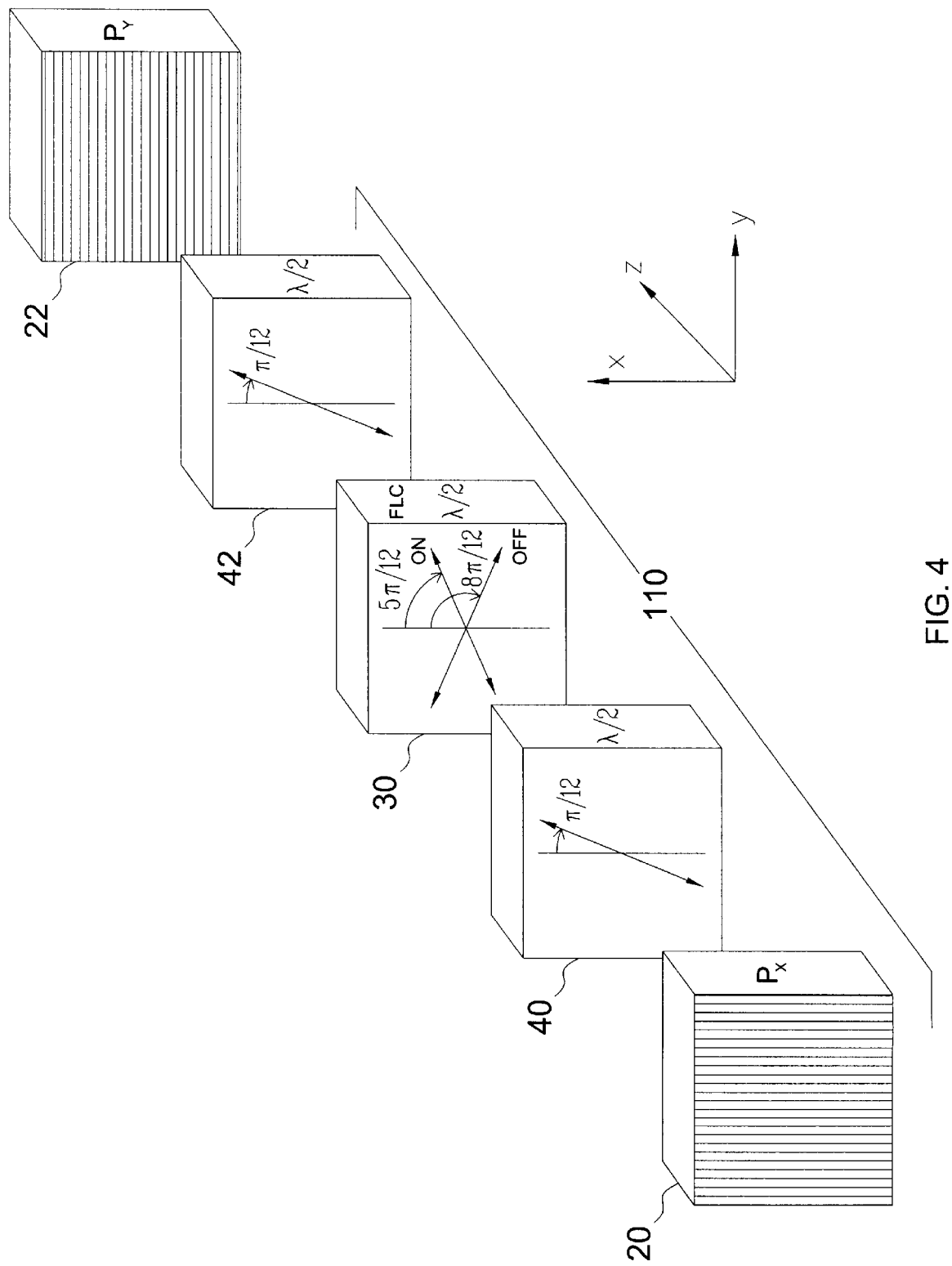
FIG. 4 illustrates an achromatic shutter utilizing the achromatic compound retarder of the present invention.

A particularly useful embodiment of the polarization switch of the present invention is illustrated in FIG. 4. The polarization switch 110 comprises polarizer 20, outer retarders 40 and 42, and liquid crystal retarder 30. Outer retarders 40 and 42 are half-wave retarders ($\Gamma_1 = \pi$) oriented at $\alpha_1 = \pi/12$. The liquid crystal retarder 30 is a half-wave retarder, and is switchable between on- and off-state orientations of $\alpha_2 = 5\pi/12$ and $\alpha_2' = 8\pi/12$, respectively. This gives a compound retardance $\Gamma = \lambda/2$ and orientations $\Omega + \alpha_1 = \pi/4$ and $\Omega' + \alpha_1 = 0$. In the off-state, light remains polarized along the x-axis and in the on-state, light is oriented parallel to the y-axis. Because the achromatic compound half-wave retarder has an achromatic orientation for all values of $\alpha_2'$, it can be used to achromatically rotate the polarization between the input polarization state and any other linear polarization state.

The polarization switch 110 can be used in combination with any polarization sensitive element. In combination with an exit polarizer 22 it forms an achromatic shutter, as shown in FIG. 4. In the embodiment of FIG. 4, the polarizers 20 and 22 are crossed, but they can alternatively be parallel. The shutter shown in FIG. 4 is analogous to the shutter shown FIG. 1 in that the achromatic compound retarder has a half-wave retardance, and on- and off-state composite retarder orientations of $\pi/4$ and 0, respectively. Like the shutter of FIG. 1, the shutter of FIG. 4 requires only one active retarder. One advantage is that the shutter of the present invention is achromatic.

A mathematical analysis of the achromatic compound half-wave retarder and the achromatic shutter demonstrates the wavelength stability of the devices of this invention. The Jones matrix for the compound half-wave retarder is the product of the matrices representing the three linear retarders. The Jones matrix that propagates the complex cartesian field amplitude is given by chain multiplying the matrices representing the individual linear retarders. For the on- and off-states these are given, respectively, by the equations $$W_c(\pi/4) = W(\pi+\delta, \pi/12) W(\pi+\delta, 5\pi/12) W(\pi+\delta, \pi/12) \quad (6)$$

and $$W_c(0) = W(\pi+\delta, \pi/12) W(\pi+\delta, 2\pi/3) W(\pi+\delta, \pi/12) \quad (7)$$

where the general matrix for a linear retarder with retardation $\Gamma$ and orientation $\alpha$ is given by $$W(\Gamma, \alpha) = \begin{pmatrix} \cos\Gamma/2 - i\cos2\alpha\sin\Gamma/2 & -i\sin2\alpha\sin\Gamma/2 \\ -i\sin2\alpha\sin\Gamma/2 & \cos\Gamma/2 + i\cos2\alpha\sin\Gamma/2 \end{pmatrix} \quad (8)$$

and the absolute phase of each retarder is omitted. For the present analysis, each retarder is assumed identical in material and retardance, with half-wave retardation at a specific design wavelength. This wavelength is preferably selected to provide optimum peak transmission and contrast over the desired operating wavelength band. The retardance is represented here by the equation $\Gamma = (\pi + \delta)$, where $\delta$ is the wavelength dependent departure from the half-wave retardance. For the present work, the dispersion is modeled using a simple equation for birefringence dispersion that is suitable for both FLC and the polymer retarders used (Wu, S.T., Phys. Rev. (1986) A33:1270). Using a fit to experimental FLC and polymer spectrometer data, a resonance wavelength was selected that suitably models the dispersion of each material.

Substituting the three matrices into Eqs. 6 and 7 produces on- and off-state matrices that can be written in the general form $$W_c = \begin{pmatrix} |t_{11}|e^{-i\theta} & -i|t_{12}| \\ -i|t_{12}| & |t_{11}|e^{i\theta} \end{pmatrix} \quad (9)$$

where $|t_{ij}|$ denotes the magnitude and $\theta$ the phase of the complex $t_{ij}$ matrix components of the compound structure. The specific elements for the (achromatic) on-state are given by:

$$|t_{11}| = \frac{\sqrt{3}}{2}\sin^2\delta/2 \sqrt{1 + \frac{1}{3}\sin^2\delta/2}, \quad (10)$$

$$|t_{12}| = \sqrt{1 - \frac{3}{4}\sin^4\delta/2\left(1 + \frac{1}{3}\sin^2\delta/2\right)}, \quad (11)$$

$$\theta = \tan^{-1}\left[\frac{\sqrt{3}}{2}\cot\delta/2\right], \quad (12)$$

The components for the off-state are given by:

$$|t_{11}| = \sqrt{1 - \left(1 - \frac{\sqrt{3}}{2}\right)^2 \sin^4\delta/2\cos^2\delta/2}, \quad (13)$$

$$|t_{12}| = \left(1 - \frac{\sqrt{3}}{2}\right)\sin^2\delta/2\cos\delta/2, \quad (14)$$

$$\theta = \tan^{-1}\left[\cot\delta/2 \frac{\cos^2\delta/2 + (\sqrt{3} - 1/2)\sin^2\delta/2}{\sin^2\delta/2 + (\sqrt{3} - 1)\cos^2\delta/2}\right]. \quad (15)$$

In the achromatic shutter device, the achromatic compound retarder is placed between crossed polarizers. The Jones vector for the transmitted field amplitude is given by the matrix equation $$E(\lambda) = P_y W_c P_x E_o(\lambda). \quad (16)$$

The polarizers are taken to be ideal $$P_x = \begin{pmatrix} 1 & 0 \\ 0 & 0 \end{pmatrix}, \quad (17)$$

$$P_y = \begin{pmatrix} 0 & 0 \\ 0 & 1 \end{pmatrix}, \quad (18)$$

and the input field spectral density, $E_o(\lambda)$, is taken to be $\hat{x}$ polarized, with unity amplitude. Under these conditions, the Jones vector for the transmitted field is the off-diagonal component of $W_c$. The $\hat{y}$ component of the output Jones vector gives the field transmittance of the structure.

Since the components of $W_c$ are given above in terms of their magnitudes, the intensity transmission of the on- and off-states of the achromatic compound retarder are given by simply squaring the off-diagonal terms of Eqs. 11 and 14, or $T = |t_{12}|^2$. This gives the two intensity transmission functions of the shutter $$T = \begin{cases} 1 - \frac{3}{4}\sin^4\delta/2\left(1 + \frac{1}{3}\sin^2\delta/2\right) & \text{ON} \quad (\alpha_2 = 5\pi/12) \\ \left(1 - \frac{\sqrt{3}}{2}\right)^2 \sin^4\delta/(2\cos^2\delta/2) & \text{OFF} \quad (\alpha_2 = 2\pi/3) \end{cases} \quad (19)$$

The above outputs illustrate the desirable result that the second-order dependence of transmitted intensity on $\delta$ vanishes. The loss in transmission in the on-state and the leakage in the off-state have at most a fourth-order dependence on $\delta$.

Like a simple FLC shutter, the mechanism for modulating polarization with the smectic liquid crystal compound retarder is by rotating the orientation of the compound retarder rather than by varying the birefringence. This can clearly be seen by considering wavelength bands sufficiently narrow that the second (and higher) order terms of the Jones matrices in $\delta$ can be neglected. In this instance the matrices representing on- and off-states reduce respectively to $$W_c = \begin{pmatrix} 0 & -i \\ -i & 0 \end{pmatrix}, \quad (20)$$

and $$W_c = \begin{pmatrix} e^{-i\theta} & 0 \\ 0 & e^{i\theta} \end{pmatrix}. \quad (21)$$

The on-state matrix reduces, to this degree of approximation, to an ideal achromatic half-wave retarder oriented at $\pi/4$, while the off-state matrix reduces to an ideal linear retarder oriented at 0, with retardation $2\theta$. Since only an off-diagonal component is utilized in a shutter implementation, the output is ideal to this degree of approximation.

The elimination of the second-order term is achieved using a 3-element structure that achieves ideal half-wave retardation at two wavelengths, rather than a single wavelength for the simple FLC shutter. This behavior can be seen by slightly varying the relative orientation of the central and outer retarders in the on-state. The two ideal transmission states, as well as the two null states, can be further separated in this way, increasing the operating band but producing a more pronounced dip (leakage) between maxima (nulls).

Figure 5A:
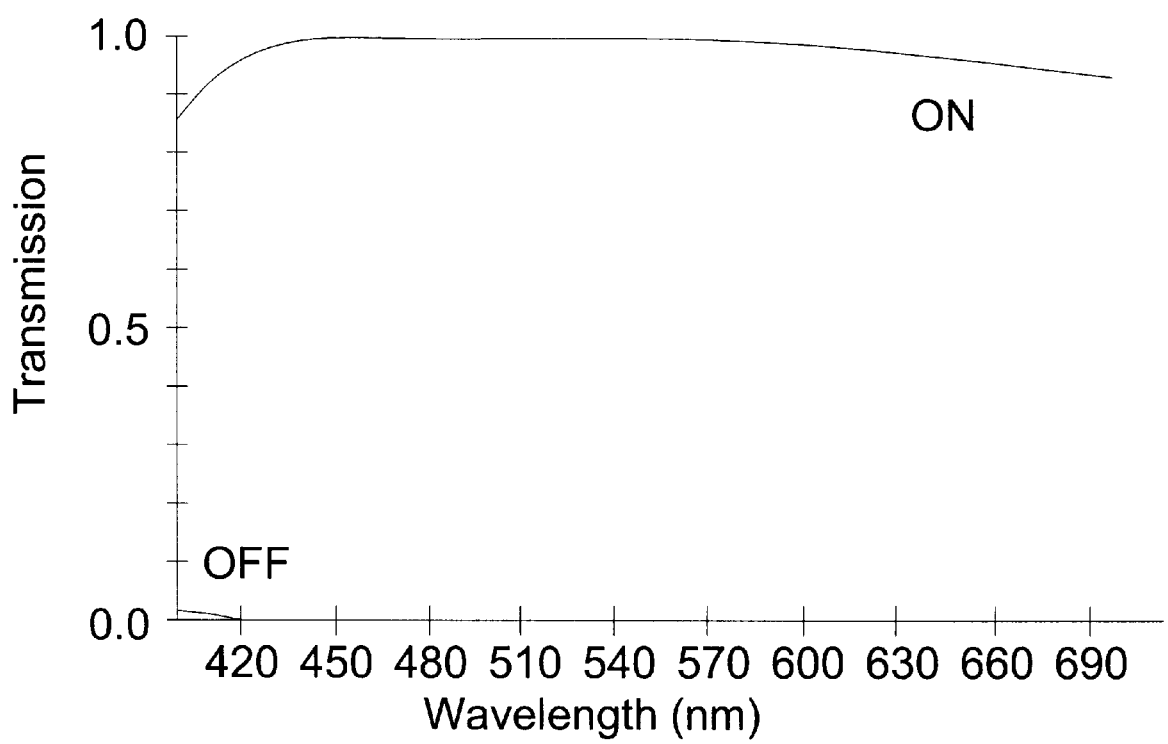
FIGS. 5(a) and 5(b) are plots showing the calculated on- and off-state transmission spectra of crossed polarizer shutters having (a) the achromatic compound retarder of the present invention, and (b) a single retarder.
Figure 5B:
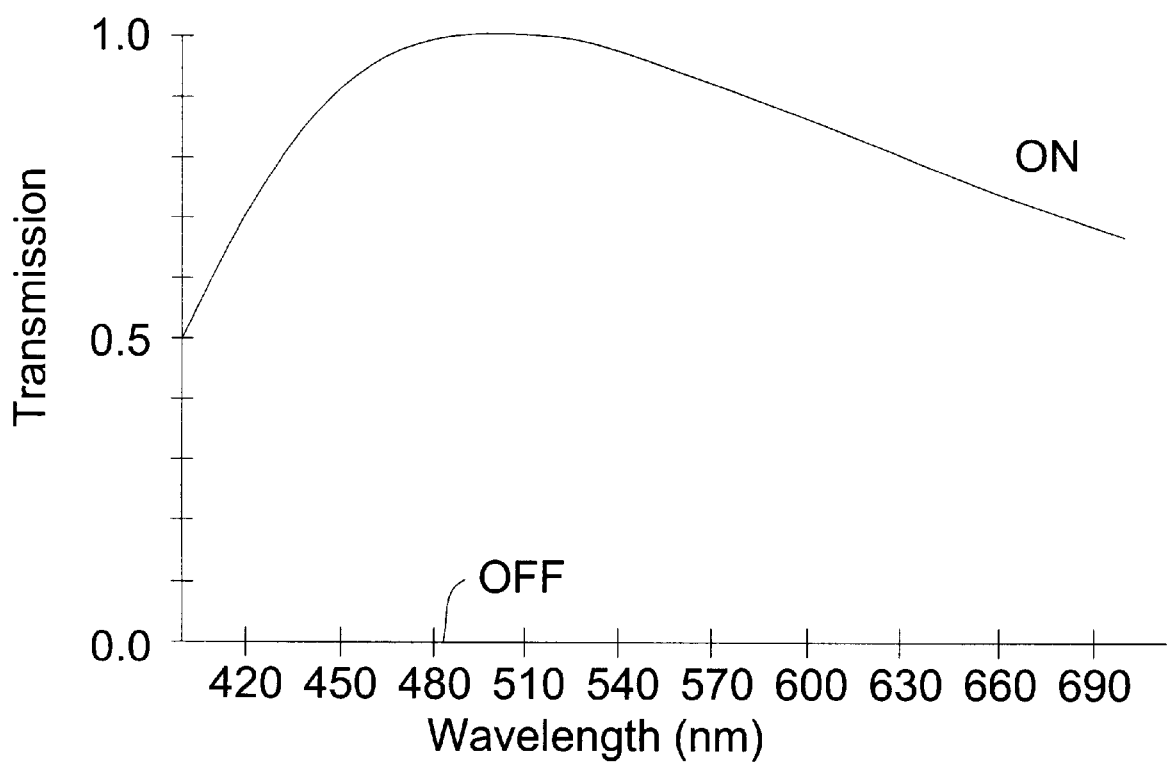
Figure 5C:
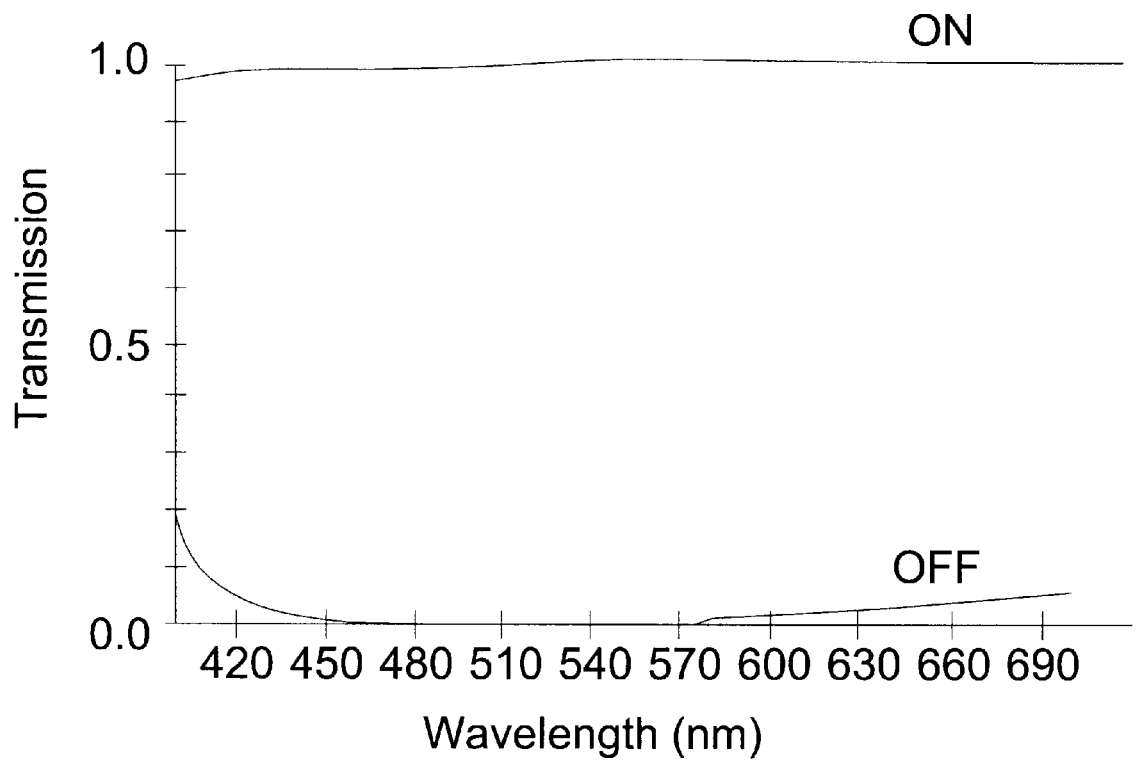
FIG. 5(c) and 5(d) are plots showing the calculated on- and off-state transmission spectra of parallel polarizer shutters having (c) the achromatic compound retarder of the present invention, and (d) a single retarder.
Figure 5D:
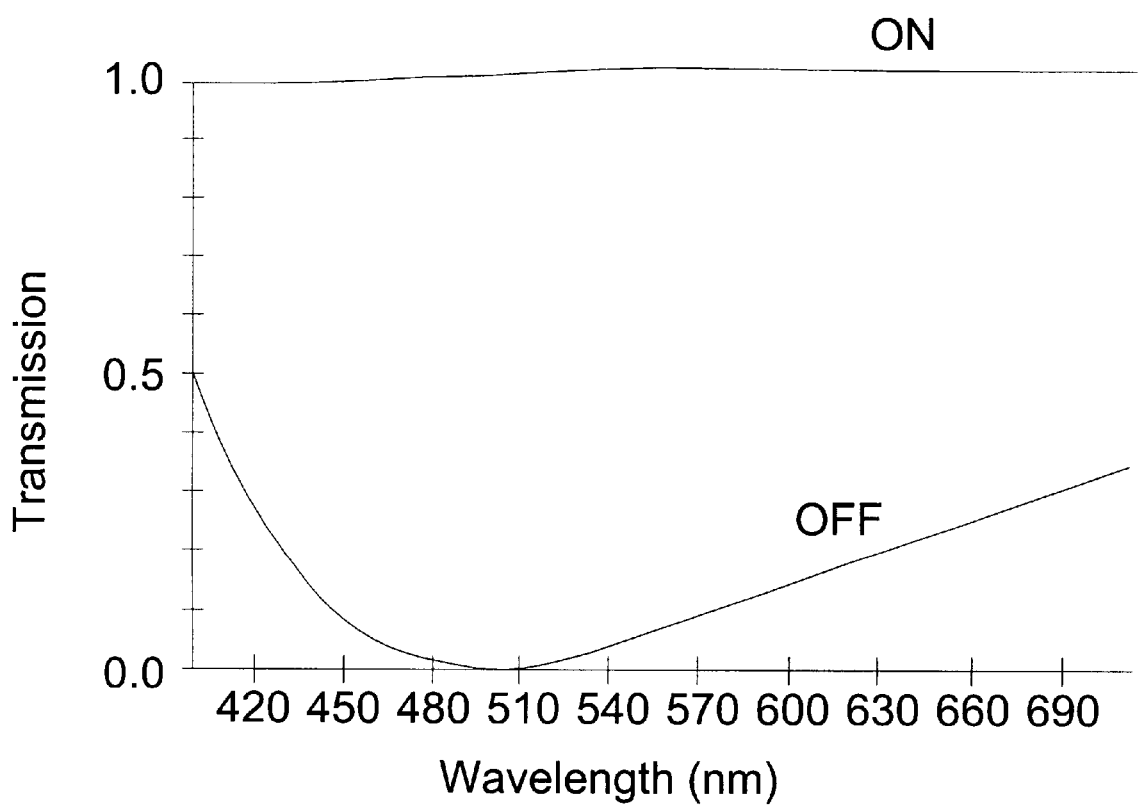

Based on the above equations, comparisons can be drawn between the achromatic compound retarder shutter and the conventional FLC shutter. A 10% loss in transmission for a conventional shutter occurs for a retardation deviation of $\delta=37°$, while the same loss for the achromatic shutter occurs for $\delta=72°$. This is very nearly a factor of two increase in $\delta$. FIG. 5(a) shows a transmisstion spectrum, created using a computer model for the structures, for an achromatic shutter optimized for visible operation (400–700 nm). The shutter has a 90% transmission bandwidth of 335 nm (409–744 nm). FIG. 5(b) shows the transmission spectrum for a conventional shutter with a design wavelength of 480 nm. The conventional shutter has a 90% bandwidth of 122 nm (433–555 nm). The use of an achromatic compound retarder in the shutter results in a factor of 3.75 increase in bandwidth. Calculated spectra for parallel polarizer shutters with a compound retarder, shown in FIG. 5(c), and a single retarder, shown in FIG. 5(d), show the tremendous improvement in the off-state provided by the achromatic compound retarder of this invention.

The increase in operating bandwidth is accompanied by a theoretical loss in contrast ratio. The first-order orientation stability requirement of the optic axis allows off-state leakage due to the presence of higher order terms. In practice, little if any actual sacrifice is observed when incorporating the achromatic compound retarder. An FLC optimized for visible operation (half-wave retardance at 480 nm) gives a maximum departure in retardance of $\delta=75°$. Using this value, and assuming that the outer retarders have dispersion identical to the FLC, a worst-case contrast ratio of 667:1 is found for operation in the 400–700 nm band. For most of this band, theory predicts contrast far in excess of 1000:1.

The conventional and the achromatic shutters were experimentally demonstrated to verify the performance predicted by computer modeling. The FLC device was fabricated using ZLI-3654 material from E-Merck. The ITO coated substrates were spin coated with nylon 6/6 and were rubbed unidirectionally after annealing. Spacers with a diameter of 1.5 microns were dispersed uniformly over the surface of one substrate and UV cure adhesive was deposited on the inner surface of the other substrate. The substrates were gapped by applying a uniform pressure with a vacuum bag and subsequently UV cured. The FLC material was filled under capillary action in the isotropic phase and slowly cooled into the C* phase. After cooling, the leads were attached to the ITO and the device was edge-sealed. The FLC cell had a half-wave retardance at 520 nm.

A conventional shutter, such as the one shown in FIG. 1, was formed by placing the FLC cell with the optic axis oriented at 45° between parallel polarizers. Polaroid HN22 polarizers were used due to their high contrast throughout the visible wavelength range. The structure was probed by illuminating it with a 400 W Xenon arc lamp, and the transmitted light was analyzed using a SPEX 0.5 m grating spectrometer system. The on-state transmission of the conventional shutter is shown in plot (b) of FIG. 6.

The achromatic shutter was assembled using the same FLC device positioned between two Nitto NRF polycarbonate retarders having half-wave retardance at 520 nm. Since the FLC device is not dispersion matched to the polymer film, a loss in contrast ratio is anticipated for the achromatic compound retarder due to increased off-state leakage. The polycarbonate films were oriented at 15° with respect to the input polarizer, which was crossed with the exit polarizer. The FLC was switched between orientations of $5\pi/12$ and $8\pi/12$. The on-state spectra shown in plot (b) of FIG. 6, and the off-state spectra, shown in FIG. 7, were measured. Both of these spectra were appropriately normalized to remove leakage due to non-ideal polarizers, depolarization by the retarders, and the polarization dependence of the lamp spectrum.

Figure 6:
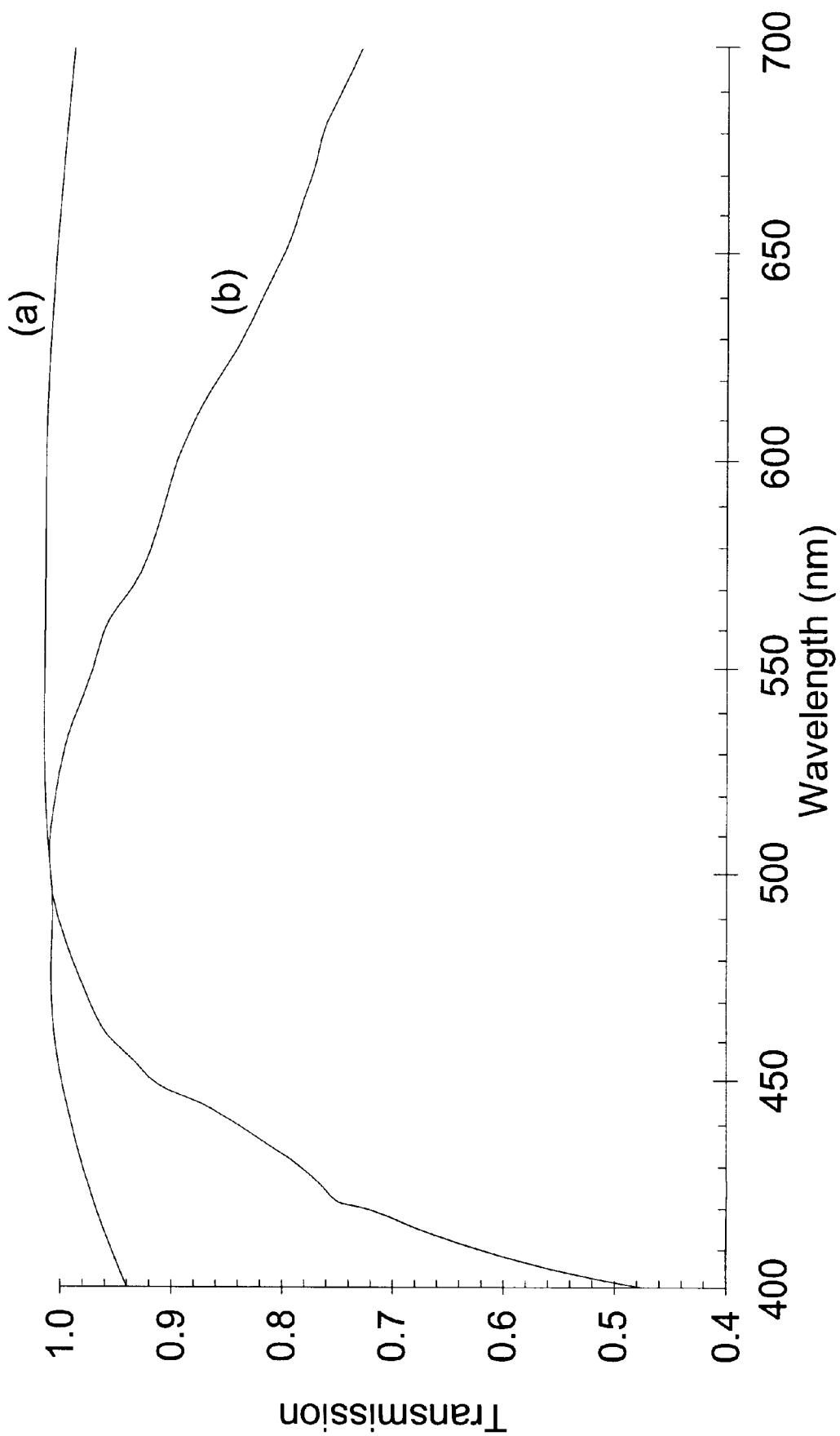
FIG. 6 is a plot showing measured on-state transmission spectra of (a) a compound-retarder achromatic shutter, in accordance with the present invention, and (b) a single-retarder shutter.
Figure 7:
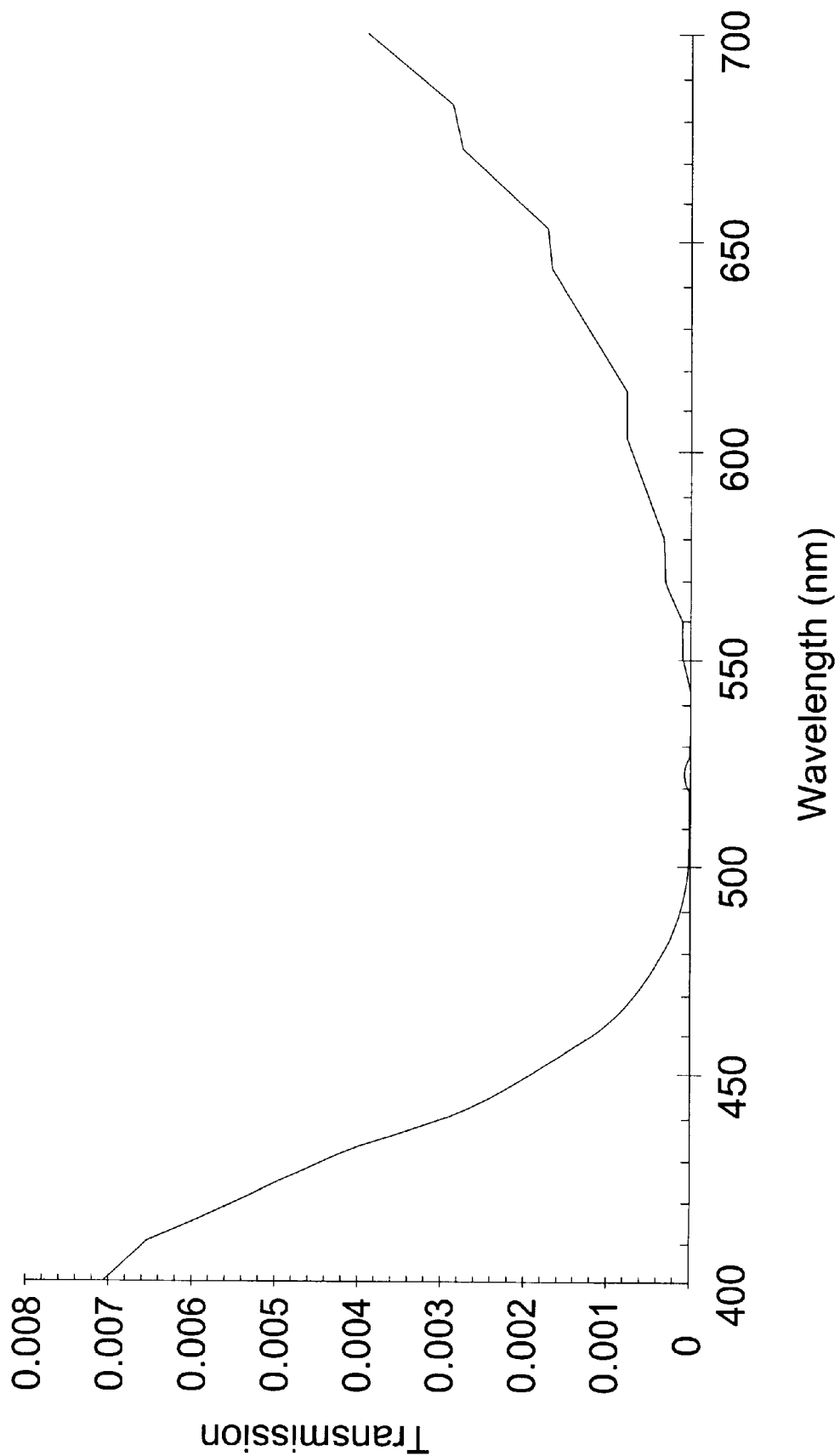
FIG. 7 is the measured off-state transmission spectrum of a compound-retarder achromatic shutter, in accordance with the present invention.

The measured transmission spectra indicate excellent agreement with the model results. FIG. 6 is striking evidence of the increased transmission over the visible spectrum provided by the achromatic shutter of this invention.

Figure 8:
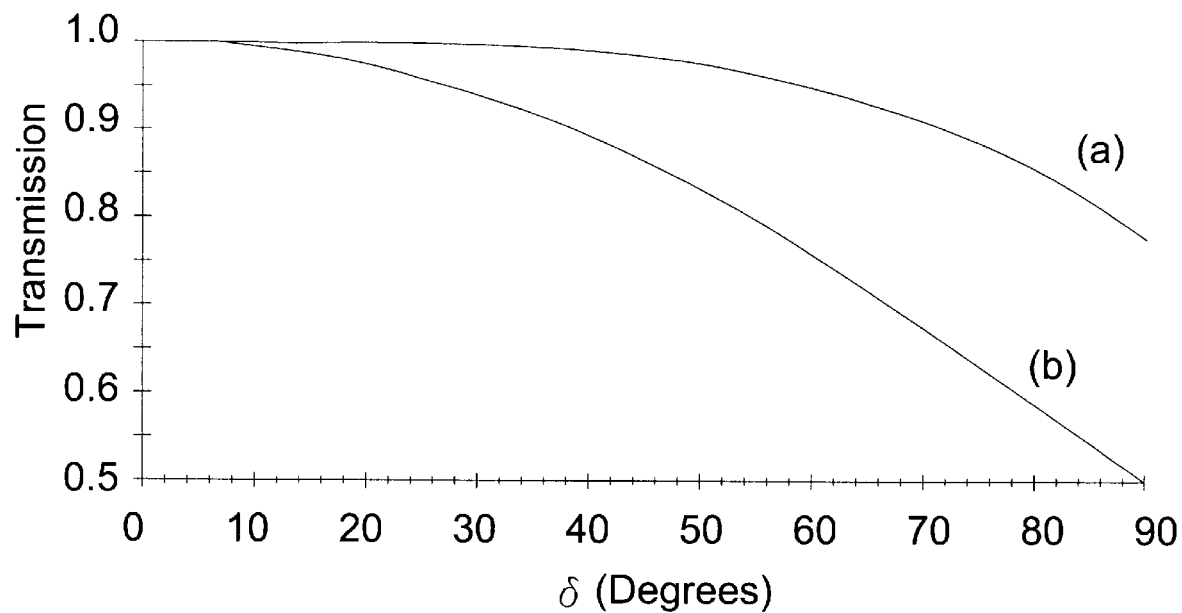
FIG. 8 is a plot showing the calculated on-state transmission, as a function of the deviation from half-wave retardance δ, of (a) a compound-retarder achromatic shutter, in accordance with the present invention, and (b) a single-retarder shutter.
Figure 9:
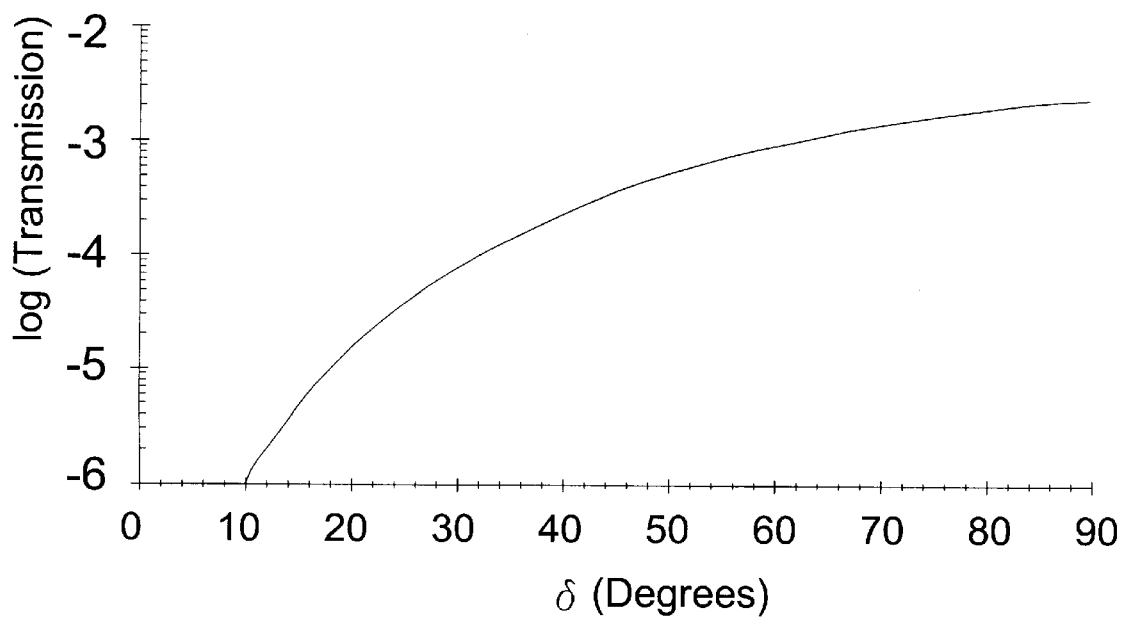
FIG. 9 is a plot showing the calculated off-state transmission, as function of δ, of a compound-retarder achromatic shutter, in accordance with the present invention.
Figure 10:
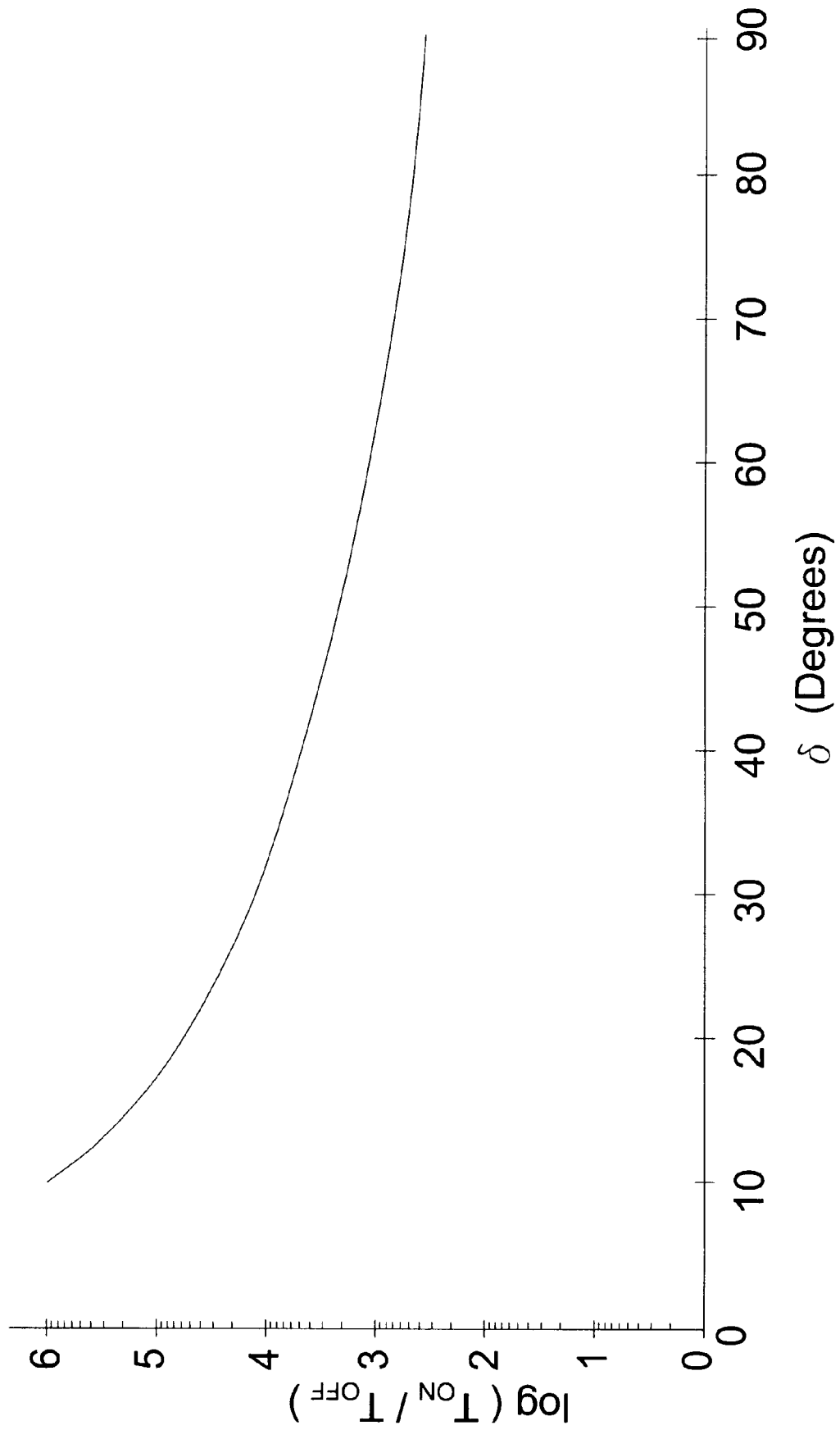
FIG. 10 is a plot showing the calculated contrast ratio, of a function of δ, of a compound-retarder achromatic shutter, in accordance with the present invention.

The model was further used to calculate the on-state transmission of a compound-retarder achromatic shutter (Eq. 19) and a single retarder shutter (Eq. 1) as a function of the deviation from half-wave retardance $\delta$. The calculated transmission spectra are shown in FIG. 8. FIG. 9 is the calculated off-state transmission of a compound-retarder shutter as a function of $\delta$, and FIG. 10 is the calculated contrast ratio.

Using the achromatic shutter at slightly longer center wavelengths, where FLC dispersion is greatly reduced, enormous operating bands are feasible. For instance, the calculated 95% transmission bandwidth of a shutter centered at 600 nm is approximately 400 nm (480 nm–880 nm), while that of a simple FLC shutter is only 150 nm (540 nm–690 nm).

Figure 11A:
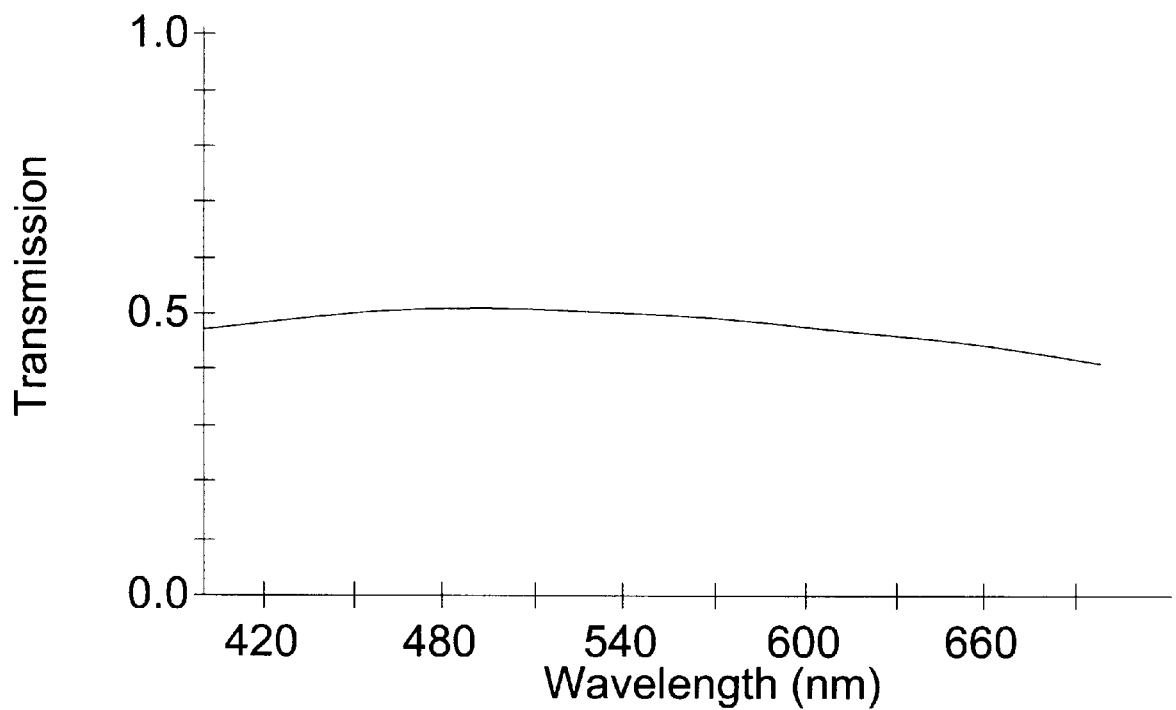
FIG. 11(a) is a plot showing the calculated on-state transmission spectra of an achromatic shutter utilizing a compound quarter-wave retarder, in accordance with the present invention;.
Figure 11B:
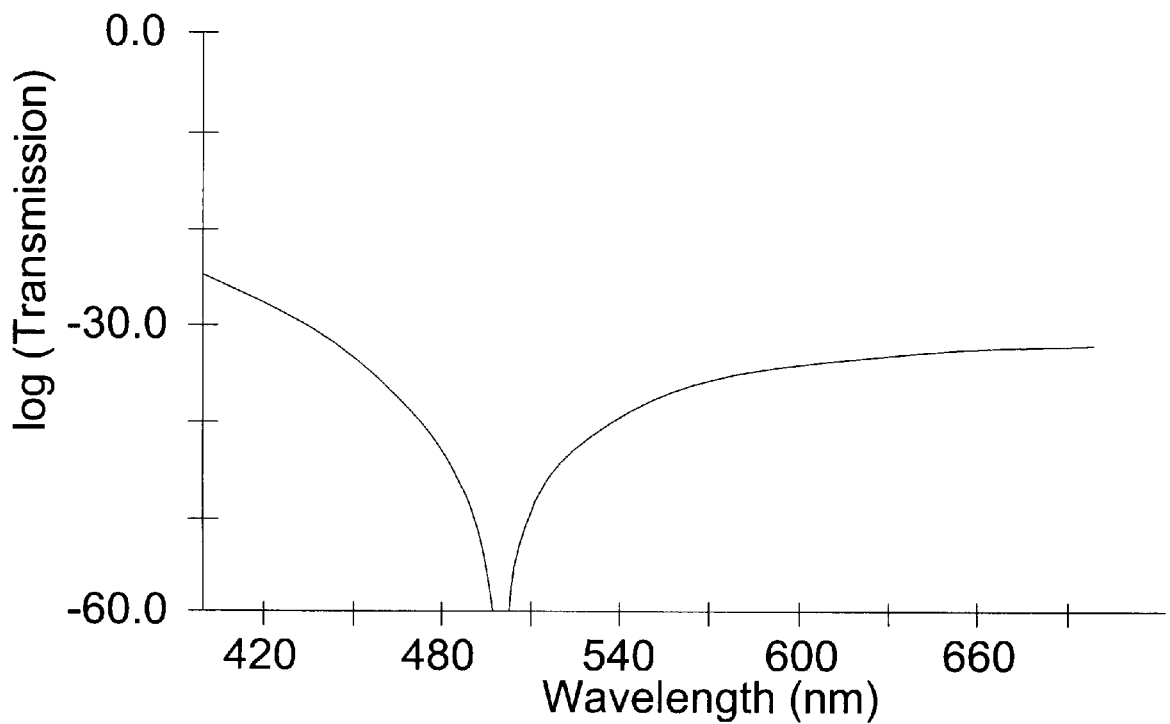
FIG. 11(b) is a plot showing the calculated off-state transmission spectra of an achromatic shutter utilizing a compound quarter-wave retarder, in accordance with the present invention.

The achromatic polarization switches and shutters of this invention can also utilize compound retarders with composite retardances other than half-wave. For example, a polarization switch can be fabricated using a linear polarizer and an achromatic compound quarter-wave retarder. In one embodiment, the orientation of the achromatic compound retarder switches between $\pi/4$ and 0 with respect to the input polarizer, i.e. $\Omega+\alpha_1=45°$ and $\Omega'+\alpha_1=0°$. To achieve this, Eqs. 2–4 give $\Gamma_1^0=115°$, $\Delta=71°$, $\alpha_1=14°$ and $\alpha_2=85°$ in the on-state, and in the off-state $\Delta'=96°$, and $\alpha_2'=111°$. In the on-state, the compound quarter-wave retarder switches the linear light to circularly polarized light, and in the off-state the linear polarization is preserved. Addition of a second polarizer oriented perpendicular to the first polarizer results in a shutter which switches between 50% transmission in the on-state and zero transmission in the off-state. The on-state transmission spectrum, shown in FIG. 11(a), and the off-state transmission spectrum, shown in FIG. 11(b), were calculated assuming no dispersion. Note that the off-state transmission spectrum is shown on a logarithmic scale in FIG. 11(b).

The achromatic compound retarder, polarization switch and shutter of this invention have been illustrated with FLCs having two optic axis orientations. They can alternatively utilize more than two optic axis orientations and can have a continuously tunable optic axis.

The achromatic shutter of this invention can be utilized in applications such as CCD cameras, eye protection systems, glasses in virtual reality systems, three-color shutters in field-sequential displays, beamsteerers, diffractive optics and for increasing the brightness of LC flat-panel displays.

Figure 12A:
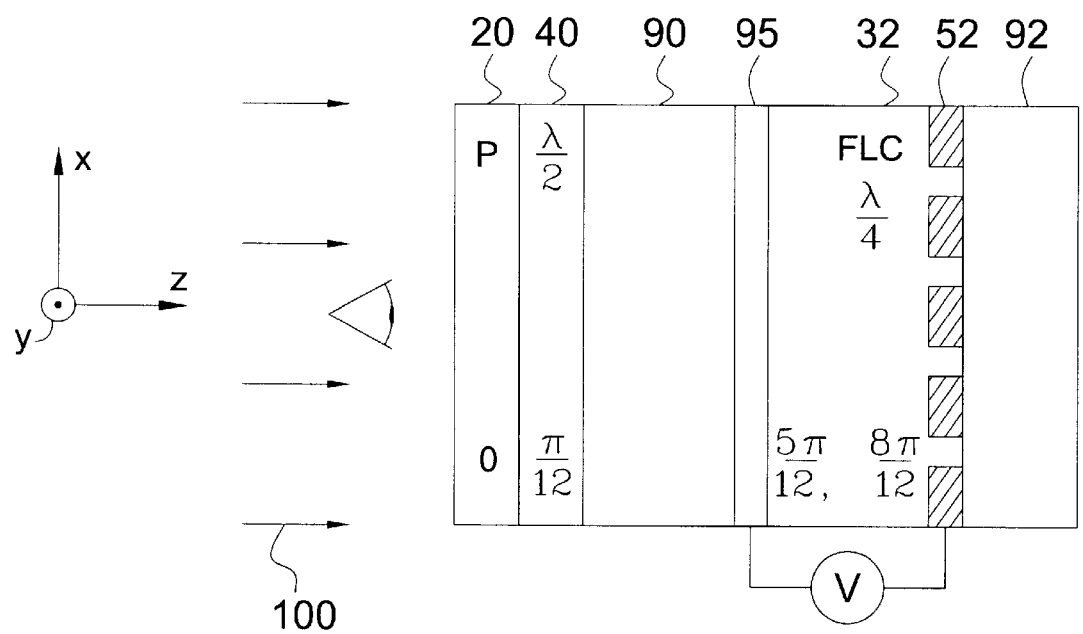
FIG. 12(a) shows a multiple-pixel reflection-mode achromatic shutter having parallel polarizers, in accordance with the present invention.
Figure 12B:
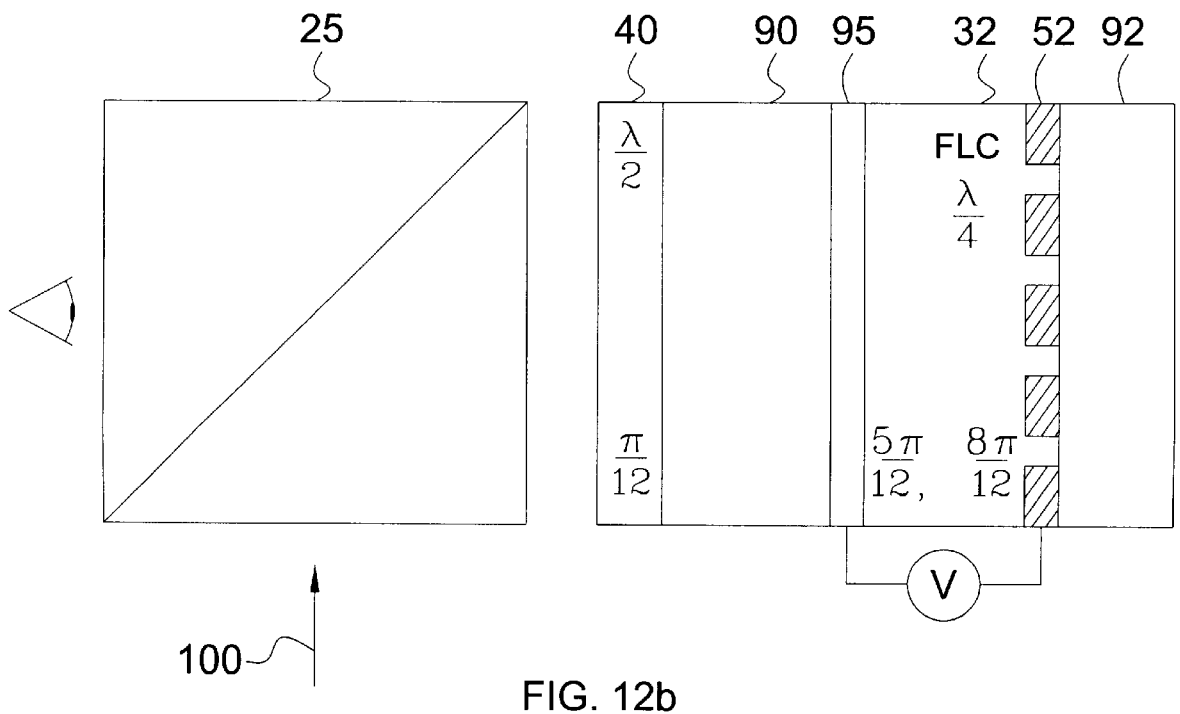
FIG. 12(b) shows a multiple-pixel reflection-mode achromatic shutter having crossed polarizers, in accordance with the present invention.
Figure 13:
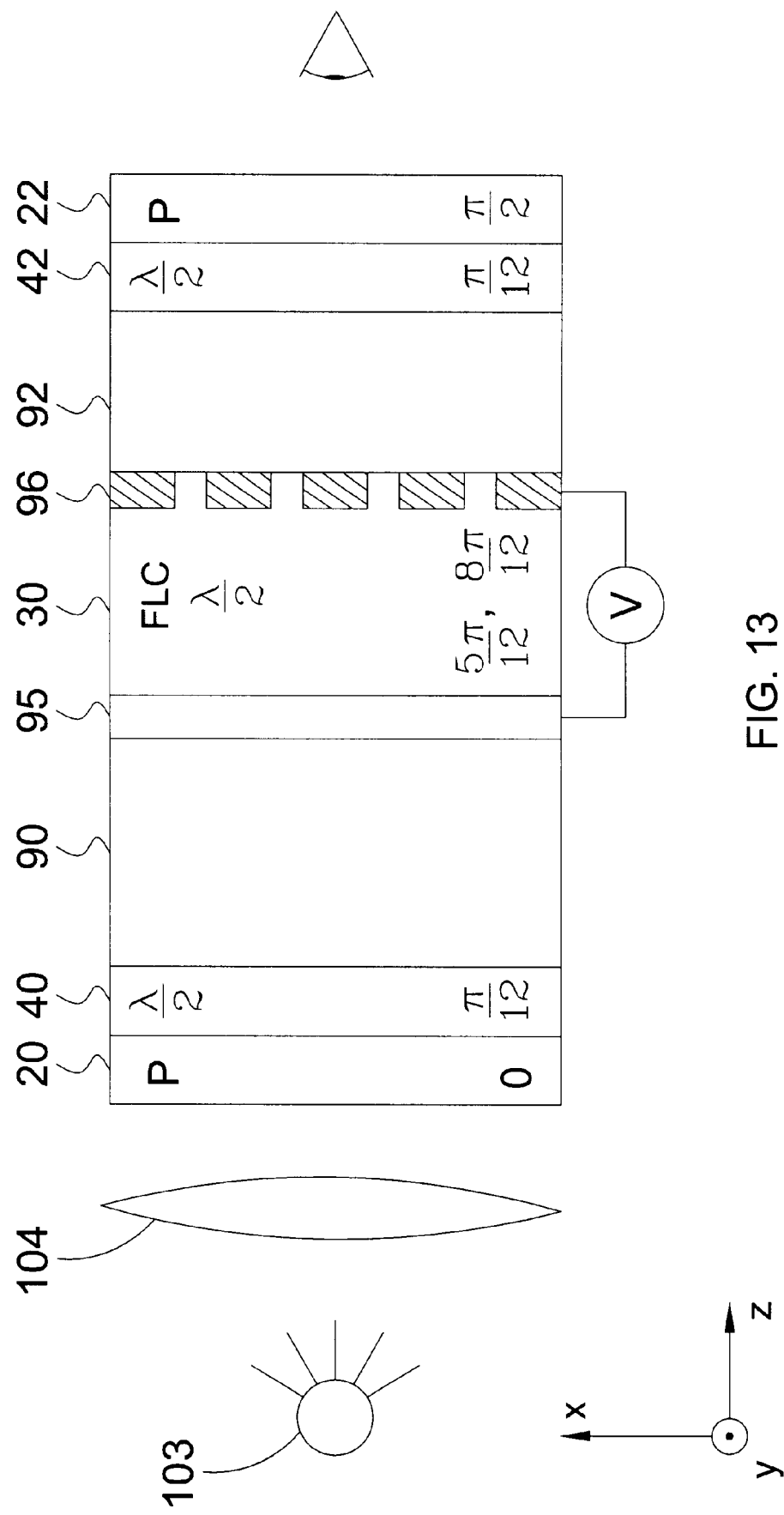
FIG. 13 is multiple-pixel transmission-mode achromatic shutter, in accordance with the present invention.

For many display applications the achromatic shutter can be used in a multiple-pixel array, as shown in FIGS. 12 and 13. In these figures, optical elements are shown in cross section and are represented by rectangular boxes. The retardance of birefringent elements is listed at the top of the respective box, and the orientation is listed at the bottom. When elements can rotate between two or more orientations, both orientations are listed in the box and are separated by a comma.

Reflection-mode embodiments are shown in FIGS. 12(a) and 12(b). FLC retarder 32 has a quarter-wave retardance at the design wavelength and the optic axis is rotatable between $5\pi/12$ and $8\pi/12$. The FLC cell is formed with substrates 90 and 92. Voltages are applied to the FLC using transparent electrode 95 and pixellated mirror electrodes 52. Each pixel can be separately addressed to provide the desired display pattern. The compound retarder is formed by the FLC in combination with passive half-wave retarder 40, oriented at $\pi/12$.

In FIG. 12(a) the shutter array uses linear polarizer 20 oriented at 0°. Since, in reflection-mode, polarizer 20 is both the input and output polarizer, this is a parallel polarizer embodiment. The array is illuminated by ambient light 100 and the viewer is represented by an eye. In FIG. 12(b), the array uses polarizing beam splitter 25 to create a crossed polarizer embodiment. White light 101 illuminates the array and modulated gray light is output to the viewer.

A transmission-mode array is illustrated in FIG. 13. In this embodiment, the FLC has a half-wave retardance. Voltages are applied using transparent electrode 95 and pixellated transparent electrode 96. The compound retarder is formed by the FLC retarder in combination with outer retarders 40 and 42. The shutter is formed by polarizers 20 and 22 which, in this embodiment, are crossed. The array is illuminated by backlight assembly 103, which can be collimated by lens 104. The display is viewed in transmission mode.

The achromatic compound retarder of this invention has been demonstrated within an achromatic shutter. In addition, it can be used in many other optical devices known in the art. In particular, it is suited to devices in which the retarder needs to be achromatic in only one orientation and in which slight achromaticity in other retarder orientations can be tolerated. Specific examples include polarization interference filters and dye-type color polarizing filters.

Numerous previous devices by the inventors can be improved by using the achromatic compound retarder of this invention. In the polarization interference filters of U.S. Pat. Nos. 5,132,826, 5,243,455 and 5,231,521, all of which are herein incorporated by reference in their entirety, a smectic liquid crystal rotatable retarder and a passive birefringent element are positioned between a pair of polarizers. In a preferred embodiment, the birefringent element is oriented at $\pi/4$ with respect to a polarizer.

In the split-element polarization interference filters of U.S. Pat. No. 5,528,393, which is herein incorporated by reference in its entirety, a center retarder unit and a pair of split-element retarder units are positioned between a pair of polarizers. The retarder units can include a rotatable liquid crystal retarder. The individual liquid crystal rotatable retarders of the above-mentioned polarization interference filters can be replaced with the achromatic compound retarders of the present invention.

The liquid crystal handedness switch and color filters described in U.S. Pat. No. 5,619,355, which is herein incorporated by reference in its entirety, can also be improved by using the achromatic compound retarders of the present invention. The circular polarization handedness switch and the linear polarization switch comprise a linear polarizer and a rotatable liquid crystal retarder. The color filters use the polarization switch in combination with a color polarizer, such as a cholesteric circular polarizer or a pleochroic linear polarizer. The simple liquid crystal rotatable retarders described in the handedness switch patent can be replaced with the achromatic compound retarders of the present invention.

The achromatic compound retarder can also be used to improve other color filters known in the art, for example as described in Handschy et al., U.S. Pat. 5,347,378, which is herein incorporated by reference in its entirety. These color filters comprise a linear polarizer and a rotatable liquid crystal retarder. In some embodiments, they further comprise pleochroic polarizers, and in other embodiments they further comprise a second linear polarizer and a passive birefringent element. The simple liquid crystal rotatable retarder of the Handschy et al. invention can be replaced with the achromatic compound retarders of the present invention.

The color filters of this invention can be temporally multiplexed, wherein the output color is switched on a timescale which is rapid compared to a slow response time detector, such as the human eye. The achromatic compound retarder of FIG. 2a, employing a smectic liquid crystal cell, is particularly suited to this application.

The criterion for replacing a single retarder with the achromatic compound retarder of this invention is that the single retarder must be rotatable between two or more orientations of the optic axis. The achromatic compound retarder is especially suited for use in devices wherein it is positioned adjacent to a linear polarizer and wherein the orientation of the retarder is, in one of its switching states, parallel to the linear polarizer. The achromaticity of the compound retarder is particularly advantageous in color filtering devices because it can increase the throughput across the entire visible spectrum.

The achromatic compound retarder of this invention can also be used in optical devices to replace a pair of variable retarders in which the first and second variable retarders have first and second fixed orientations, and have retardances switchable between first and second valves, and wherein the retardances are synchronously switched between opposite valves. In addition, since the achromatic half-wave retarder can be used to rotate the orientation of linearly polarized light, it can replace twisted nematic cells in optical devices.

Figure 14:
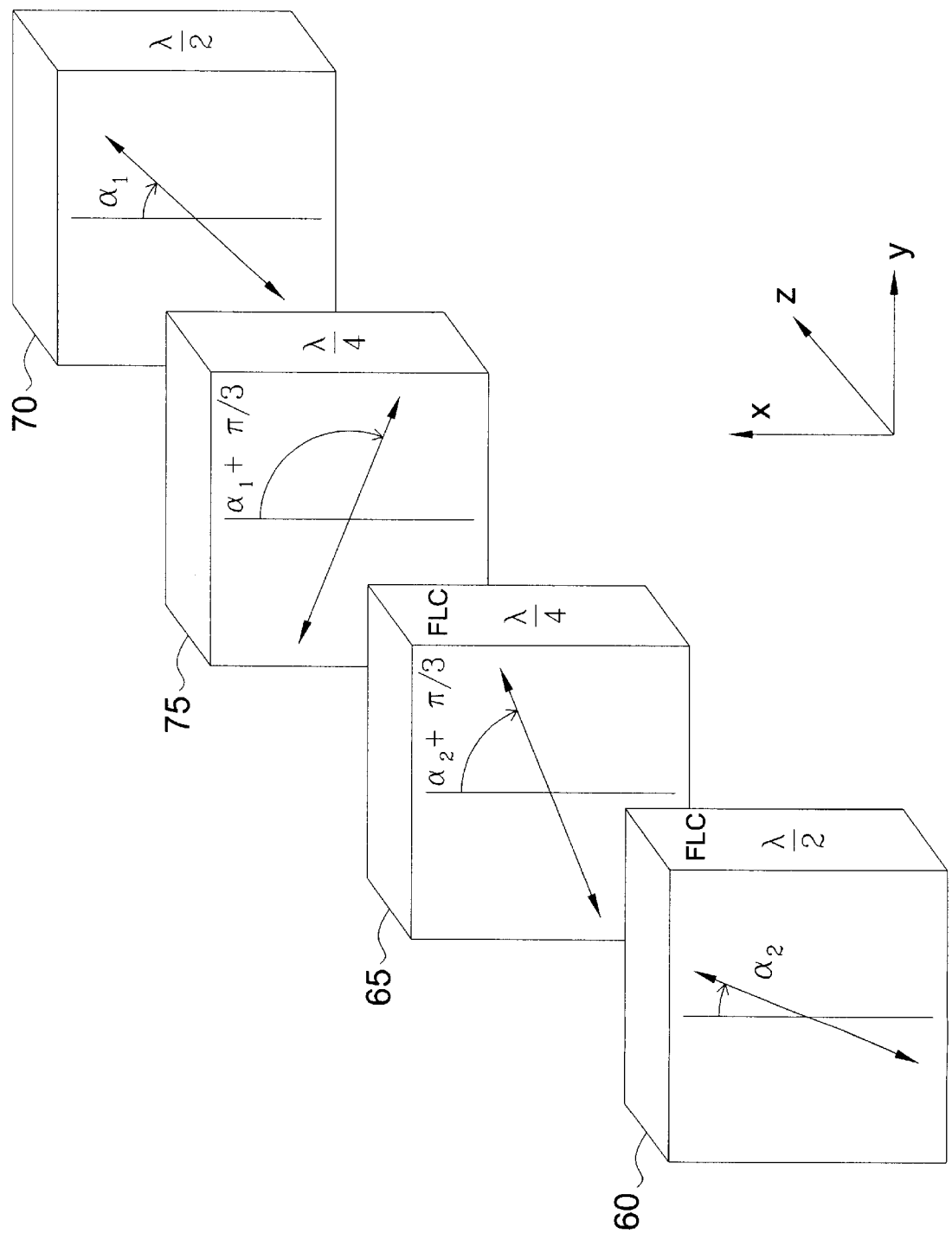
FIG. 14 is a compound achromatic variable retarder comprising a pair of liquid crystal retarders and a pair of passive retarders, in accordance with the present invention.

In addition to the achromatic compound retarder, this invention provides an achromatic variable retarder, illustrated in FIG. 14. An active section comprises smectic liquid crystal half-wave retarder 60, oriented at $\alpha_2$, and smectic liquid crystal quarter-wave retarder 65, oriented at $\alpha_2+\pi/3$. Angle $\alpha_2$ of retarders 60 and 65 is electronically tuned, preferably synchronously. A passive section comprises passive quarter-wave retarder 75, oriented at $\alpha_1+\pi/3$, and passive half-wave retarder 70, oriented at $\alpha_1$. Angle $\alpha_1$ is fixed. The angle $\alpha_2$ of the liquid crystal retarder orientation can be rotated discreetly or continuously to at least one other angle $\alpha_2'$. The retardance of the compound structure is $2(\pi/2-\alpha_2+\alpha_1)$.

The achromatic compound retarders of the present invention can be used to provide an achromatic inverter for an FLC display. FLCs are generally binary electro-optic devices that are operated in a one-bit mode, where (relative to the input polarizer) a 0° orientation results in an off state (a black state) and a 45° orientation results in an on state (a white state).

Due to the ionic impurities in liquid crystal materials, LCDs are operated with zero net DC voltage drive schemes. This is particularly important when making active matrix displays using chiral smectic liquid crystals, such as FLC on silicon, as they are generally two orders of magnitude less pure than their active matrix compatible nematic counterparts. This means that if a positive voltage is applied to the LC, then a voltage of equal and opposite polarity must be applied, preferably immediately following, and generally for the same amount of time. This is called "DC balancing" the waveforms across the LC.

The problem with DC balancing an active matrix FLC display is that, unlike a nematic LC, FLC's respond to the polarity of applied voltage. That is, the optic axis rotates in-plane by twice the molecular tilt angle, when the sign of an electric field applied normally is reversed. When illuminated with polarized light, the two optical frames will appear contrast reversed. What is white becomes black and vice versa. In order to visually observe the displayed data effectively, the inverse frame must be blanked (lamp turned off, or modulated with a shutter to emit no light) resulting in loss of light through the optical system. For some applications, such as head mounted displays, losses in brightness are more tolerable than, for example, front data projection or rear projection systems for computer monitors and televison systems, where brightness is important.

Prior art inverters for FLC displays are single pixel FLC devices that can be crossed with respect to the FLC display panel. This method allows the display to recover light from the inverse frame because inverting the voltages on both the FLC display panel and the FLC inverter cell yields the same image. Prior art inverter/FLC display panel combinations are limited by the fact that both the FLC display panel and inverter are chromatic devices.

Figure 15A:
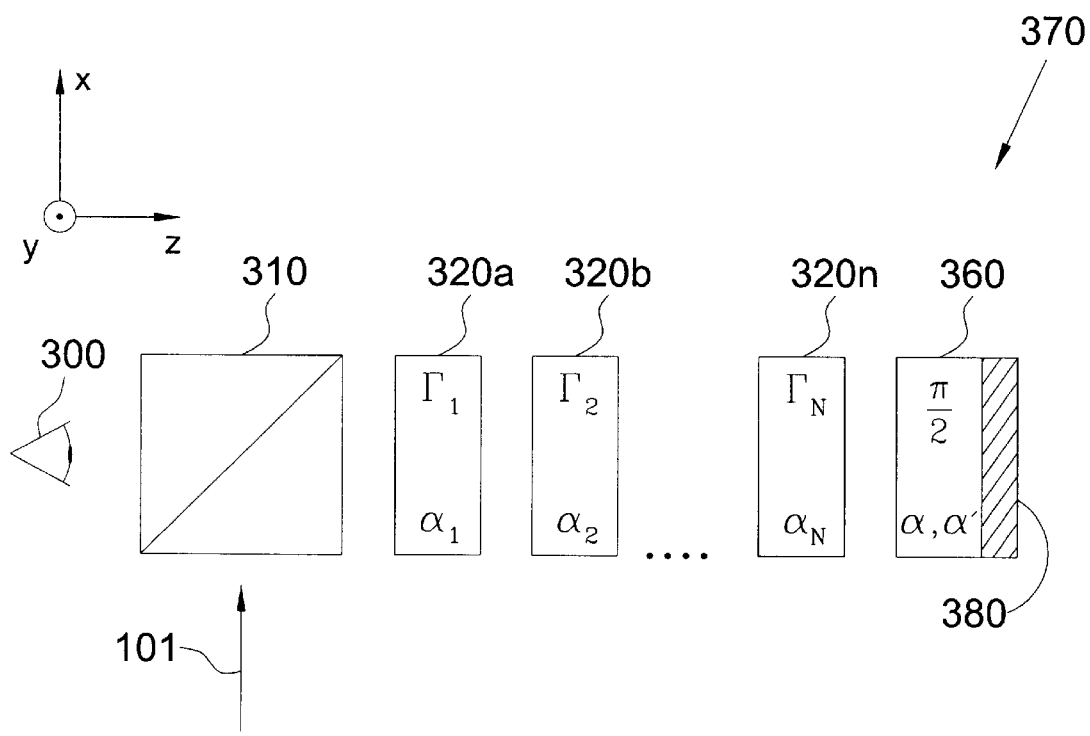
FIG. 15(a) shows an arrangement of a general reflective display according to the invention.

FIG. 15(a) shows an arrangement of a general reflective display according to the invention. In particular, the reflective display of FIG. 15(a) comprises a stack of single-pixel retarder devices 320a–n with in-plane retardances $\Gamma_1$–$\Gamma_N$ and in-line orientations $\alpha_1$–$\alpha_N$, at least one of which may be active, sandwiched between a polarizing beam splitter (PBS) 310 and a FLC display panel (LCD panel) 370 comprising a FLC retarder 360 with mirror 380. The LCD panel 370 may comprise, for example, an FLC retarder 360 sandwiched between a transparent electrode (not shown) and pixellated mirror electrodes (not shown) for applying voltages across the FLC retarder 360, similar to the arrangement shown in FIG. 19(a). The display is illuminated by white light 101 and the viewer is represented by an eye 300.

Figure 15B:
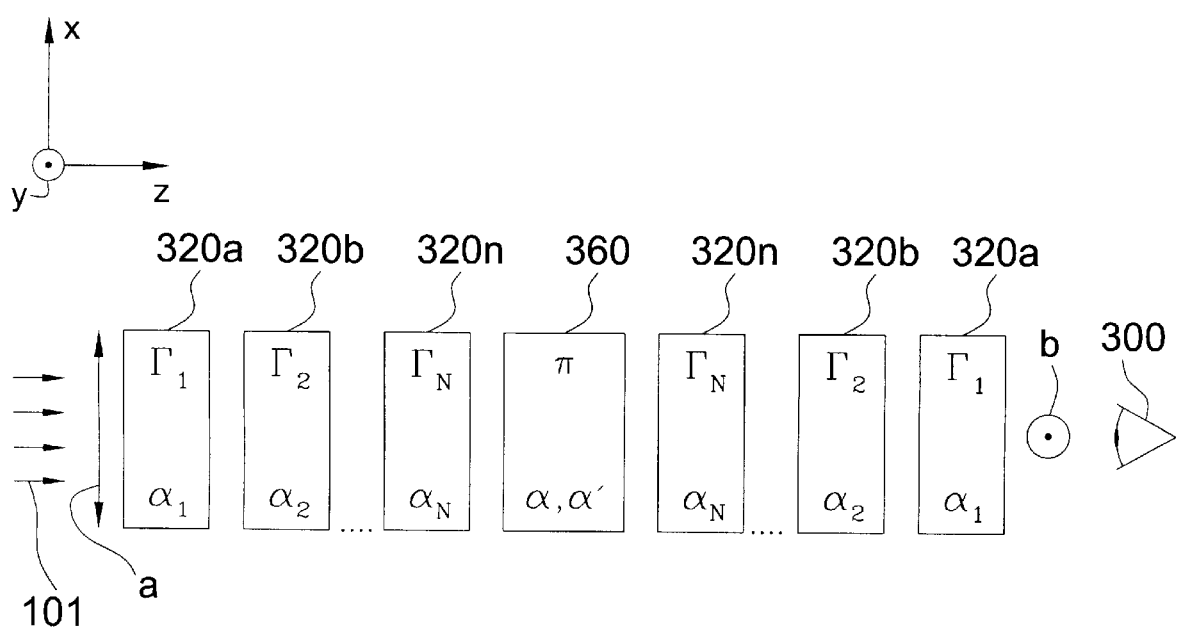
FIG. 15(b) shows an unfolded revision of the reflective display of FIG. 15(a)

To more clearly illustrate the path light takes through the display of FIG. 15(a) an "unfolded" version of the display is shown in FIG. 15(b). The arrows a and b show the direction of polarization of the input and output light, respectively.

The following is a hierarchy of structures that fall within the general case shown in FIGS. 15(a) and 15(b):

(1) N=0: A standard FLC panel with no inverter, previously discussed in this application.

(2) N=1: A standard FLC display panel with the addition of a passive retarder, as previously discussed in this application. This type of structure still has two logic states but a compound retarder is used to achromatize the on-state.

(3) N=1: A standard FLC display panel with the addition of an active retarder. This is the simplest structure that can implement an inverter according to the invention. There are solutions using either a nematic or a smectic single pixel device, as will be discussed below.

(4) N≧2: A standard FLC display panel with one active and one or more passive retarders. This structure improves the overall performance of the display device relative to the structure of case (3). This structure can have improved contrast ratio, reduce flicker, or both.

A few assumptions are made about the various systems. First, the display of FIG. 15(a) is a reflective (two pass) device. The in-plane orientation of the molecular director of the FLC retarder 360 rotates when the polarity of applied voltage is switched. The in-plane retardance is identical in both states and the FLC retarder 360 has linear eigenstates (no twist). From this, we conclude that optimum performance is achieved when the LC retarder 360 has a quarter-wave retardation in a single pass (half-wave in a round trip), and the in-plane switching angle is $\pi/4$. Designs are generated assuming this preferred arrangement, though it is understood that a suitable adjustment in design can be made for non-ideal FLC behavior.

The LCD panel 370 is preferably a chiral smectic liquid crystal (CSLC) spatial light modulator or display. For example, classes of CSLCs that can be used include SMA*, SMC* including ferroelectric displays currently being commercialized by Displaytech, Inc., and distorted helix ferroelectric displays.

In order to implement the inverter, two on-states and two OFF-states are required (four logic states) given by an auxiliary single-pixel switch. The single-pixel switch can either be a nematic liquid crystal (NLC) or smectic (FLC) device.

For example, the single-pixel switch can be an electronically controlled birefringence (ECB) cell, a pi-cell, a hybrid aligned nematic cell, a vertically aligned nematic cell or another LC device that allows switching between a non-zero retardance and zero retardance. A NLC behaves as a zero-twist retarder in the low-voltage state, and becomes isotropic (vanishes) in the driven state. The term "vanishes", as used herein, refers to a retarder state in which the polarization of input light is not affected. Thus, the retarder is effectively not seen by the input light (i.e., vanishes). Note that a double nematic (crossed cell) solution is identical in design to a single nematic solution. The second cell improves switching speed, but the combination can be considered a single zero-twist retarder in any voltage state. Because a nematic cell vanishes in the driven state, the scheme in general modulates between structures with N values that differ by unity.

The single-pixel FLC device switch is also taken to behave as an in-plane switch, as described above. The tilt angle and retardance can in principle be selected to accommodate the design. Unlike nematic solutions, FLC solutions modulate between structures with a fixed N value, because the in-plane retardance is fixed. The only exceptions are designs in which the FLC is made to mimic the behavior of a nematic. That is, the FLC device switch is directly adjacent to the polarizer oriented along an eigenstate in one voltage state. Therefore, FLC solutions can either have a fixed N value, or modulate between solutions that differ by unity.

As discussed above, structures with NLC switches modulate between structures that differ in N value by unity. Let M (2N+1) represent the total number of retarders required in the unfolded structure. First, consider the requirements placed on the structure with the lower N value (NLC driven to high state). When no passive retarders are used, the design reduces to the N=0 case. The LCD panel optimally modulates between an OFF-state orientation of 0 ($\pi/2$) and on-state orientations of $\pm\pi/4$, as shown in FIG. 16. The OFF-state has unlimited contrast ratio in theory, while the on-state is given by a zero-order half-wave plate.

Given this configuration, the insertion of the nematic waveplate (by driving the NLC to the low state) produces the additional states. The NLC orientation is preferably selected to maximize the contrast ratio of the OFF-state. The angle between the NLC retarder and the FLC retarder (in the LCD panel) in this state is $\Delta'=67.5°$, per the M=1 requirements, which limits the wavelength stability of the optic axis. The chrominance of the on-state is fixed by the OFF-state requirements. For this case, the on state is less chromatic than an LCD panel alone. The M=3 structure is a compound retarder with compound optic axis switchable by the NLC only. This design methodology can be extended to include modulation between higher order structures. When a NLC is used in combination with a passive half-wave retarder (N=2) it is possible to modulate between M=3 and M=5 structures. The passive retarder can be placed either between the PBS and the NLC, or between the NLC and the LCD panel.

First, consider the M=3 structure (NLC driven high). The symmetric structure forms a compound retarder, with compound retardation determined by the retardation of the passive retarder. Regardless of the passive retardation selected, orientations can be selected for an OFF-state corresponding to an eigenstate of the structure. Given this flexibility, one preferred on-state has maximum transmission throughout the visible spectrum, as previously described in this application. This requires that the compound retarder is an achromatic half-wave plate, which requires that the passive retarder is also a half-wave plate. The OFF-state is obtained as an eigenstate of the compound retarder, which is produced by reorienting the optic axis of the NLC only.

Using this M=3 optimization, the passive retarder is oriented at 15° and the FLC rotates between orientations of 75° and 120°. What remains is to select the FLC retardance and orientation.

The higher order structure can also be considered a half-wave compound retarder, as required to optimize on-state transmission. This forces the NLC to provide a half-wave of retardation. The NLC must be used to determine the orientation of the M=5 compound retarder optic axis. With the LCD panel oriented at 75°, the NLC must generate an OFF-state, which is done by orienting an eigen-polarization of the compound retarder along the polarization of the input light.

With the NLC placed between the PBS and the passive retarder, the highest density OFF-state occurs with the NLC optic axis oriented at −67.5%. This M=5 OFF-state has significantly better wavelength stability than the previous M=3 OFF-state. Furthermore, the M=3 OFF-state of the present design is also significantly more wavelength stable than the previous M=3 example.

With the NLC placed between the passive retarder and the LCD panel, the process can be repeated. The highest density OFF-state is obtained with the NLC optic axis oriented at −83°. It should be noted that the wavelength stability of the OFF-state is better for the previous M=3 example.

The NLC switch design approach, according to the invention, for modulating between M=3 and M=5 is discussed below. Again, the performance of the M=3 structure is considered first for the case where the NLC switch is modeled as an in-plane switch with a 45° rotation angle. We are free to select $\Delta$, the angle between the passive retarder and the optic axis of the FLC in the LCD panel that generates the OFF-state. The optimum optic axis stability occurs when $\Delta=90°$, where the structure degenerates to a single zero-order half-wave plate. This forces the outside retarder(s) to be oriented along the input polarization, the on-state being generated by the FLC retarder in the LCD panel alone. This is not the most achromatic structure for retardance, which occurs for $\Delta=60°$. However, the optic axis stability, and therefore the contrast ratio, degrades for any $\Delta$ either greater or less than 90°. Therefore, one must balance the contrast ratio against the on-state chrominance. For the inverter where we modulate between M=3 and M=5 on-states, we also balance on-state spectra for the purpose of minimizing luminance modulation between true and inverse frames.

For a particular passive half-wave orientation, there is an FLC orientation of the FLC retarder in the LCD panel that produces an OFF-state (an eignepolarization of the M=3 structure). When the FLC retarder in the LCD panel is switched by 45°, the on-state is generated. This on-state is somewhat less chromatic than a zero-order half-wave, but greater weight is assigned to maximizing contrast and balancing transmission with the M=5 on-state. FIG. 17 shows that when the passive retarder is oriented at 7.5°, the FLC switch rotates between 60° (ON), and 105° (OFF). When the NLC switch is inserted between the PBS and the passive retarder at −67.5°, the output is effectively inverted. Note that this angle is consistently used, regardless of the details of the M=3 design (it was also used in the design that modulated between M=1 and M=3 structures). This angle is used because the M=3 structure is in general a compound retarder with an optic axis either along the input polarization, or at 45° to the input polarization. As such, the requirement for inverting the output is that the outside retarder apply an additional 45° change in orientation. In addition, the specific angle is selected such that the chrominance of the NLC compensates for the chrominance of the compound retarder. This is particularly important for achieving stability of the optic axis in the M=5 OFF-state.

The performance is given in FIG. 18 for half-wave retarders centered at 500 nm, where the dispersion of polycarbonate is used for all elements. The effects of dispersion, as well as non-ideal tilt angles, require small adjustments to the angles. However, the design methodology still applies. FIG. 18 shows that the M=5 structure produces an OFF-state transmission of <−27 db, while the M=3 OFF-state has <−46 db transmission (theoretical). In another optimization, these OFF-state leakages could be balanced.

This particular example has the desirable characteristic that on-state and OFF-state transmission spectra are nearly identical. The adjustment of the M=3 structure sacrifices some of the potential achromatic behavior in order to improve the M=5 spectrum.

Mathematically, the methodology can be summarized as follows:
1) $\alpha_2$: Select to control chrominance (typically 5°–15°)
2) $\alpha'=90°+2\alpha_2$
3) $\alpha=\alpha'-45°$ (or twice the tilt angle of the FLC retarder in the LCD panel if less than 45°)
4) $\alpha_1=67.5°$ (or the tilt angle of the FLC retarder $-90°$ if less than 22.5°)

Figure 19A:
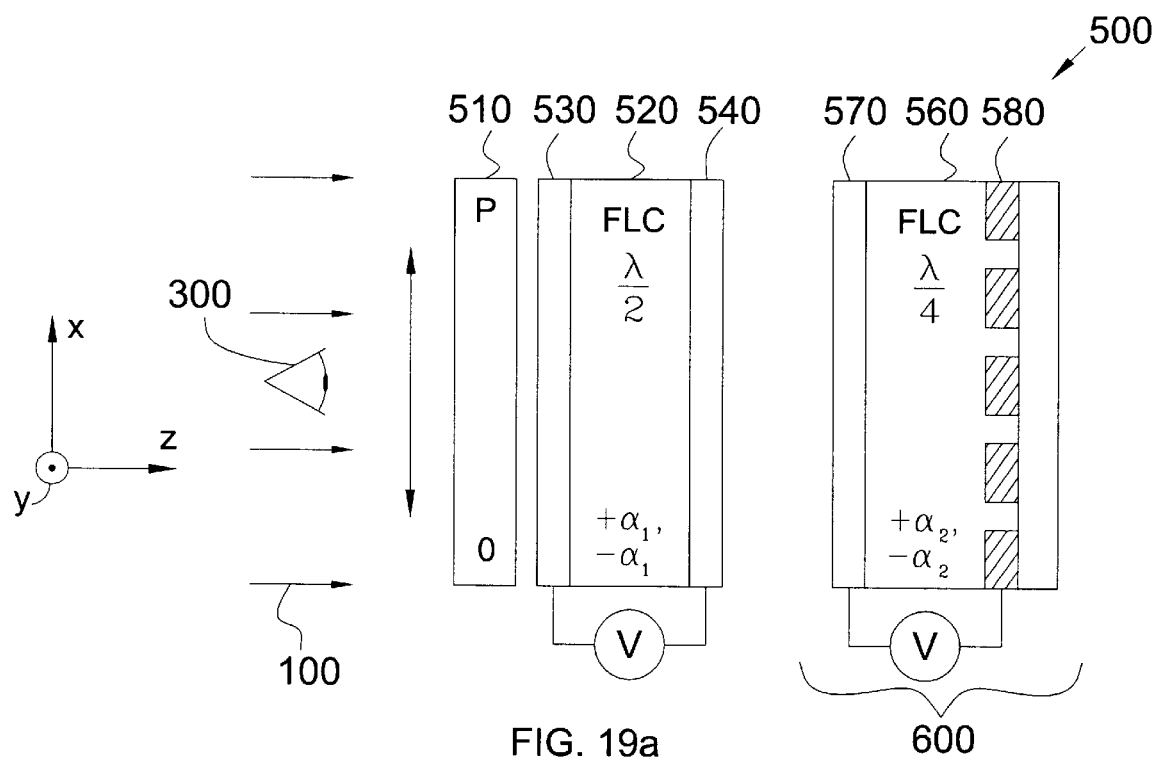
FIG. 19(a) illustrates a first embodiment of a reflection-mode achromatic FLC display that includes an achromatic inverter, in accordance with the present invention.
Figure 19B:
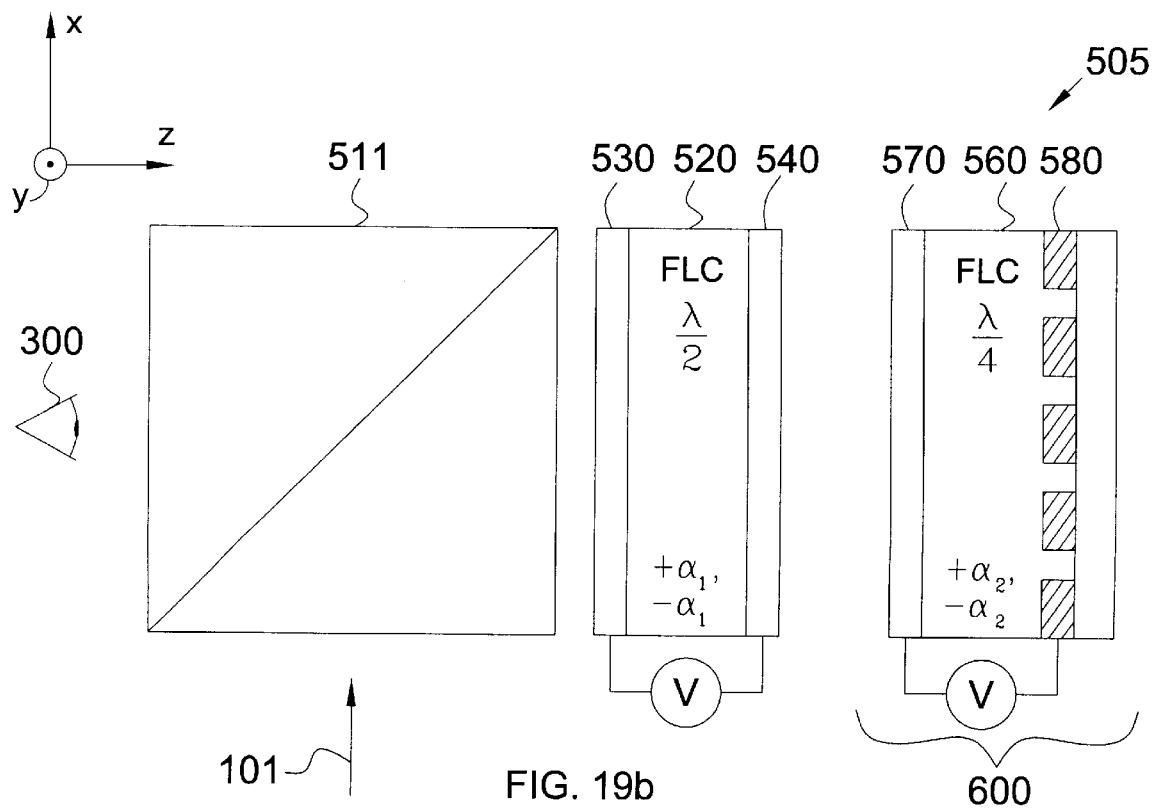
FIG. 19(b) illustrates a second embodiment of a reflection-mode achromatic FLC display that includes an achromatic inverter, in accordance with the present invention.

If the tilt angle of the FLC retarder in the LCD panel is less than 22.5°, for instance 18.6°, we have $\alpha=\alpha'-37.2°$. For this example, if we choose $\alpha_2=6.5°$ to balance the ON-state spectra, the resulting design is:
$\alpha_2$: 6.5°
$\alpha'$: 103°
$\alpha$: 65.8°
$\alpha_1=71.4°$ FIGS. 19(a) and 19(b) show specific configurations, of a reflective achromatic display that utilizes an achromatic inverter implemented with a compound retarder switch according to the invention. The reflective display 500 of FIG. 19(a) comprises a linear polarizer 510; an actively controlled liquid crystal (FLC) retarder 520 (switch), preferably a half-wave plate; transparent substrates containing electrodes 530 and 540 for applying a voltage across the FLC retarder 520; an FLC retarder 560, preferably a quarter-wave plate; and a transparent substrate containing electrode 570 and a transparent substrate containing pixellated mirror electrodes 580 for applying voltages across the FLC retarder 560 in accordance with image data. The transparent substrate containing electrode 570, the transparent substrate containing pixellated mirror electrodes 580 and FLC retarder 560 collectively make up an LCD panel 600.

In the embodiment of FIG. 19(a), the linear polarizer 510 is oriented at 0°. Since, in reflection-mode, polarizer 510 is both the input and output polarizer, this embodiment is a parallel polarizer embodiment. The display 500 is illuminated by ambient light 100 and the viewer is represented by an eye 300. The LCD panel 600 modulates the input light 100 in accordance with image data.

In the reflective display 505 of FIG. 19(b), the linear polarizer 510 is replaced with a polarizing beamsplitter 511, which is used as both an input polarizer and an output polarizer for the display 505. The polarizing beamsplitter 511 is illuminated by white light 101, reflects light having a first polarization and transmits light having a second polarization that is orthogonal to the first polarization. Thus, the embodiment of FIG. 19(b) is a crossed polarizer embodiment. In the embodiments of FIGS. 19(a) and 19(b), the achromatic display is formed by the LCD panel 600 in combination with the actively controlled FLC retarder 520 (switch), which functions as an achromatic inverter.

The FLC retarder 520 has an orientation that is electronically switchable between at least two orientations, $+\alpha_1$ and $-\alpha_1$, by applying a voltage across the FLC retarder 520 with electrodes 530 and 540. The FLC retarder 560 has an orientation that is electronically switchable between at least two orientations $+\alpha_2$ and $-\alpha_2$. The orientation of sections or "pixels" of the FLC retarder 560 can be independently switched by applying voltages to a corresponding pixel in the pixellated mirror electrode 580. Thus, the LCD display 600 polarization modulates the input light 100 and 101 in accordance with image data that drives the electrodes 570 and 580.

Because the embodiments of FIGS. 19(a) and 19(b) are reflective, the light 100 and 101 makes two passes through the FLC retarder 520 and the FLC retarder 560. The retardances provided by the FLC retarder 520 and the FLC retarder 560 at the design wavelength are preferably chosen so that the retardance provided by the FLC retarder 560 after two passes is approximately half the retardance provided by the FLC retarder 520 after two passes. In the embodiments of FIGS. 19(a) and 19(b), the FLC retarder 520 preferably provides a half-wave retardance at the design wavelength for a single pass (full-wave for two passes), and the FLC retarder 560 preferably provides a quarter-wave retardance at the design wavelength for a single pass (half-wave for two passes).

In smectic liquid crystals, the angle between the liquid crystal layer normal and the molecular director is generally referred to as the tilt angle $\theta$ of the liquid crystal. FLCs, which are a class of smectic liquid crystals, are typically bistable in that the molecular director (the liquid crystal orientation) can be switched between $+\theta$ and $-\theta$ either side of the brushing direction.

In the embodiment of FIG. 19(b), the FLC retarder 520 and the FLC retarder 560 are preferably positioned so that the rubbing direction of the liquid crystals that make up the FLC retarder 520 is orthogonal to the rubbing direction of the liquid crystals that make up the FLC retarder 560. Further, the FLC retarder 520 is preferably positioned so that its rubbing direction is parallel or perpendicular to the polarization direction of the input light 101, which is the x-axis direction in the embodiment of FIG. 19(b).

In order to optimize the contrast ratio of the display, the tilt angle of the FLC retarder 560 ($\theta_2$) is preferably approximately twice the tilt angle of the FLC retarder 520 ($\theta_1$) in the embodiment if FIG. 19(b). In addition, the achromaticity of the FLC display is preferably optimized, while maintaining a symmetric switching arrangement. In view of these preferences, the FLC retarder 560 tilt angle ($\theta_2$) is preferably chosen to be approximately 22.5°, and the FLC retarder 520 tilt angle ($\theta_1$) is preferably chosen to be approximately 11.25° in the embodiment of FIG. 19(b).

The operation of the achromatic inverter (the FLC retarder 520) in conjunction with the FLC retarder 560 will now be explained in connection with the embodiment of FIG. 19(b). As explained above, orientation angles are given with respect to an arbitrary "x" axis. Because the rubbing direction of the FLC retarder 520 is parallel to the x-axis in the embodiment of FIG. 19(b), $+\alpha_1$ is equal to $+\theta_1$ (approximately 11.25°) and $-\alpha_1$ is equal to $-\theta_1$ (approximately $-11.25°$). However, because the rubbing direction of the FLC retarder 560 is perpendicular to the x-axis, $+\alpha_2$ is equal to approximately $90°-\theta_2$ (approximately 67.5°) and $-\alpha_2$ is equal to $90°+\theta_2$ (approximately 112.5°, which is equivalent to $-67.5°$).

FIG. 20 is a table that shows the output of one pixel of the display 505 of FIG. 19(b) for different orientations of the FLC retarder 520 and the FLC retarder 560. As shown in FIG. 20, when the sign of the orientation angle of the FLC retarder 560 is changed in order to drive the FLC retarder 560 with the inverse frame, the output of the display can remain the same by simultaneously changing the sign of the orientation angle of the FLC retarder 520.

In the embodiment of FIG. 19(b), the orientations of the FLC retarder 520 and the FLC retarder 560 are set to approximately +11.25° and approximately +67.5°, respectively, to obtain an achromatic white state. The pixel of the FLC retarder 560 is driven with the inverse image frame by adjusting the pixel driving voltage. This reverses the polarity of the orientation angle of the FLC retarder 560 (e.g., switches the orientation to approximately −67.5°). When the pixel of the FLC retarder 560 is driven with the inverse frame, the voltage driving the FLC retarder 520 is adjusted to switch the orientation of the FLC retarder 520 to approximately −11.25°, so that the output of the LC display 505 remains an achromatic white state. This allows the inverse frame to be viewed.

Similarly, the orientations of the FLC retarder 520 and the FLC retarder 560 are set to approximately +11.25° and approximately −67.5°, respectively, to obtain a high contrast black state. When the polarity of a pixel driving the FLC retarder 560 is reversed (by setting the orientation to approximately +67.5°) to drive that portion of the FLC retarder 560 with the inverse frame, the orientation of the FLC retarder 520 is switched to approximately −11.25° so that the output of the display 505 remains a high contrast black state.

Figure 21:
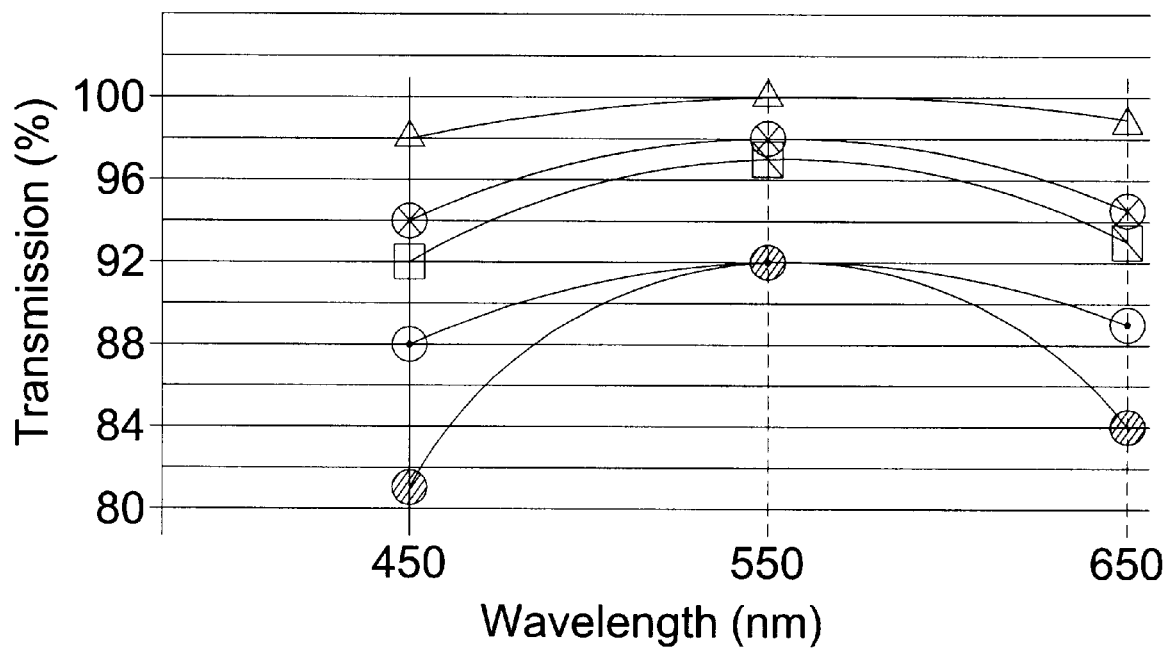
FIG. 21 is a plot of the optical transmission of the FLC display of FIG. 19(b) in the on-state as a function of wavelength for different tilt angle combinations.

As discussed above, the tilt angles of the FLC retarder 520 and the FLC retarder 560 are preferably chosen to optimize the achromaticity of the display 505, while maintaining a symmetric switching arrangement. FIG. 21, which is a plot of the optical transmission of the display 505 of FIG. 19(*b*) in the ON-state as a function of wavelength for different tilt angle combinations, illustrates why a tilt angle of approximately 22.5° is preferred for the FLC retarder 560 and a tilt angle of approximately 11.25° is preferred for the FLC retarder 520. As is shown, the best achromaticity is obtained when $\theta_1 = 22.5°$ and $\theta_2 = 11.25°$.

Figure 22:
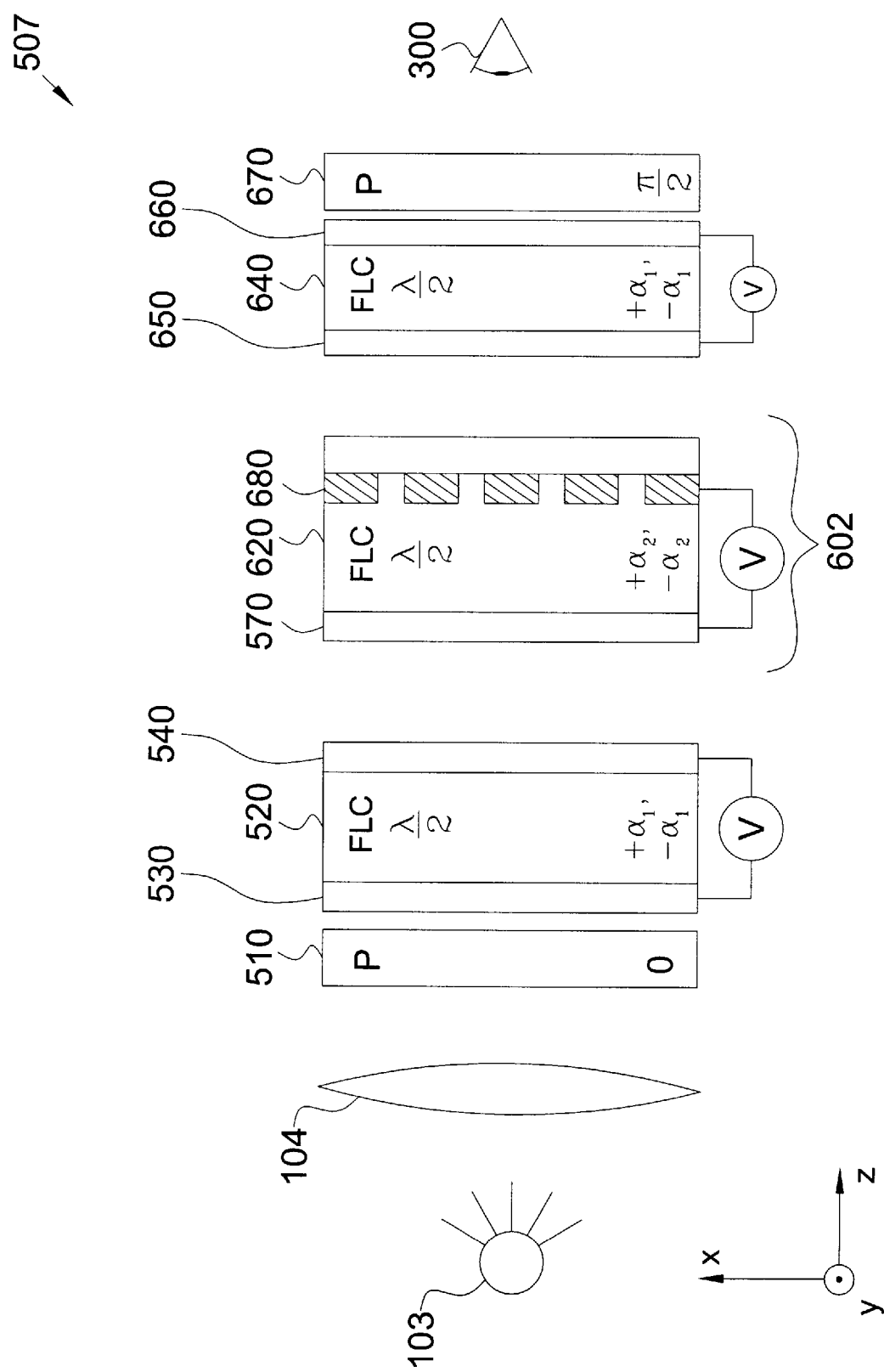
FIG. 22 illustrates a transmission-mode achromatic FLC display that includes an achromatic inverter, in accordance with the present invention.

A transmission-mode achromatic display 507 is shown in FIG. 22. The transmissive display 507 is similar to the reflective displays, except that an FLC retarder 620, that preferably provides a half-wave of retardance at the design wavelength, is used because the input light only undergoes a single pass through the FLC retarder 620. In addition, a transparent substrate containing a transmissive pixellated electrode 630 is used with the FLC retarder 620, instead of a reflective electrode. The transparent substrate containing electrode 570, transparent substrate containing transmissive pixellated electrode 630, and FLC retarder 620 collectively make up a transmissive LCD panel 602.

Because the input light passes through the FLC retarder 620, a second FLC retarder 640 that preferably provides a half-wave of retardance at the design wavelength is positioned after the FLC retarder 620. The transparent substrates containing electrodes 650 and 660 are used to apply a voltage across the second FLC retarder 640. An output polarizer 670 is positioned to analyze the output light. In the embodiment of FIG. 22, the input and output polarizers 510 and 670 are crossed. The display 507 is illuminated by a light source 103, which can be collimated by lens 104. Alternative materials such as diffusers or light control films can also be inserted between the light source 103 and the display 507. The display 507 is viewed in transmission mode.

In the transmissive display 507 of FIG. 22, the first and second FLC retarders 520 and 640 operate together as the achromatic inverter for the display 507. Thus, the orientations of FLC retarders 520 and 640 are simultaneously switched to allow viewing of the inverse frame.

In the embodiments of FIGS. 19(*a*), 19(*b*) and 22, the FLC retarder and the FLC retarder are implemented with FLCs. However, they can also be implemented with any other material that has an electronically rotatable optic axis, including planar-aligned SmC* or SmA* liquid crystals, as well as distorted helix ferroelectric (DHF), antiferroelectric, and achiral ferroelectric liquid crystals. In addition, the FLC retarder can also be implemented with two retarders that have fixed orientations and retardances that are electronically switchable between 0 and half-wave.

The achromatic inverter of the present invention can also be implemented with a nematic liquid crystal variable retarder, such as an electrically controlled birefringence (ECB) cell, pi-cell, hybrid aligned nematic cell, vertically aligned nematic cell, or any other liquid crystal device that allows switching between a non-zero retardance, and zero retardance. Such a device is low in cost and easily manufacturable. Examples of such devices are shown in FIGS. 23(*a*)–(*b*).

Figure 23A:
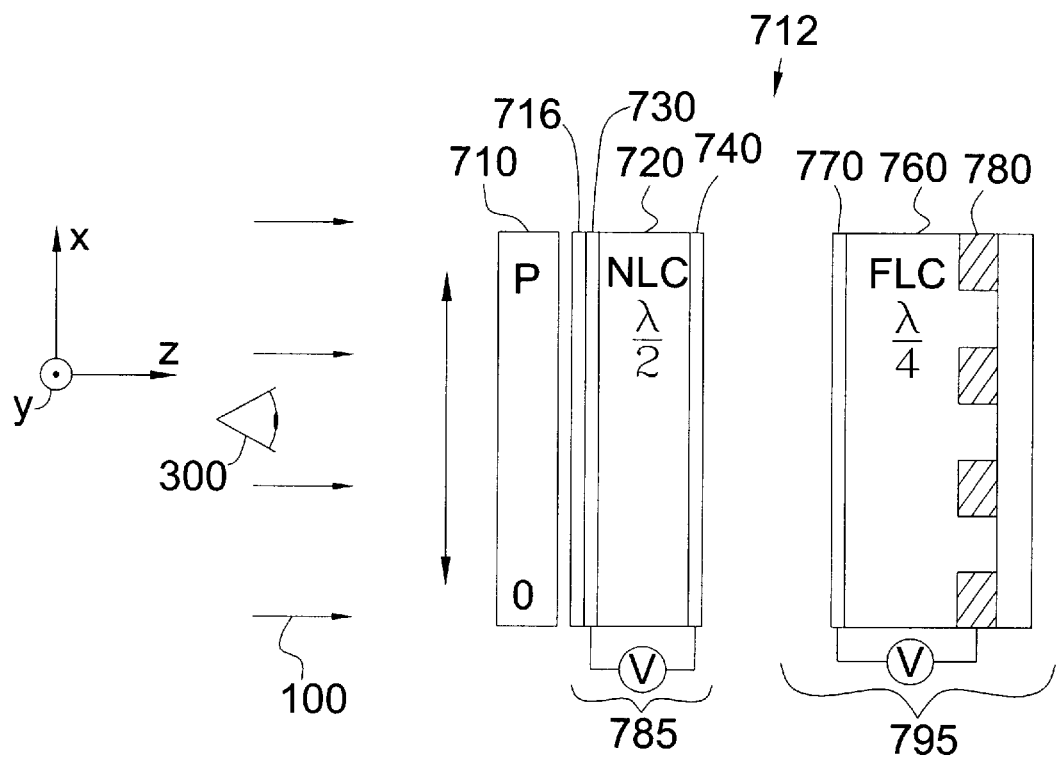
FIGS. 23(a) and 23(b) show optical inverters according to the invention implemented with a nematic liquid crystal variable retarder.
Figure 23B:
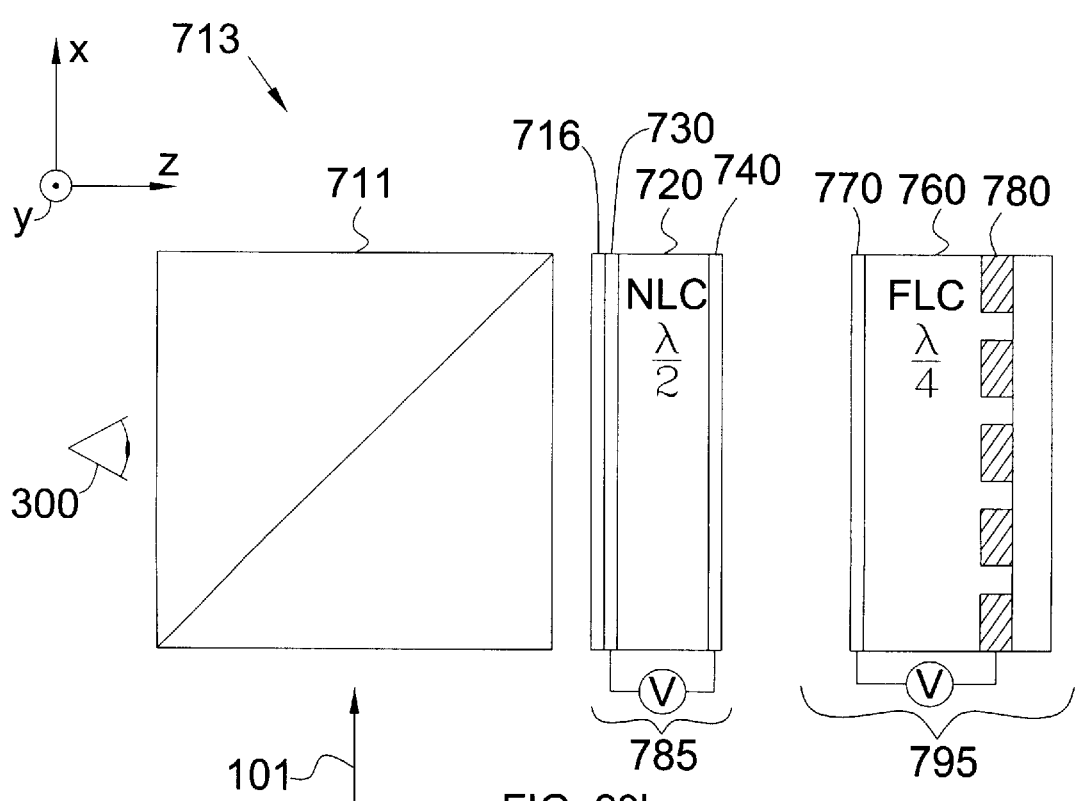

The reflective display 712 of FIG. 23(*a*) comprises a linear polarizer 710; an in-line compensator, or shim 716; a switchable nematic liquid crystal (NLC) device 720 (single pixel device); transparent substrates containing electrodes 730, 740; a FLC retarder 760, preferably a quarter-wave plate; and a transparent substrate containing electrode 770 and a transparent substrate containing pixellated mirror electrodes 780 for applying voltages across the FLC retarder 760 in accordance with image data. The transparent substrate containing electrode 770, the transparent substrate containing pixellated mirror electrode 780 and the FLC retarder 760 collectively make up a reflective LCD panel 795. The compensator 716, the NLC 720 and the transparent substrates containing electrodes 730 and 740 collectively make up a NLC switch 785.

The display is illuminated by ambient light 100 and the viewer is represented by an eye 300. In the embodiment of FIG. 23(*b*), the linear polarizer 710 is replaced with a polarizing beamsplitter 711, which is used both as an input polarizer and an output polarizer for the display 713. The polarizing beamsplitter 711 is illuminated by white light 101, reflects light having a first polarization and transmits light having a second polarization that is orthogonal to the first polarization. Thus, the embodiment of FIG. 23(*b*) is a crossed polarizer embodiment.

The NLC 720 is preferably a half-wave plate in the visible part of the spectrum, and is preferably oriented at approximately −67.5° to the incident polarized light. The optical axis of the FLC retarder 760 is preferably switched between two states, one that is parallel to the incident polarization, and one that is approximately +45° to the incident polarized light (or twice the tilt angle when the tilt angle is approximately 22.5 degrees, as is common for SmC* ferroelectric materials).

The structure operates as follows. During the normal view frame, the NLC device 785 is "energized" (maximum voltage is applied to the NLC 720 resulting in zero or near zero retardance, and it is, ideally, as if the retarder has vanished). Incident polarized light sees one of two states at the FLC retarder 760, optic axis oriented parallel or at approximately 45° to the direction of incident polarization. The parallel orientation results in no net rotation of polarization. When viewed in a crossed polarization configuration (such as through beamsplitter 711 in the embodiment of FIG. 23(*b*)) pixels in this state appear black. Pixels with optic axis oriented at approximately 45° to the incident polarization undergo approximately 90° rotation of polarized light, which is transmitted by the crossed polarizer (beamsplitter 711) and these pixels appear white. As discussed below, a single passive retarder film can be placed between the NLC device and the LCD panel 795 to make the LCD panel 795 appear like a half-wave plate in reflection for all wavelengths in the visible spectrum (i.e. an achromatic compound retarder).

Now, when opposite voltages are applied to the LCD panel 795 during the inverse frame (for DC balancing the LCD panel 795), the NLC device 785 is not energized such that it provides a half-wave of retardance (ideally achromatic but in practice this is difficult to do, so preferably half-wave at approximately 500 nm). Incident polarized light sees the half-wave NLC 720, and its polarization is rotated by approximately a net 135° or +45°. This new polarization state sees the inverted ON pixel optic axes in the LCD panel 795 oriented at approximately 0° to the original polarization direction, and hence is rotated by approximately a net 90° to +45°. The reflected polarized light now makes a net angle of approximately 67.5° with the NLC 720, and rotates by approximately twice 67.5° or to −90° with respect to the original polarization state of the incident light, and is transmitted by the crossed polarizer (beamsplitter 711) and again appears as an ON pixel with the correct optical polarity.

Inverted OFF pixels have optic axis orientations during the DC balanced frame at approximately +45° relative to the original state of polarization of the incident light. The NLC 720 is oriented at approximately −67.5° to the OFF pixel optical axis orientation in the LCD panel 795. After traversing the NLC, the polarization at the design wavelength is then oriented at approximately 45° parallel to the optic axis of the FLC in this inverted OFF-state. The polarization is therefore left unaltered to be rotated back to approximately 0° by the NLC on its return path. Thus, the pixel appears dark. The specific orientation of the NLC/FLC retarders ensures a good achromatic (i.e., black) OFF-states as it forms a compound retarder as per the basic invention.

In order to achieve a good OFF state in the DC balanced frame, the NLC 720 must have approximately the same retardance as the FLC retarder 760, such that there is a good dispersion match between the LC mixtures. This means that either the NLC 720 must also be an achromatic retarder in the ON-state, or one may not want to make the FLC retarder 760 achromatic in order to achieve a high contrast ratio and a bright display using this optical inverter method.

One drawback of using a nematic retarder instead of a FLC retarder for the switch is that the NLC retarder 720 has an asymmetrical response time to applied voltage. Switching to the energized state is fast, but relaxing back to the non-energized state is slow (approximately less than one millisecond). However, if the LCD panel 795 is loaded with the view frames (for an 8 bit display, this mean loading eight frames), and then loaded with the inverse frames, then speed is not a problem because a dual ECB or pi-cell configuration can be used, as discussed below.

Figure 23C:
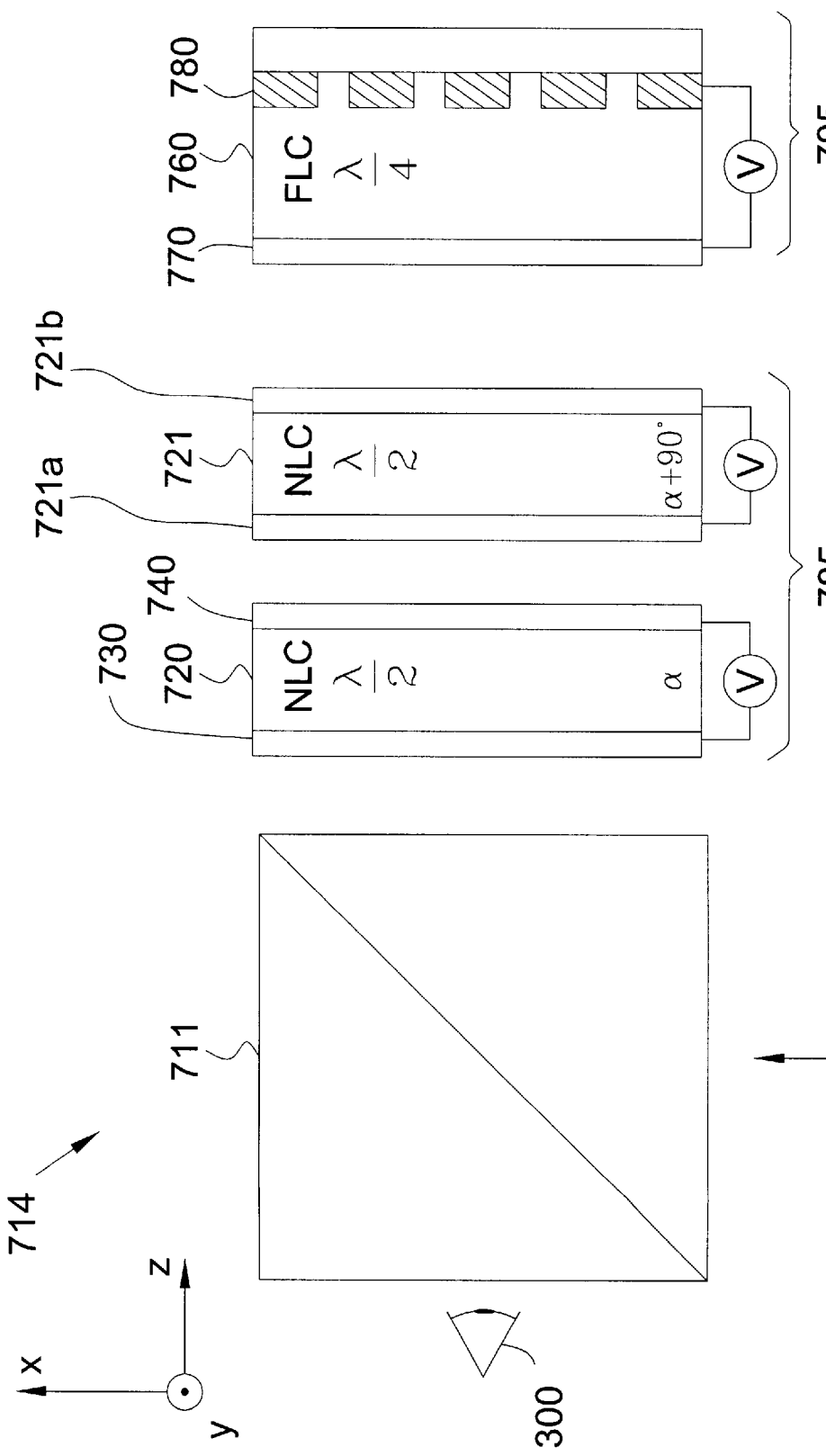
FIG. 23(c) shows an optical inverter implemented with a pair of nematic liquid crystal variable retarders with improved switching speed according to the invention.

The reflective display 714 of FIG. 23(c) comprises a polarizing beamsplitter 711; a first switchable nematic liquid crystal (NLC) device 720 (single pixel device), preferably a half-wave plate; transparent substrates containing electrodes 730, 740; a second switchable nematic liquid crystal (NLC) device 721 (single pixel device), preferably a half-wave plate; transparent substrates containing electrodes 721a, 721b; a FLC retarder 760, preferably a quarter-wave plate; and a transparent substrate containing electrode 770 and a transparent substrate containing pixellated mirror electrodes 780 for applying voltages across the FLC retarder 760 in accordance with image data. The transparent substrate containing electrode 770, the transparent substrate containing pixellated mirror electrode 780 and the FLC retarder 760 collectively make up a reflective LCD panel 795. The NLC 720, the transparent substrates containing electrodes 730 and 740; the NLC 721; and the transparent substrates containing electrodes 721a and 721b collectively make up a NLC switch 785.

The NLC 721 is aligned and switched as for the previous NLC embodiments and is situated preferably nearest the FLC panel. The NLC 720 is aligned at approximately 90° to the NLC 721 and acts as a dynamic compensator. During the view frame, both nematic cells are energized, and effectively vanish. At an appropriate time during the loading and displaying of the view frames (i.e., during the approx. 1 millisecond from finishing loading the frames to displaying the frames), the energizing voltages are removed from the two nematic cells, and they relax back to the non-energized state together. As they relax back to the non-energized state together, their optic axes remain crossed such that they still together exhibit a net zero retardance (i.e., they are invisible to the normally incident light). When the inverse frames are viewed, only the NLC 721 is energized, such that the incident polarization sees only one half-wave plate, instead of two, and the structure operates in the same manner as described above.

Figure 24:
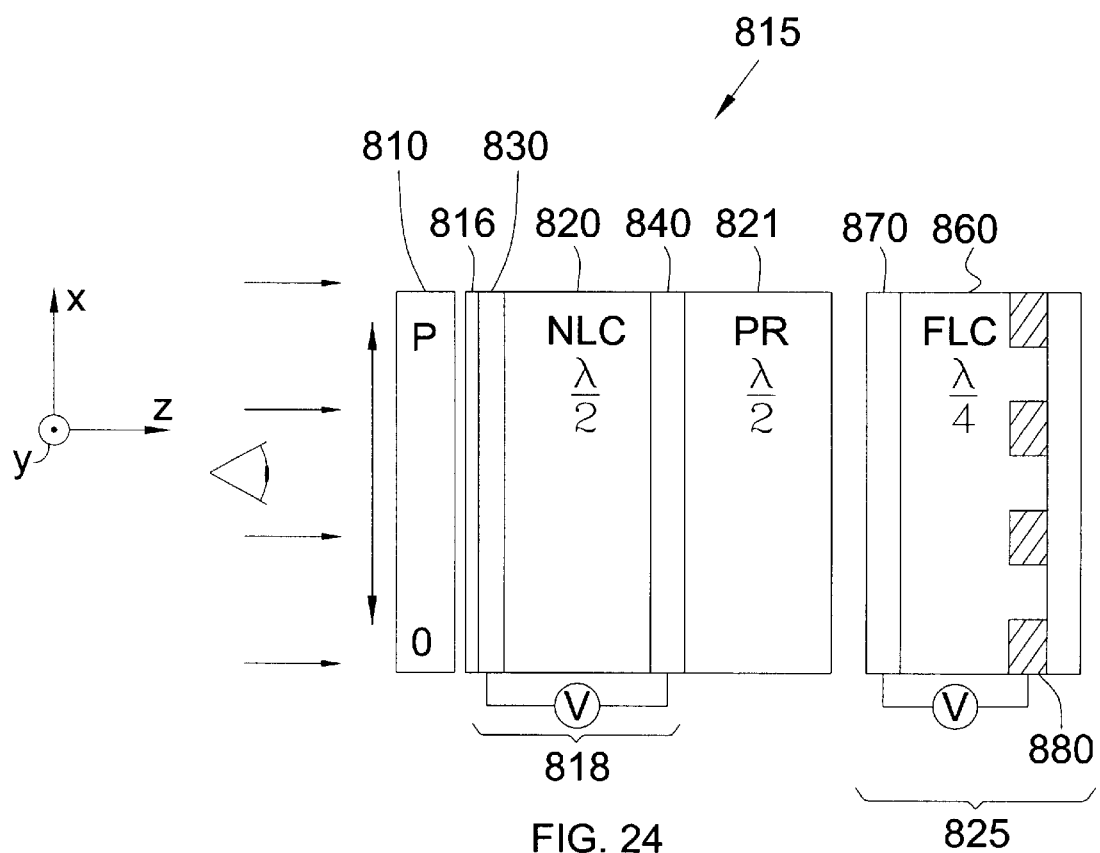
FIG. 24 shows an optical inverter according to the invention implemented with a nematic liquid crystal variable retarder and a passive retarder.

FIG. 24 shows another display embodiment employing an inverter, according to the invention. The reflective display 815 of FIG. 24 comprises a linear polarizer 810; an in-line compensator 816; a switchable nematic liquid crystal (NLC) device 818, preferably a half-wave plate; a passive retarder 821, preferably a half-wave plate; and an LCD panel 825. The LCD panel 825 comprises a FLC retarder 860, and a transparent substrate containing electrode 870 and a transparent substrate containing pixellated electrodes 880 for applying voltages across the FLC retarder 860 in accordance with image data. The NLC switch 818 comprises a nematic liquid crystal retarder (NLC) 820 and transparent substrates containing electrodes 830 and 840 for applying a voltage across the NLC 820 along with the in-line compensator 816 and passive retarder 821. The display 815 is illuminated by ambient light 100 and the viewer is represented by an eye 300. The display 815 exhibits good contrast, better achromatic performance and twice throughput than the bare LCD panel 825 and has the advantage of having near optically equivalent high reflectivity states, thus avoiding flicker.

The NLC 820 is, for example, an out of plane untwisted nematic liquid crystal, such as, for example, a pi-cell or ECB. However, other configurations may also be used. In one switched state, the NLC 820 is relaxed such that light propagating through the NLC 820 experiences a retardance, and in another switched state the LC molecules in the NLC 820 are essentially normal to the light propagation direction and impart little or no retardance to the polarization of the light.

The approach is to have two high, and two low reflectivity states corresponding to the four possible states of the combined compound retarder. For accurate optical inversion, the two high reflectivity states associated with the two electrically inverted FLC retarder 860 states are preferably nearly optically equivalent and as achromatic as possible, and the two low reflectivity states preferably exhibit as low a reflectivity as possible over the entire visible spectrum to give good contrast. The design of a practical inversion scheme preferably ensure both these properties.

The following methodology, used to design a compound retarder inversion scheme, according to the invention, preferably results in two good low reflectivity states; chooses the two optic axes of the two FLC retarder 860 states to allow the most achromatic high reflectivity performance; and alters the passive retarder 821 alignment to equate (as best as possible) the spectra of the two high reflectivity states. The following mathematical approach is consistent with the previously discussed M=3 and M=5 analysis. With respect to the achromatic inverters according to the invention, it is desirable to trade off achromatic ON-states with good OFF-states. Mapping polarization onto the central retarder gives good OFF-states, which is mathematically equivalent to orienting the compound optic axis along the input polarization direction.

Figure 25:
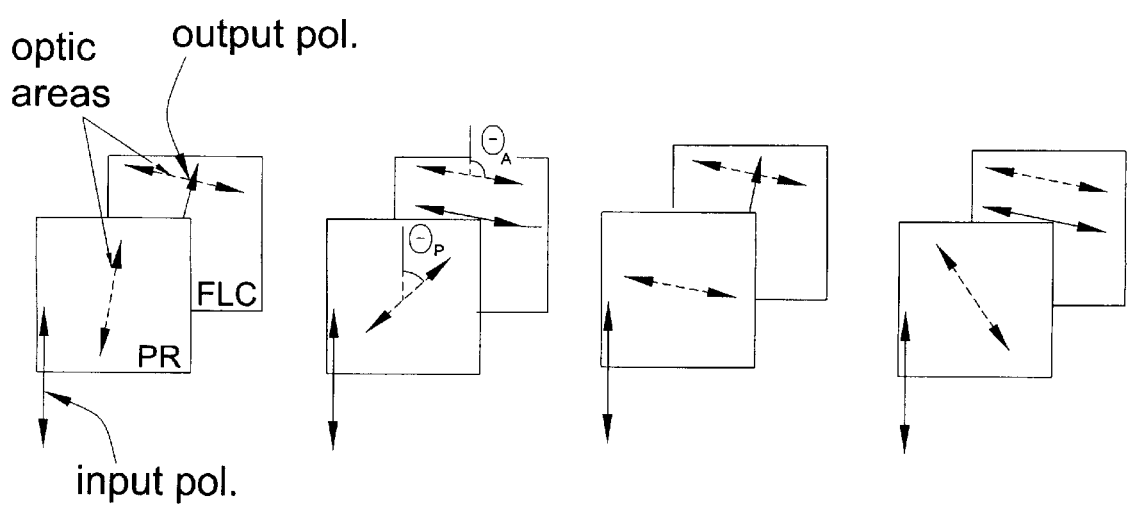
FIG. 25 illustrates preferred orientations of the passive retarder of the embodiment of FIG. 24.

As previously discussed, low reflectivity with a compound retarder can be obtained between crossed polarizers. This is achieved when the polarization at the design wavelength (at which all retarders of the compound retarder are substantially half-wave) is mapped onto, or at approximately 90° to, the optic axis of the central retarder in the display 815, the central retarder corresponds to the FLC retarder 860. Assuming in one of its states the FLC retarder 860 has an orientation $\theta_A$ to the input polarization direction, and we wish to have a low reflectivity state with the NLC 820 driven high (i.e. effectively vanishing), then the passive retarder 821 must be oriented at either $$\theta_P = \theta_A/2 \pm 90 \quad (22)$$

or $$\theta_P = \theta_A/2 \pm 45 \quad (23)$$

or $$\theta_P = \theta_A/2 \quad (24)$$

degrees from the direction of input polarization, as shown in FIG. 25.

These expressions can be understood from the fact that the passive retarder 821 reflects the orientation of the input polarization about its optic axis (at the design wavelength).

Figure 26:
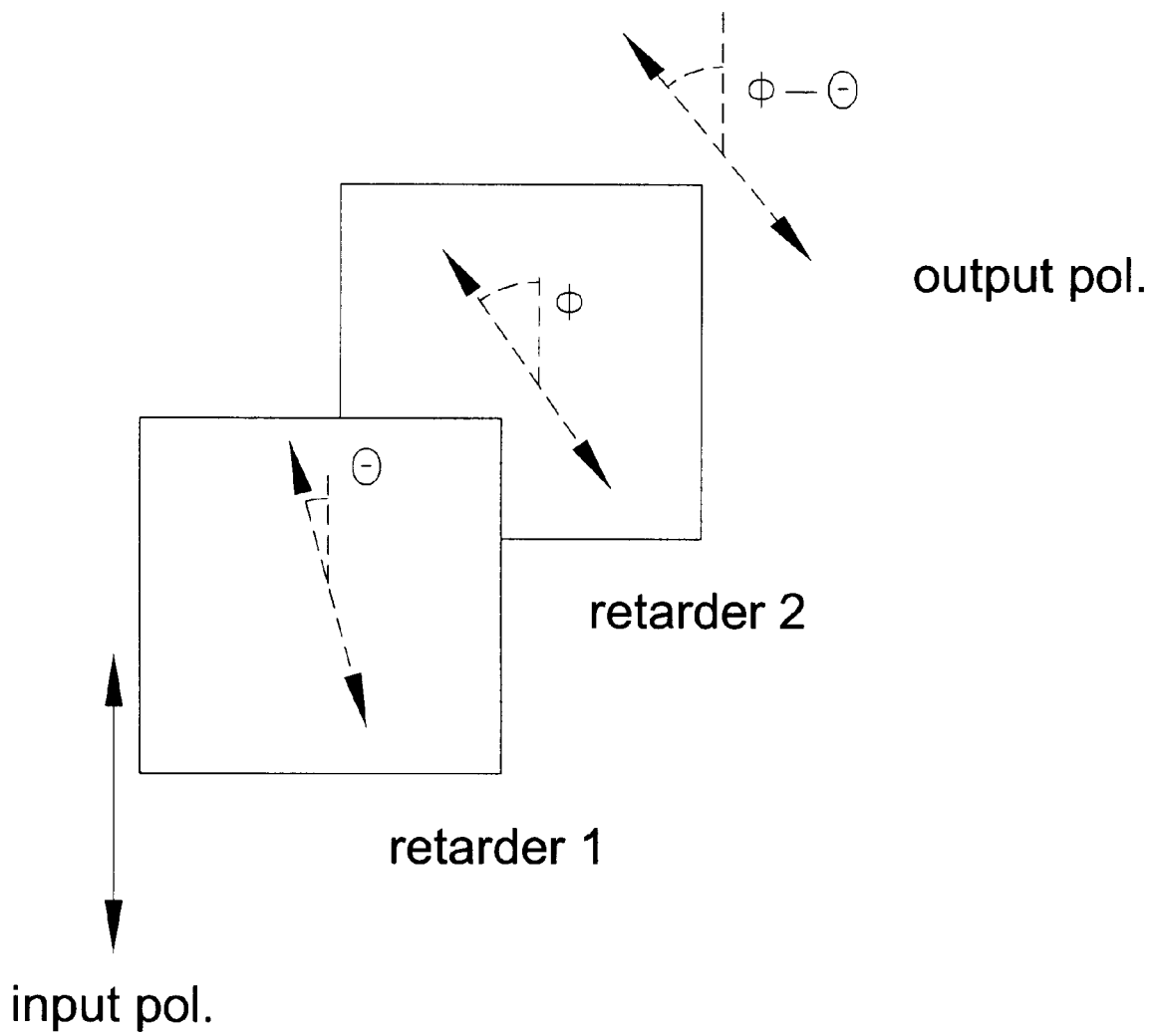
FIG. 26 illustrates a preferred difference in angle between the optic axes of the NLC and passive retarder of FIG. 24.
Figure 27A:
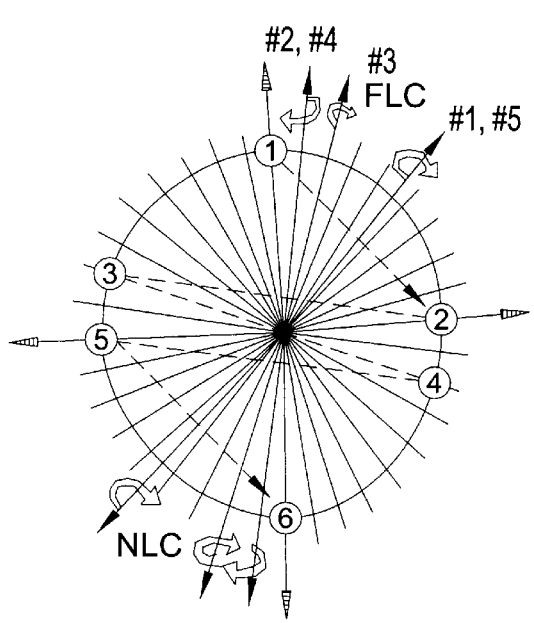
FIGS. 27(a)–27(d) illustrate in diagrammatic form a preferred polarization manipulation of all four states of brightness in the embodiment of FIG. 24.
Figure 27B:
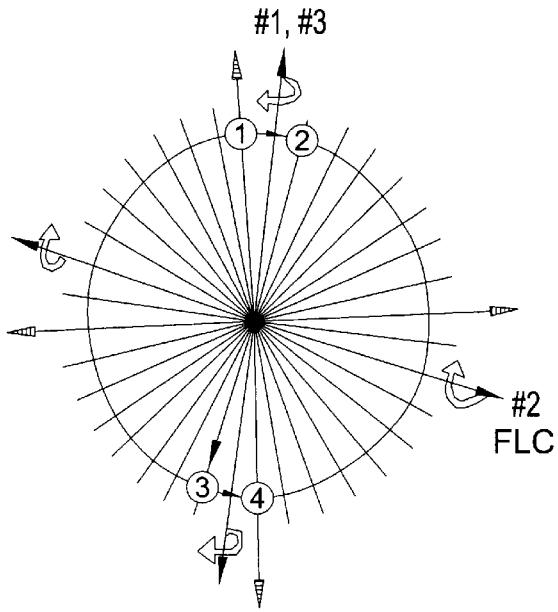
Figure 27C:
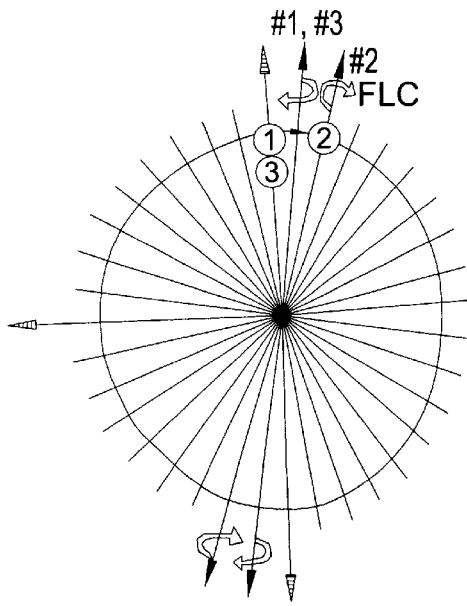
Figure 27D:
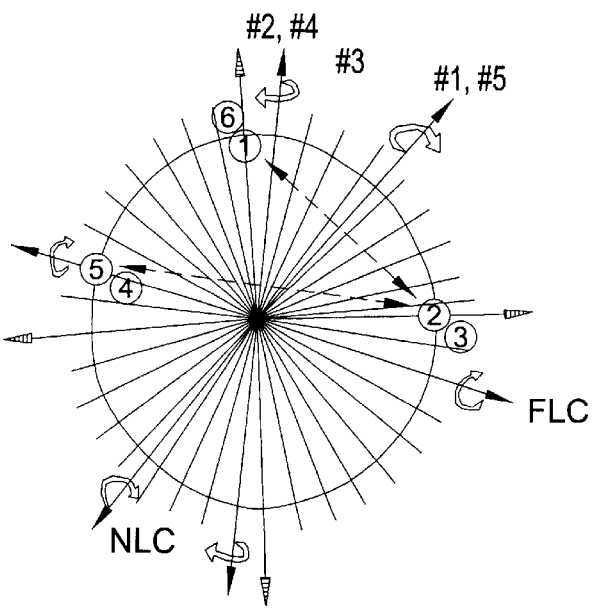

The second low reflectivity state is when the FLC retarder 860 is oriented in its other orientation $\theta_B$, where:

$$\theta_B = \theta_A \pm \theta_S$$

and $\theta_S$ is the switching angle of the FLC retarder 860. In this state, the NLC 820 is in its relaxed, non-driven mode and acts like a retarder. In the same way as above, the orientation $\theta_N$ of the NLC 820 is chosen such that the input polarization is mapped on the new orientation of the FLC retarder 860. In general, the effect of having two retarders in sequence is to rotate the design wavelength by the difference in angle between the optic axes of the two elements, as shown in FIG. 26.

Therefore, by simple geometry $\theta_P - \theta_N = \theta_B/2$ or $\theta_B/2 \pm 90$. Rearranging this expression and substituting for $\theta_B$, we get either:

$$\theta_N = \frac{\theta_P - \theta_A}{2} \pm \frac{\theta_S}{2} \pm 90 \quad \text{or} \quad (25)$$

$$\theta_N = \frac{\theta_P - \theta_A}{2} \pm \frac{\theta_2}{2} \pm 25 \quad \text{or} \quad (26)$$

$$\theta_N = \frac{\theta_P - \theta_A}{2} \pm \theta_S \quad (27)$$

Substituting (22)–(24) into (25)–(27) yields the following options for the NLC 820 orientation angle:

$$\theta_N = \left(\frac{\theta_S}{2}\right) \pm 90 \quad \text{or} \quad (28)$$

$$\theta_N = \frac{\theta_S}{2} \pm 45 \quad \text{or} \quad (29)$$

-continued $$\theta_N = \frac{\theta_S}{2} \quad (30)$$

The two high reflectivity states are the remaining two options for the FLC retarder 860 and NLC 820 states, namely i) when the FLC retarder 860 is at $\theta_A$ and the NLC 820 is oriented at $\theta_N$, and ii) when the FLC retarder 860 is at $\theta_B$ and the NLC 820 is driven high and effectively vanishes. Computer modeling indicates that the most achromatic high (and low) reflectivities in the case of a switchable compound retarder are obtained when successive retarders are oriented with angles as close to 90° as possible from each other, and when the polarization impinging on the FLC retarder 860 in the low reflectivity configurations is at 90° to its optic axis. In the case of small $\theta_P < 10°$, this yields the following expressions for the most achromatic compound retarder inverter system:

$$\theta_P = \frac{\theta_A}{2} - 45 \quad (31)$$

$$\theta_B = \theta_A - \theta_S \quad (32)$$

$$\theta_N = \frac{\theta_S}{2} \pm 90 \quad (33)$$

For any given FLC retarder, $\theta_S$ is fixed which implies $\theta_N$ is also fixed. This means there is only one degree of freedom in the above set of defining equations that can be altered to equate the high reflectivity spectra. Fortuitously, by altering the by small angles (3–7°) from the direction of the input polarization the spectra can indeed be made near equivalent. This is a key feature of this embodiment. The polarization manipulation of all four states can be shown in diagrammatic form as shown in FIGS. 27(a)–(d).

Figure 28:
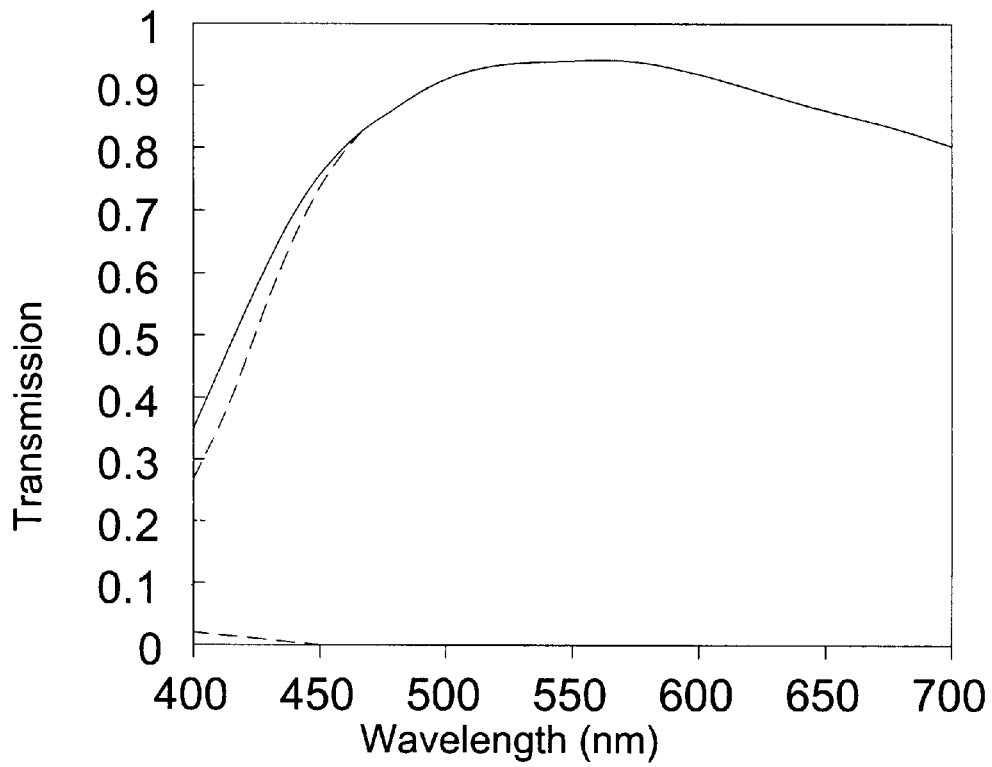
FIGS. 28–30 are plots of transmission versus wavelength for preferred configurations according to the invention.
Figure 29:
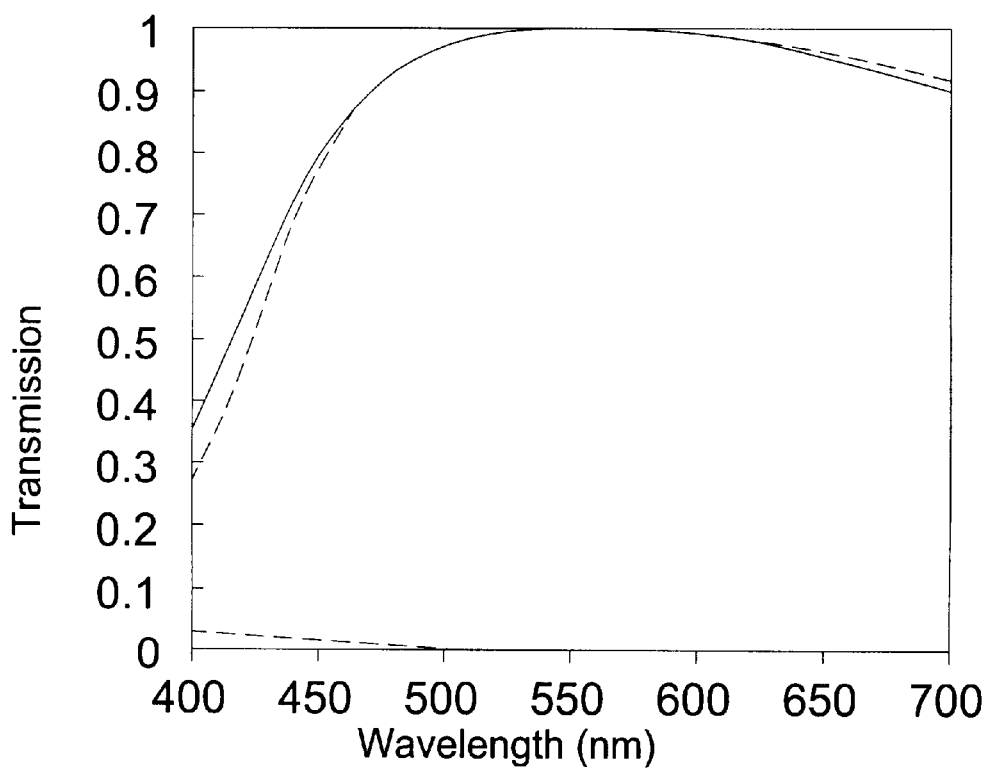
Figure 30:
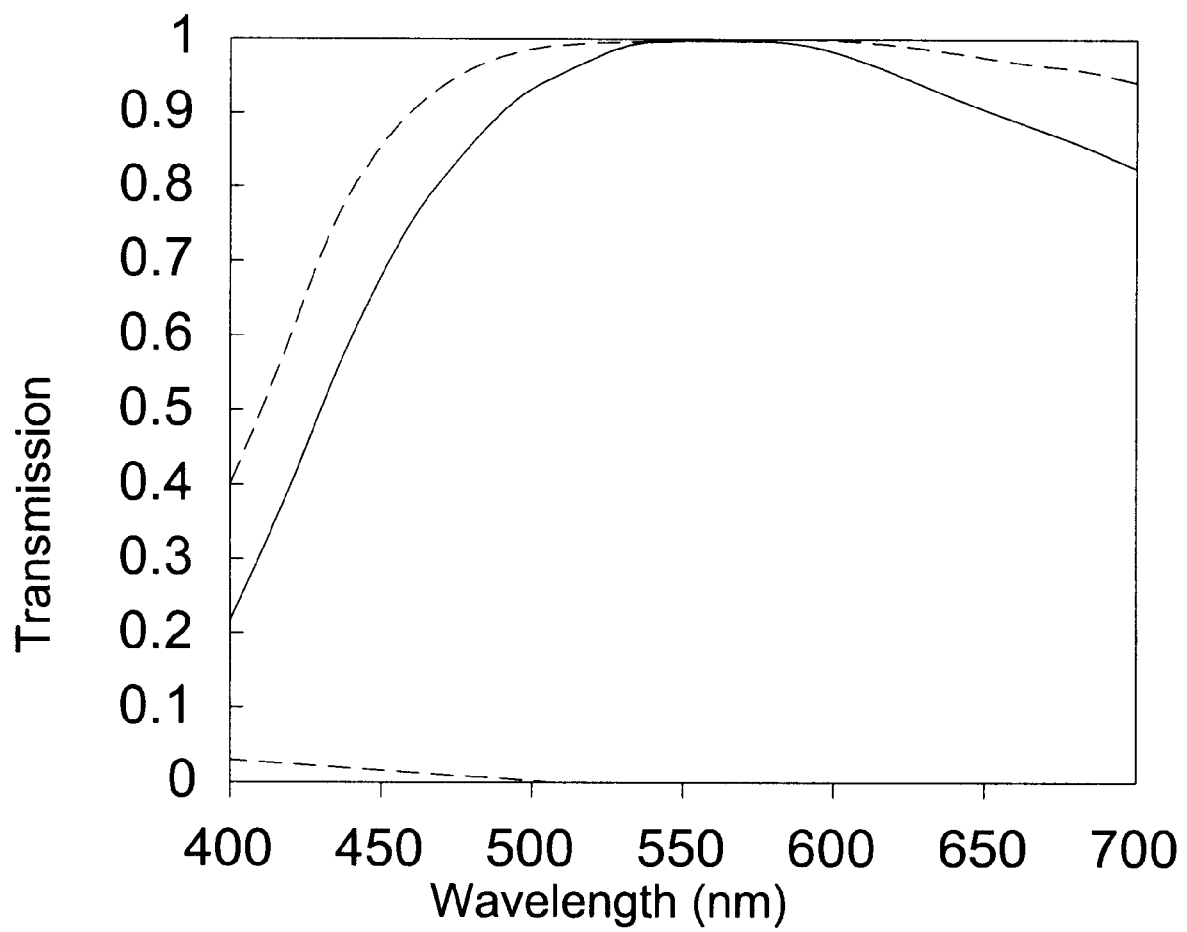

The design procedure above has been carried out for two specific cases here. For $\theta_S = 38°$ the following solution is close to optimum assuming typical LC dispersion and a design wavelength of 550 nm.
$\theta_P = 4°$
$\theta_A = 98°$
$\theta_B = 60°$
The four output states yield the spectra shown in FIG. 28, assuming typical dispersion and a design wavelength of 540 mn.
For $\theta_S = 45°$ switching
$\theta_P = 5°$
$\theta_A = 100°$
$\theta_B = 55°$
$\theta_{IN} = 112.5°$
The four outputs yield the spectra shown in FIG. 29, assuming typical LC dispersion and a design wavelength of 550 nm. Comparing these outputs with the inverter solution, using no passive retarders, as follows:
$\theta_S = 45°$
$\theta_P = 45°$
$\theta_A = 0°$
$\theta_{IN} = 112.5°$
clearly shows the improvement in the matching of high reflectivity states. The four outputs yield the spectra shown in FIG. 30.

As discussed above, one example suggested for the NLC 820 is the pi-cell. While pi-cells (i.e. bent mode) have poor field of view (FOV) characteristics due to the large amount of retardance that is present in the device, it is nevertheless attractive due to its fast switching speed and its use of a thicker (>4 µm), lower cost cell. Proposed here is a method that can be used to increase the FOV of the pi-cell when used in a reflective type device, for example, in an inverter.

Figure 31:
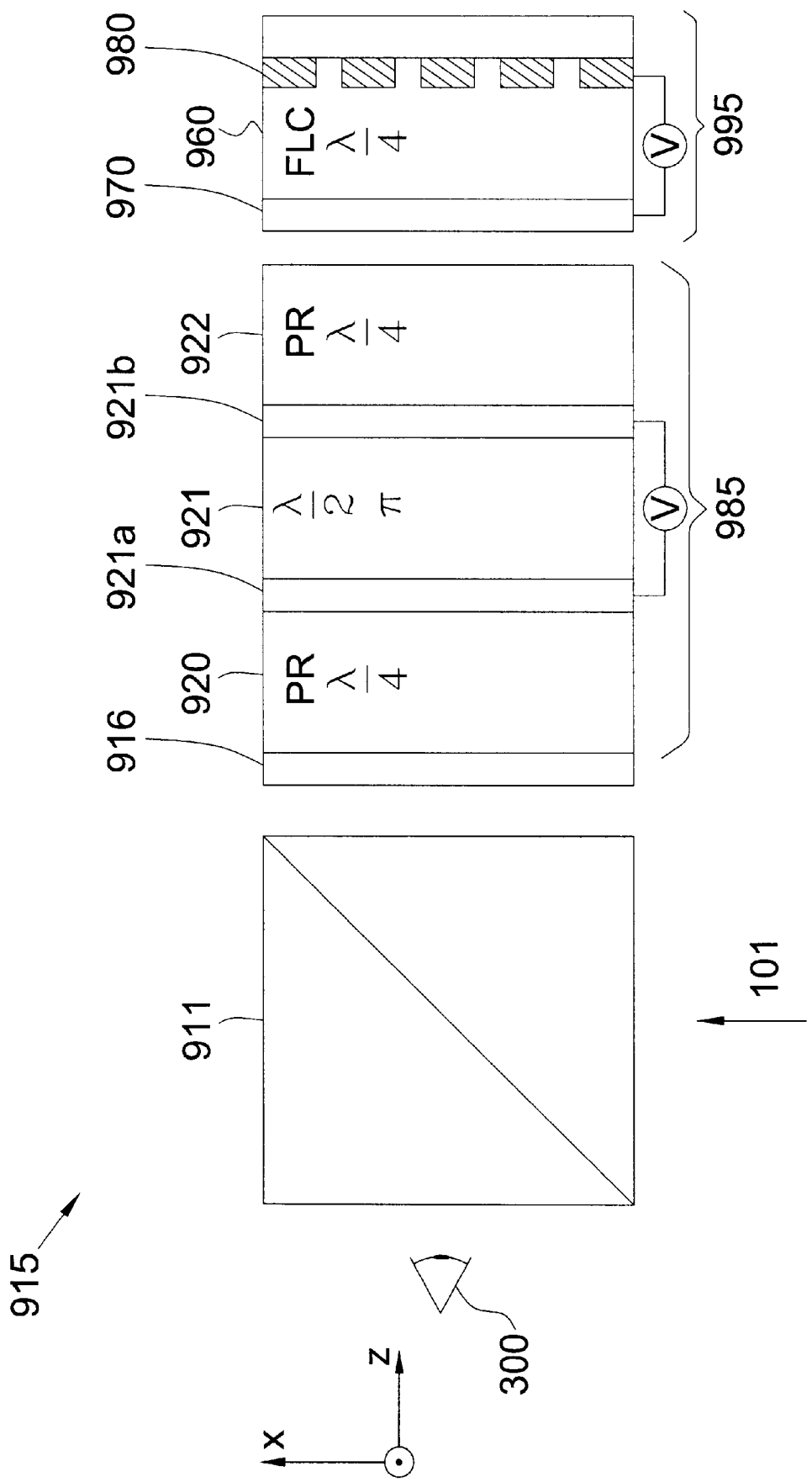
FIG. 31 shows another embodiment of a FLC display device with improved FOV according to the invention.

FIG. 31 shows another example of a display device 915 according to the invention. The display device 915 comprises a polarizing beamsplitter 911; an in-line compensator 916; a first passive retarder 920, preferably a quarter-wave plate; a first pi-cell retarder 921, preferably a half-wave plate; transparent substrates containing electrodes 921a, 921b for applying voltages across the first pi-cell retarder 921; a second passive retarder 922, preferably a quarter-wave plate; and LCD panel 925. LCD panel 995 comprises a FLC retarder 960, preferably a quarter-wave plate; and transparent substrates containing electrodes 970, 980 for applying voltages across the FLC retarder 960 in accordance with image data.

The orientations of the quarter-wave FLC retarders 920, 960 are parallel and perpendicular to the pi-cells 921, 922, respectively. That is, the quarter-wave retarder nearest between the LCD panel 995 and the pi-cell has its optic axis at approximately 90° to the optic axis of the pi-cell, and the other quarter-wave being approximately 90° to this or parallel to the pi-cell optic axis.

Figure 32:
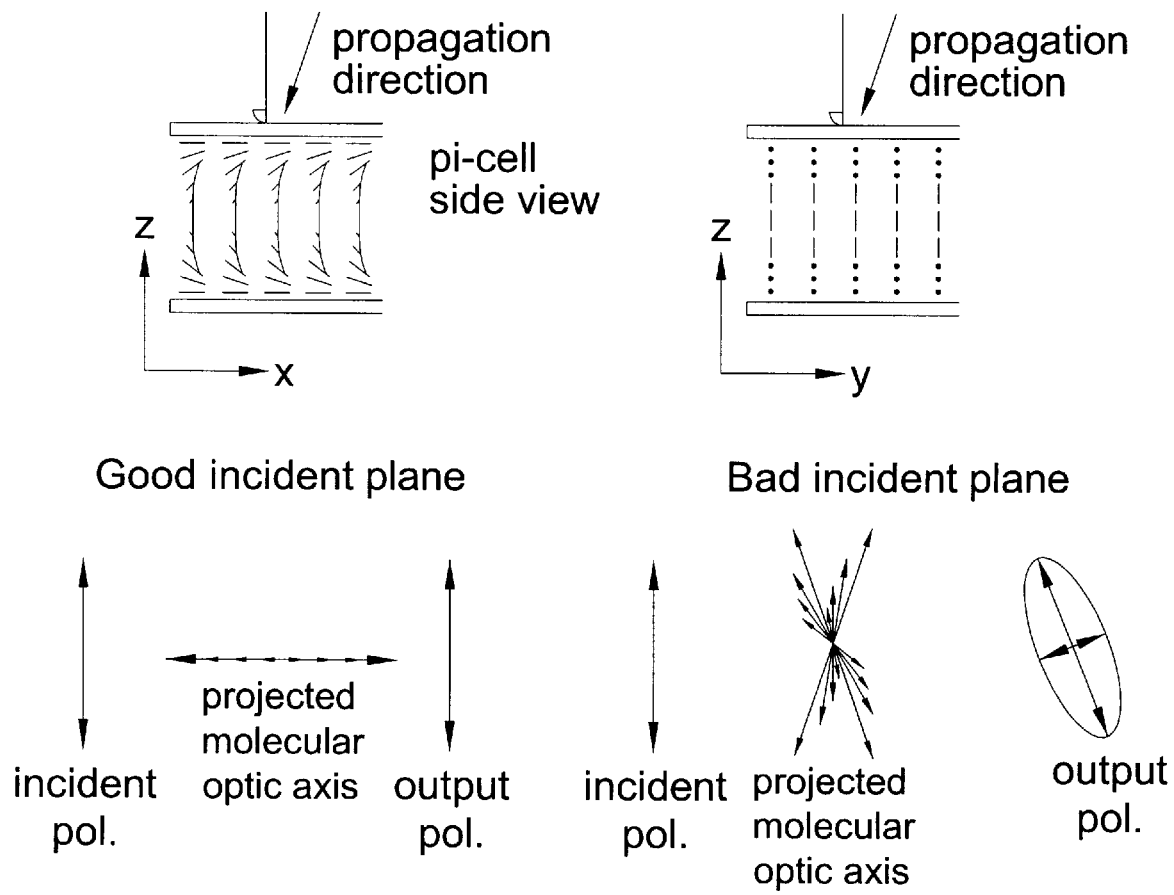
FIG. 32 illustrates how off axis rays "see" a twisted liquid crystal director profile.

This approach, according to the invention, employs the fact that rays that are off axis see a twisted liquid crystal director profile. The effect of this twist is shown in FIG. 32. As can be seen in this specific case of a half-wave pi-cell the effect of going off-axis is to produce a polarization that is elliptical and is oriented at an angle relative to the optic axis of the pi-cell. By placing a quarter-wave retarder (half-wave in reflective type devices) between the pi-cell and the LCD panel, this polarization major axis is reflected about the optic axis of the quarter-wave retarder and the ellipticity is reversed (i.e. left hand rotation to right hand or visa versa). The effect then of passing through the pi-cell for the second time is to undo this effect and the resultant polarization becomes linear. The additional quarter-wave layer is added to the other side of the pi-cell to negate the additional in-plane retardance from the other half-wave layer.

This compensation scheme works particularly well for the inverter device according to the invention, and is compatible with the inverter in which an extra retardation film is added between the active inverter cell and the FLC retarder.

Figure 33:
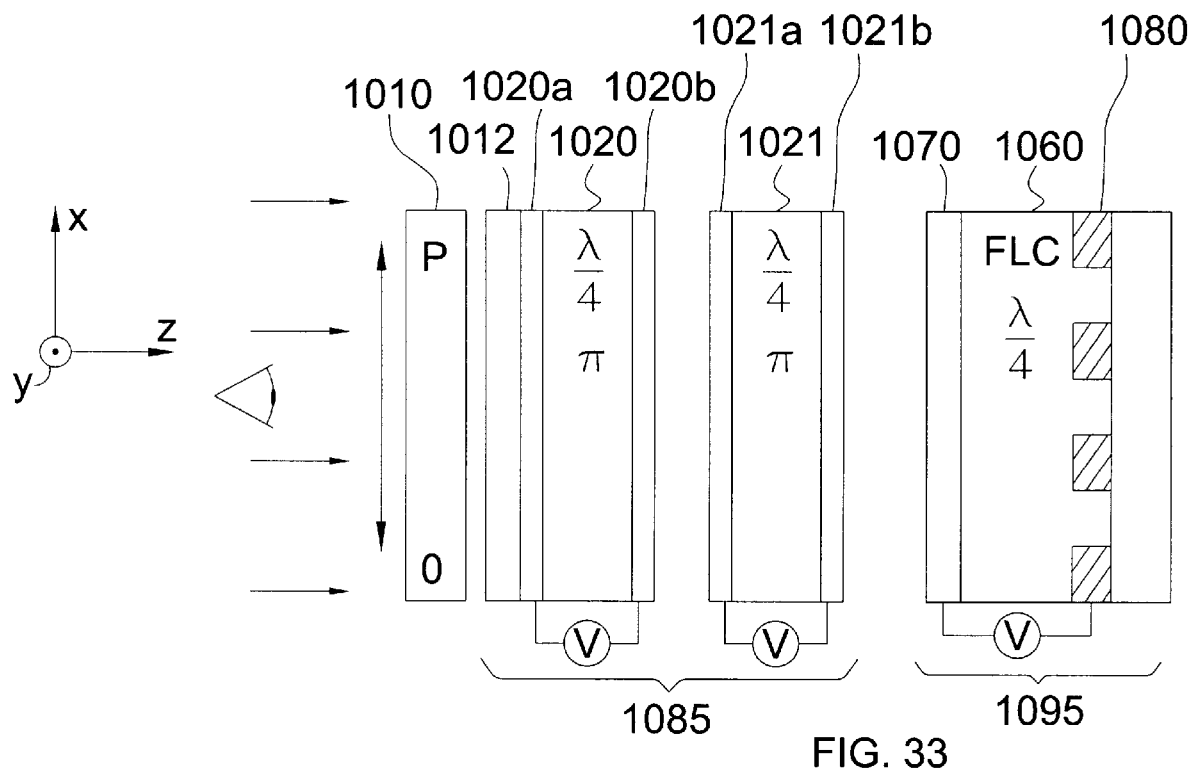
FIG. 33 shows another embodiment of a FLC display device according to the invention.
Figure 33A:
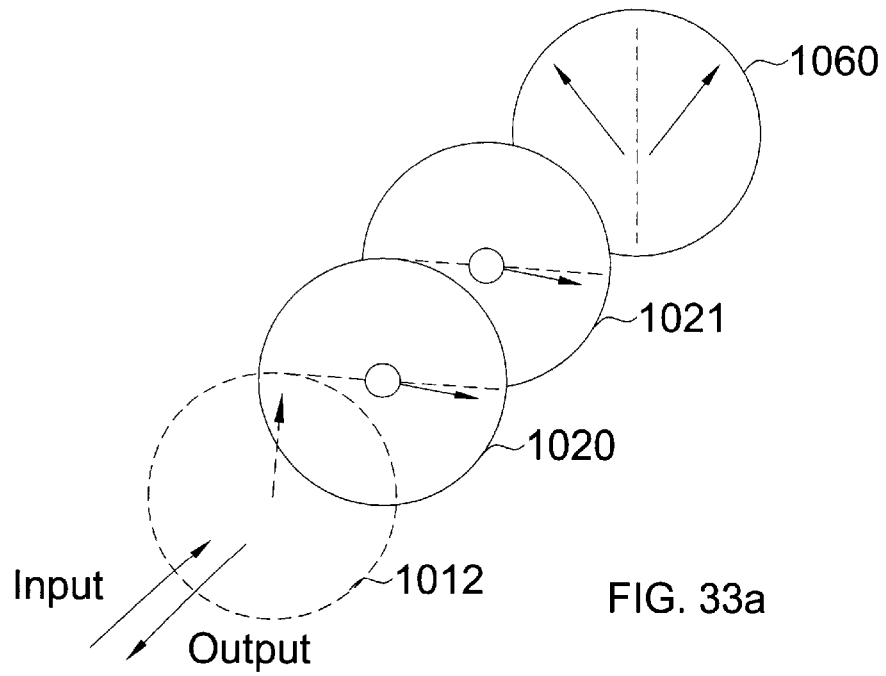
FIG. 33(a) illustrates preferred orientations of the various wave plates in the embodiment of FIG. 33.

FIG. 33 shows a display embodiment comprising a polarizer 1010; a in-line compensator 1016, preferably having an in-line compensation Γ of approximately 30 nm; a first pi-cell retarder 1020, preferably a quarter-wave plate; transparent substrates containing electrodes 1020a, 1020b for applying voltages across the first pi-cell retarder 1020; substrate 1050a; a second pi-cell retarder 1021, preferably a quarter-wave plate; and transparent substrates containing electrodes 1021a, 1021b for applying voltages across the second pi-cell retarder 1021. The LCD panel 1095 comprises a FLC retarder 1060, and transparent substrates containing electrodes 1070, 1080 for applying voltages across the FLC retarder 1060 in accordance with image data. The orientations of the various plates are shown schematically in FIG. 33a. The orientation of the integrated display device is along the rubbing direction of the two parallel half-wave pi-cells.

Figure 34:
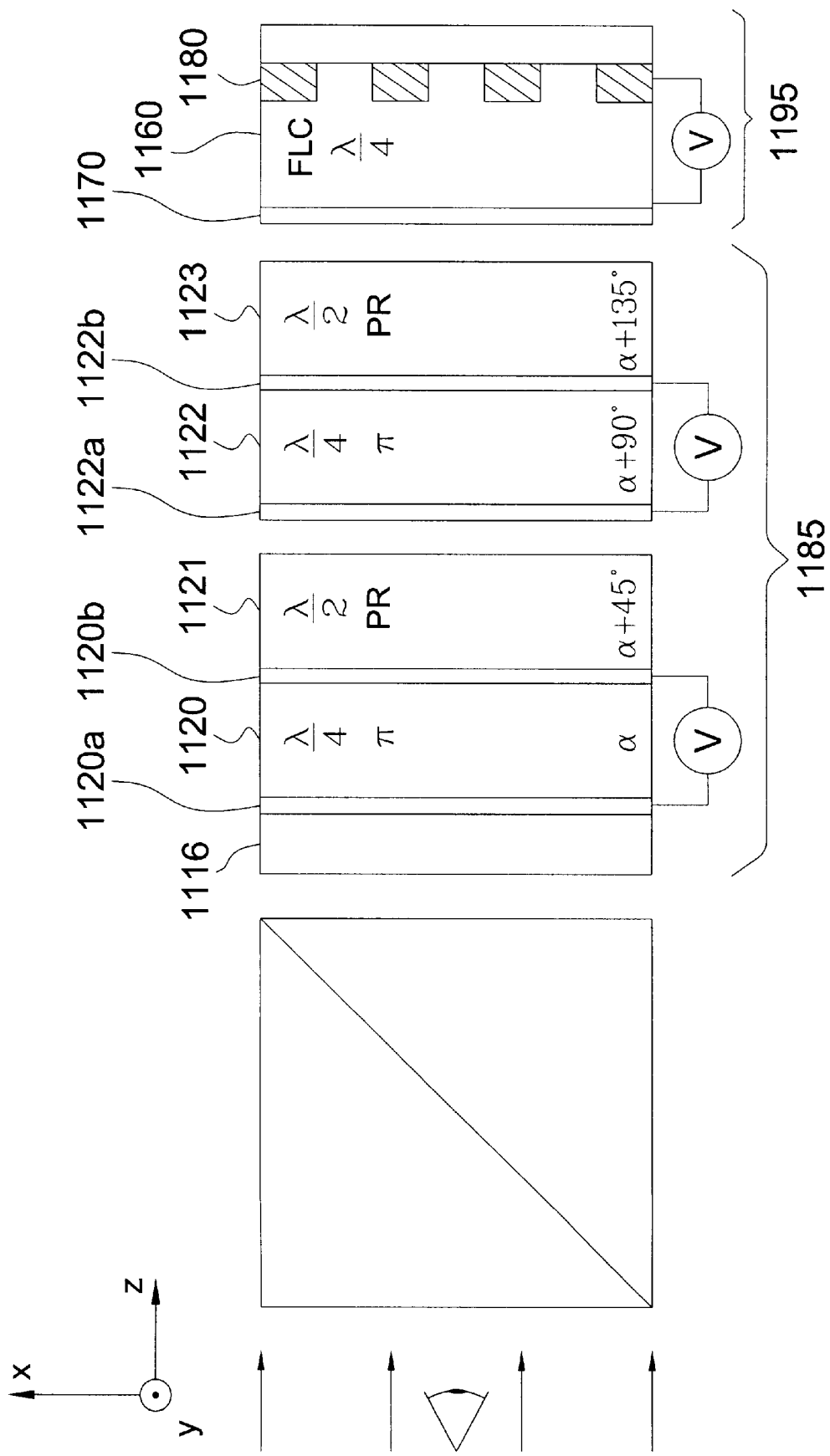
FIG. 34 shows another embodiment of a FLC display device according to the invention.

FIG. 34 shows another display embodiment comprising a polarizing beamsplitter 1111; a in-line compensator 1116, preferably having an in-line compensation Γ of approximately 30 nm; a first pi-cell retarder 1120, preferably a quarter-wave plate; transparent substrate containing electrodes 1120a, 1120b for applying voltages across the first pi-cell retarder 1120; a first passive retarder 1121, preferably a half-wave plate; a second pi-cell retarder 1122, preferably a quarter-wave plate; transparent substrate containing electrodes 1122a, 1122b for applying voltages across the second pi-cell retarder 1122; a second passive retarder 1123, preferably a half-wave plate; and LCD panel 1195. The LCD panel 1195 comprises a FLC retarder 1160, and a transparent substrate containing electrode 1170 and a transparent substrate containing pixilated mirror electrode 1180 for applying voltages across the FLC retarder 1160 in accordance with image data.

Figure 34A:
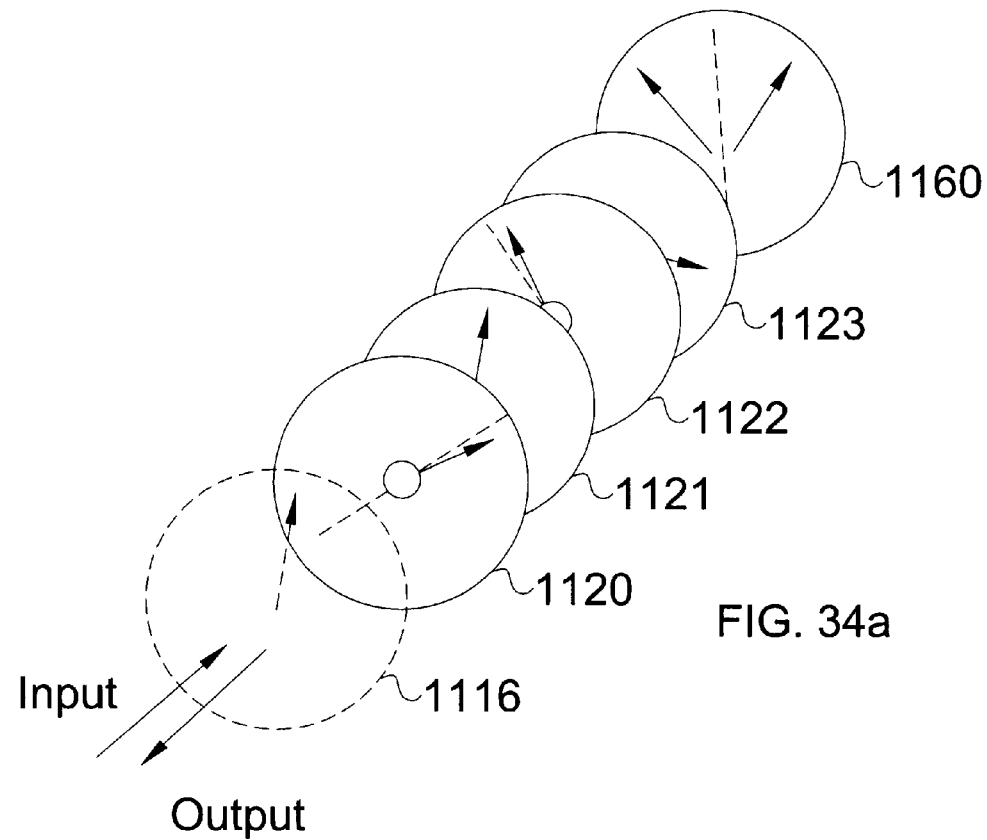
FIG. 34(a) illustrates preferred orientations of the various wave plates in the embodiment of FIG. 34.

The orientations of the various plates are shown schematically in FIG. 34a. The orientation of the integrated display device is parallel to the orientation of the central achromatic half-wave plate. The two pi-cell retarders 1120, 1122 are then oriented at approximately +45° and −45° to this direction, respectively. Since the integrated display device acts as a net half-wave plate with a defined optic axis, it can also be used with further passive half-wave retarders to equalize ON/STATES. It is, however, considered fast enough not to use the dynamic relaxation compensation of the two pi-cell embodiment previously discussed.

Figure 35A:
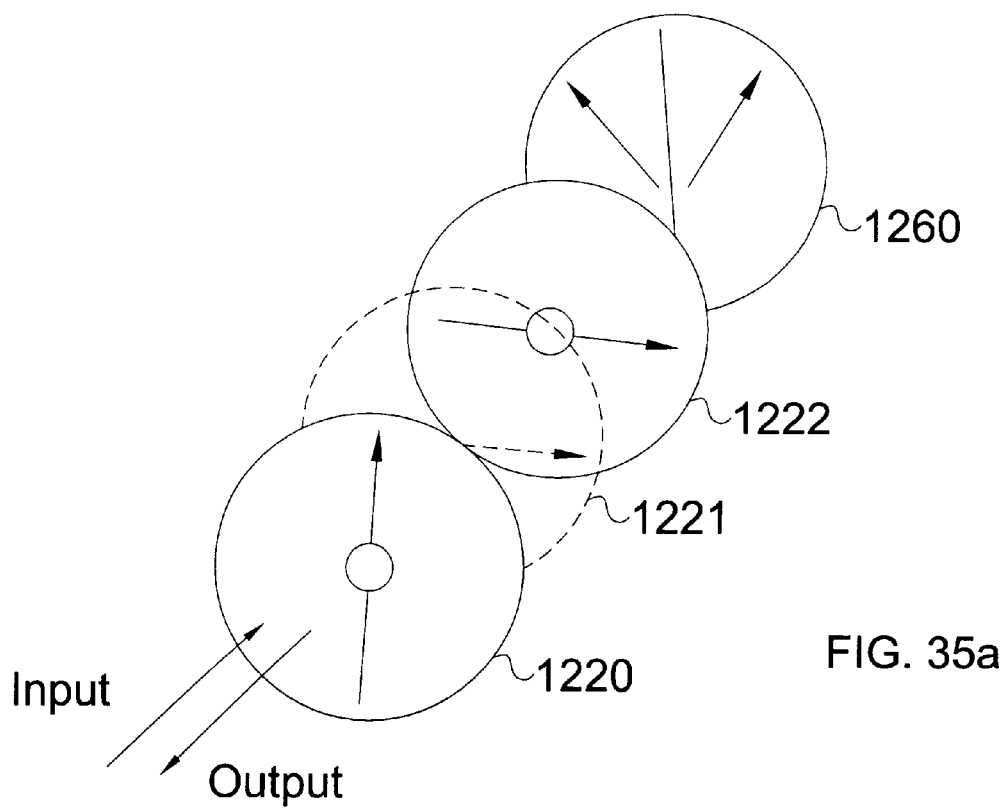
FIG. 35(a) illustrates preferred orientations of the various wave plates in the embodiment of FIG. 35.
Figure 35:
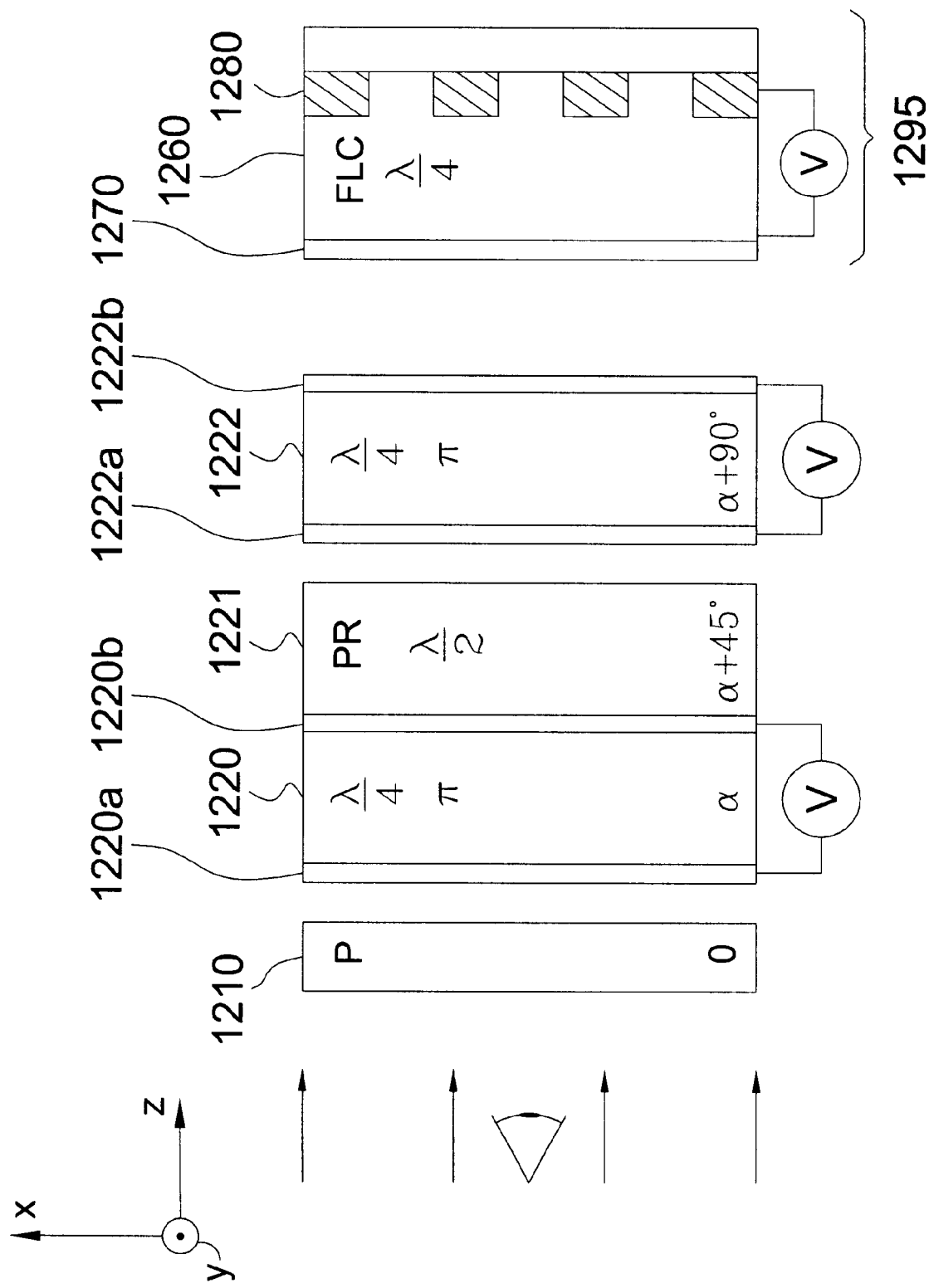
FIG. 35 shows another embodiment of a FLC display device according to the invention.

The display embodiments shown in FIGS. 35 and 35a overcome the effect on contrast due to unwanted reflection in the display device. FIG. 35 shows an example of a display device comprising a polarizer 1210; a first pi-cell retarder 1220, preferably a quarter-wave plate; transparent substrate containing electrodes 1220a, 1220b for applying voltages across the first pi-cell retarder 1220; a passive retarder 1221, preferably a half-wave plate having an in-line compensation Γ of approximately 50 nm; a second pi-cell retarder 1222, preferably a quarter-wave plate; transparent substrates containing electrodes 1222a, 1222b for applying voltages across the second pi-cell retarder 1222; and LCD panel 1295. The LCD panel 1295 comprises a FLC retarder 1260, preferably a quarter-wave plate; and a transparent substrate containing electrode 1270 and a transparent substrate containing pixilated mirror electrodes 1280 for applying voltages across the FLC retarder 1260 in accordance with image data. The orientations of the various plates are shown schematically in FIG. 35a.

Real devices have interfaces between layers that cause unwanted reflection that compromises contrast. In particular, the field of view compensation schemes so far discussed have significant reflection deriving primarily from current methods of LC cell fabrication. To overcome this problem and ensure adequate FOV, there are approaches that utilize the fact that thinner cells have inherently better FOV. So in using cells that are to thin to switch a full half-wave at the design wavelength, a push-pull dual cell embodiment can be used which has similar dynamic compensation to the of the two pi-cell embodiment previously discussed, but requires an additional small (preferably approximately 50 nm) retarder aligned with the switching retarder. In its relaxed state, the approximately 50 nm retardance adds to the switching element's retardance and, in its driven state, the dynamic compensator cell is not driven quite so high to negate the approximately 50 nm retardance plus any residual retardance from the switching element. That is, the cell furthest from the LCD panel is driven high (e.g., >24V) for one state of the inverter and not so high (e.g., −12V) in the other. These correspond to the high and low driven states of the switching cell, respectively. Since the dynamic compensator cell is effectively driven with high voltage throughout, masking of the relaxation, and hence effective high switching speed, can still be achieved.

Figure 36:
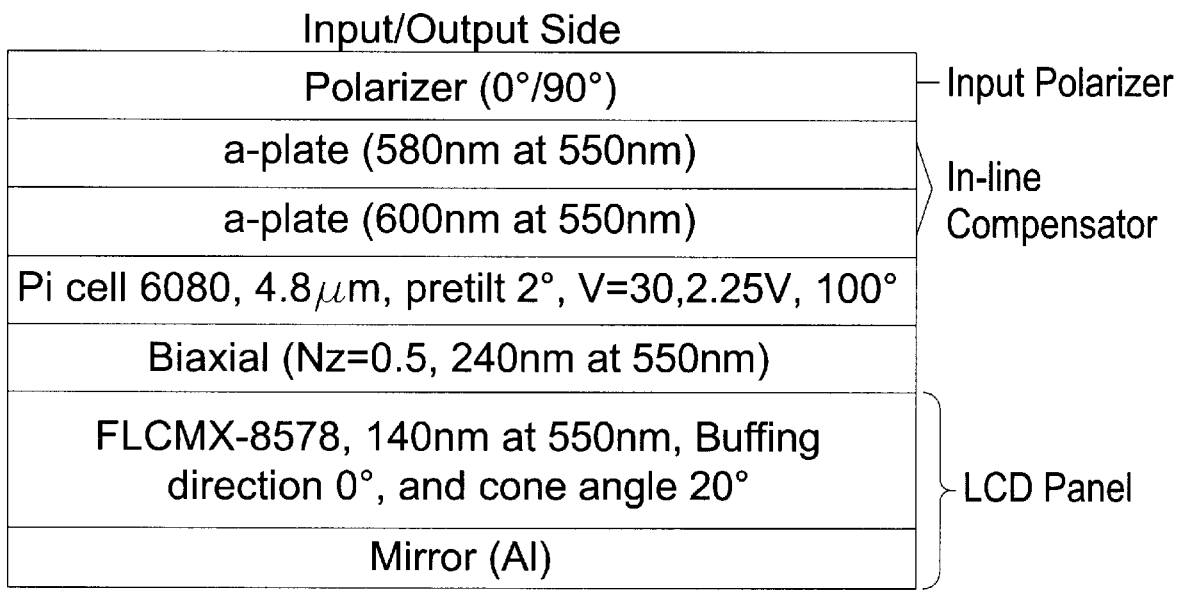
FIG. 36 shows the basic structure of another reflective display according to the invention.
Figure 37A:
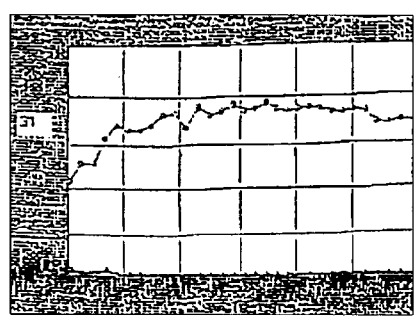
FIGS. 37(a)–37(b) show head-on spectra of four states of the embodiment of FIG. 36.
Figure 37B:
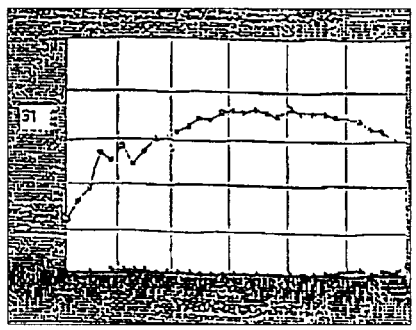
Figure 38A:
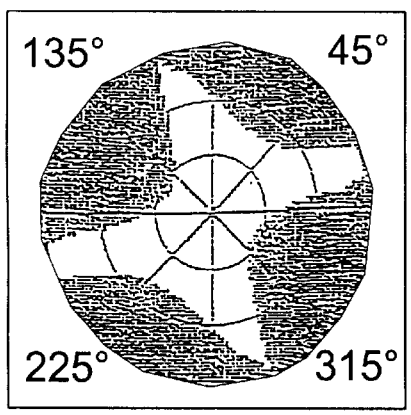
Figure 38B:
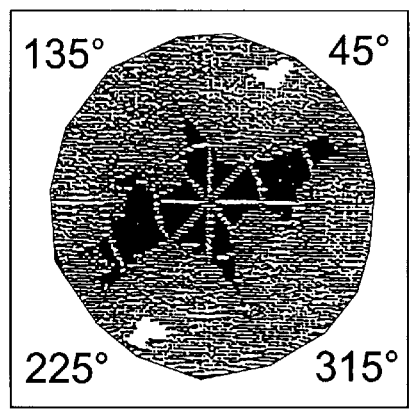
Figure 40A:
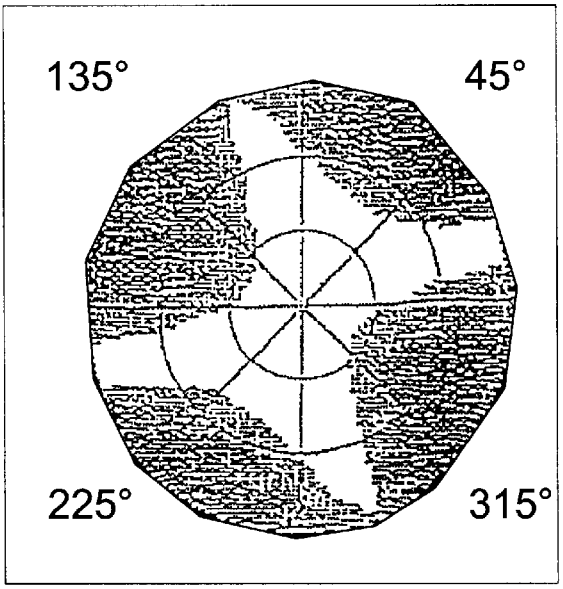
FIGS. 40(a)–40(d) illustrate a total of four states of intensity of the embodiment of FIG. 39.
Figure 40B:
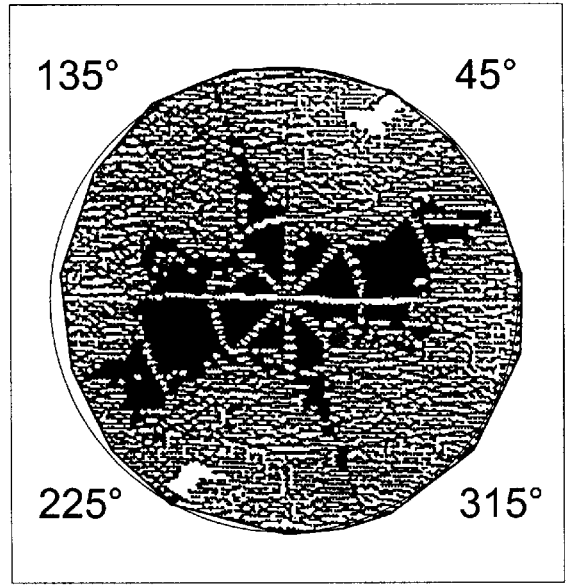
Figure 40C:
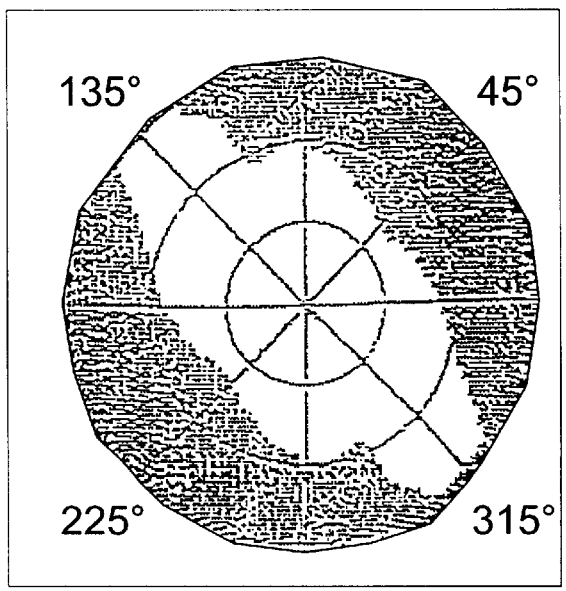
Figure 40D:
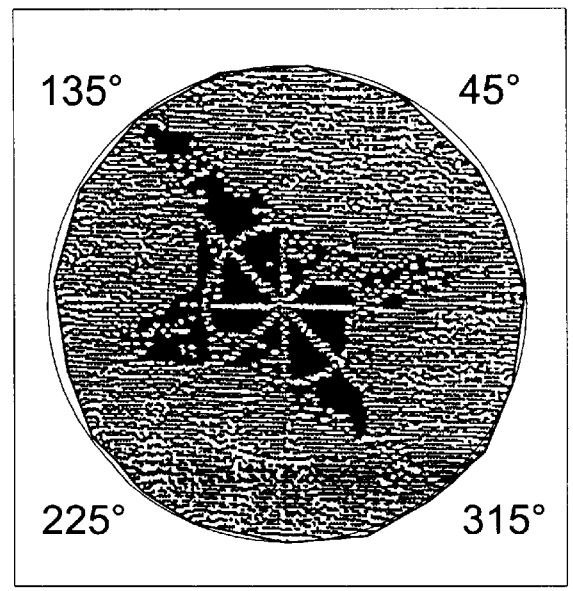

FIGS. 36–43 show configurations for the various reflective display embodiments shown in FIGS. 33–35(a). The basic structure of the display is illustrated in FIG. 36. The FLC retarder has two states, depending on the polarity of applied voltage. The NLC switch has two states depending on high and low voltage applied. Therefore, there are a total of four states, two of high brightness and two of low brightness, as shown in FIGS. 38(a)–38(d). FIGS. 37(a)–37 (b) show the head-on spectra of four states.

Figure 41:
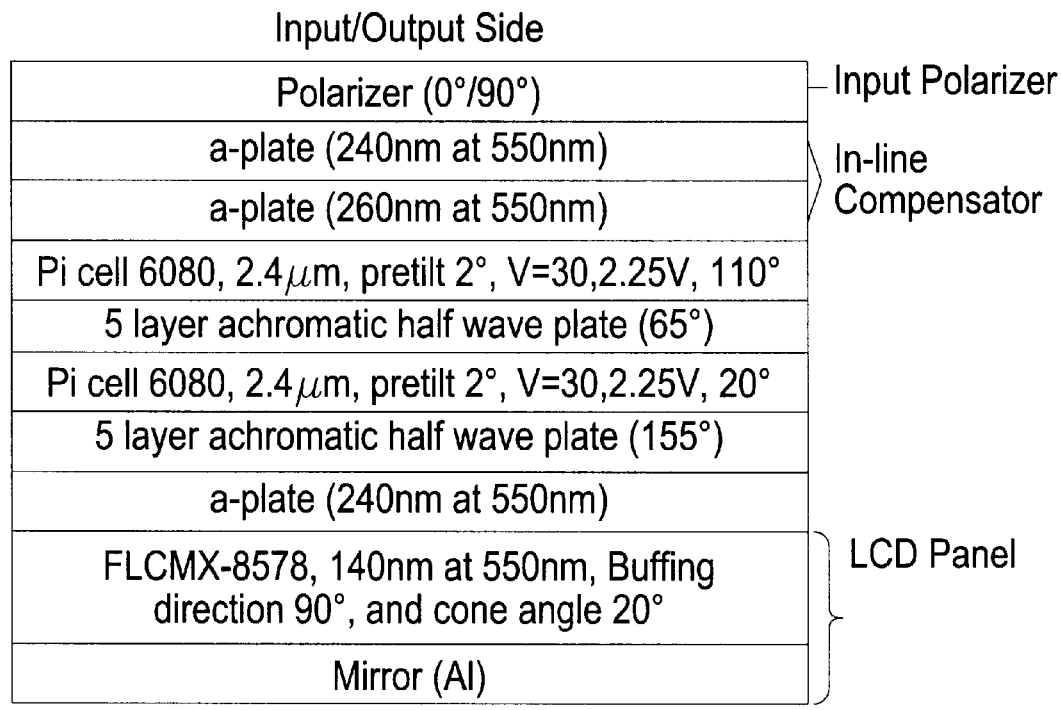
FIG. 41 shows the basic structure of another reflective display according to the invention.
Figure 42A:
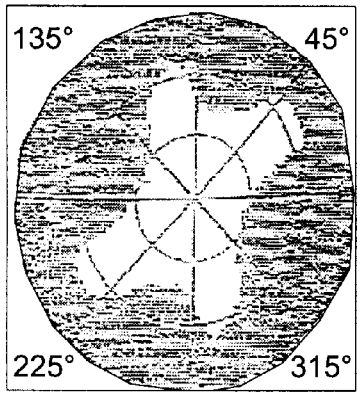
FIG. 42(a)–42(d) illustrate a total of four states of intensity of the embodiment of FIG. 41.
Figure 42B:
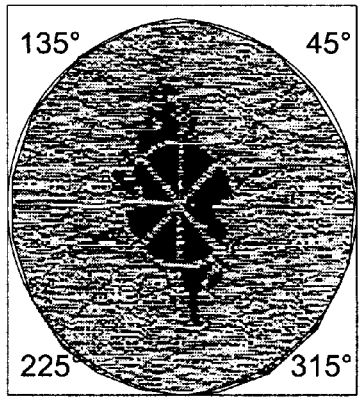
Figure 42C:
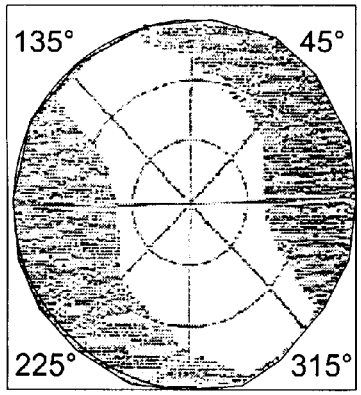
Figure 42D:
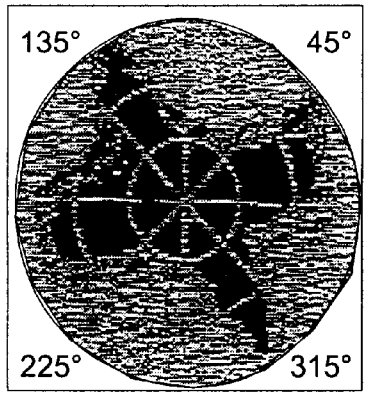
Figure 43:
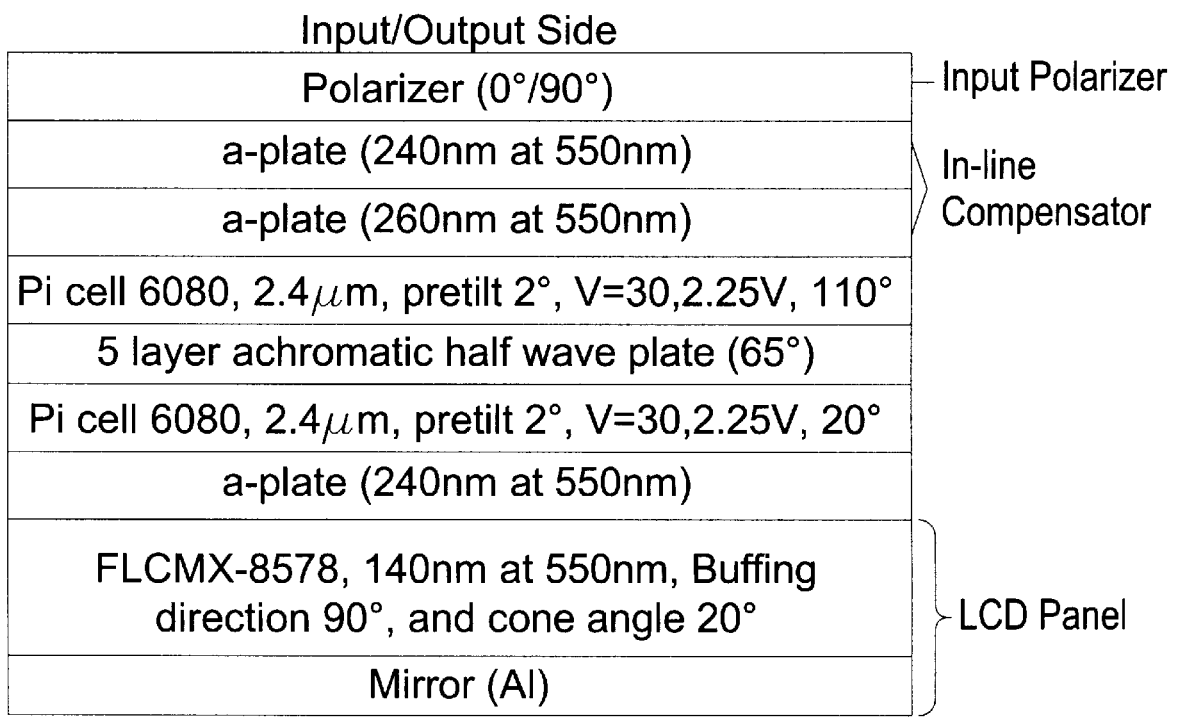
FIG. 43 shows the basic structure of another reflective display according to the invention.

Additional reflective display embodiments are illustrated in FIGS. 39 and 41, with the respective combined four states illustrated in FIGS. 40(a)–40(d) and FIGS. 42(a)–42(d), respectively. An additional display or embodiment is illustrated in FIG. 43. The configurations of FIGS. 39, 41 and 43 provide decent field of view for an f/2.5 application. The response time can also be below 100 μs at 50° C., since birefringence of LC cell is about 550 nm (green cell).

Figure 44:
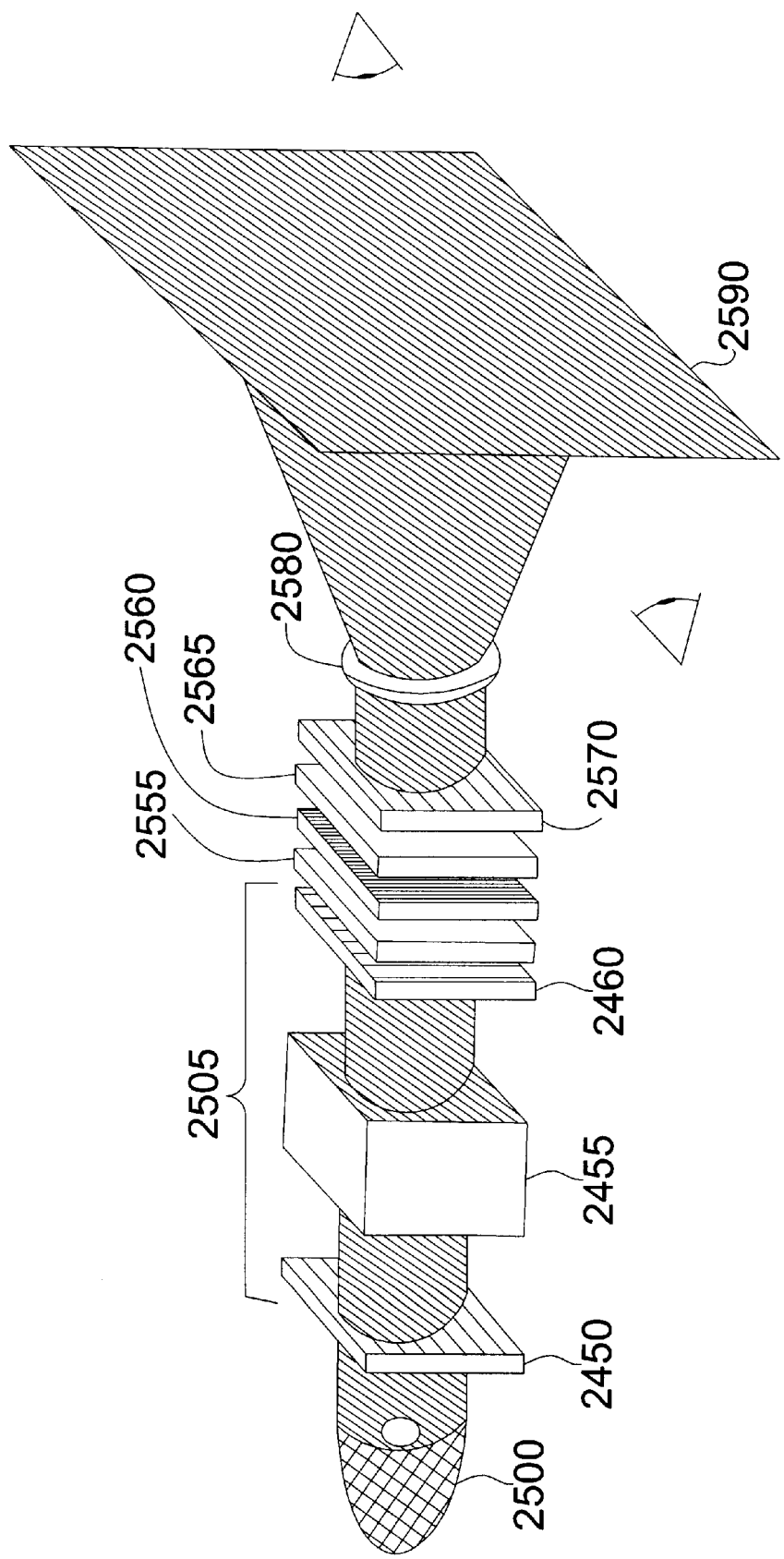
FIGS. 44–47 show various display devices incorporating an achromatic inverter according to the invention.

FIGS. 44–47 show various display devices incorporated an inverter according to the invention. In particular, FIG. 44 shows a full color sequential display implemented with a transmissive liquid crystal display, and utilizing an achromatic inverter according to the invention. The sequential display comprises a light source 2500, a two-polarizer digital color sequencer 2455, a first inverter 2555, a transmissive pixelized liquid crystal display 2560, a second inverter 2565, a polarizer 2570, a projection lens 2580 and a display screen 2590.

The light source 2500 is suitably a metal halide lamp and preferably emits optical power in all three primary color bands. Alternatively, the light source 2500 can be implemented with an active lamp system or with a lamp/color wheel combination.

In operation, the light source 2500 and the sequencer 2455 sequentially illuminates the liquid crystal display 2560 with red, green and blue light. The liquid crystal display 2560 is sequentially driven with red, green and blue image information in synchronism with the red, green and blue illumination from the light source 2500 and the color sequencer 2455. The liquid display 2560, in combination with the polarizer 2570, modulates the intensity of the light that is sent to the screen 2590, in accordance with image information. The inverters 2555, 2565 in combination with the liquid crystal display 2560 provide four states of brightness, two high and two low. The inverters 2555, 2565 effectively double the brightness of the display, by allowing the negative image frame to be viewed, as previously discussed.

The full color sequential display of FIG. 44 can be implemented as a front projection display in which the screen 2590 is viewed from the same side as the projection optics, or as a rear projection display, in which the screen 2590 is viewed from the side opposite the projection optics.

Figure 45:
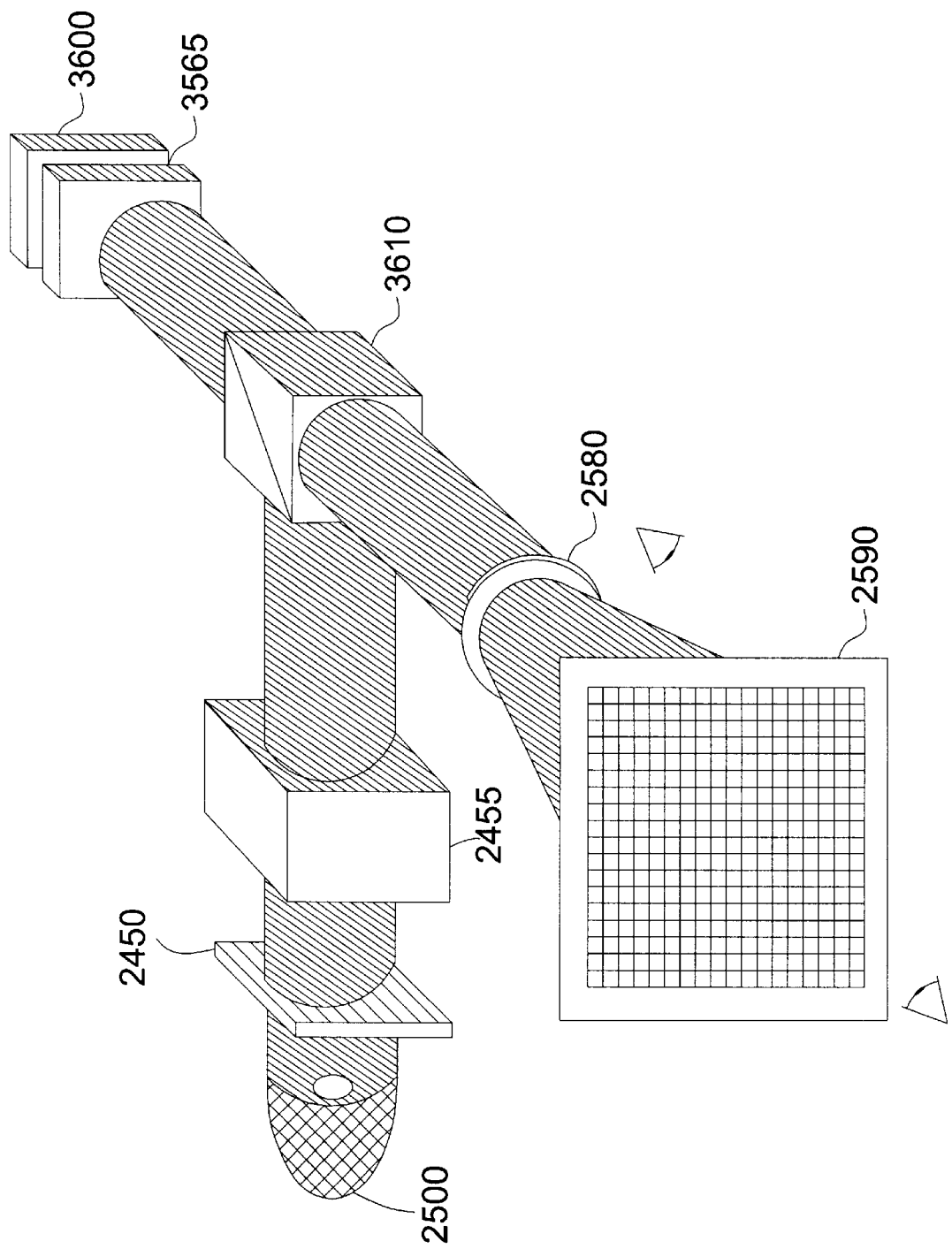

FIG. 45 shows a full color sequential display using a reflective liquid crystal display, and utilizing an achromatic inverter according to the invention. The display of FIG. 45 is similar to the display shown in FIG. 44, except that a reflective liquid display 3600 is used instead of a transmissive liquid crystal display. In this configuration, a polarizing beamsplitter 3610 is used as both the output polarizer for the digital color sequencer 2455 and as the input/output polarizer for the reflective liquid crystal display 2600. Thus, the polarizing beamsplitter 3610 reflects light whose polarization is crossed with respect to the polarization axis of the input polarizer 2450. In operation, light that passes through the color sequencer 2455 is reflected by the polarizing beamsplitter 2610 to the reflective liquid crystal display 3600. The reflective liquid crystal display 3600 polarization modulates the light in accordance with the image information and reflects the polarization modulated light back towards the polarizing beamsplitter 3610. The polarizing beamsplitter 3610 passes components of the light reflected from the liquid crystal display 3600 that are orthogonally polarized with respect to the light that was reflected from the polarizing beamsplitter 3610 towards the liquid display 3600. Accordingly, image information is displayed on the screen 2590. The inverter 3565 in combination with the display 3600 provide four states of brightness, two high and two low. The inverter 3565 effectively doubles the brightness of the display 3600 by allowing the negative image frame to be viewed, as previously discussed.

Figure 46:
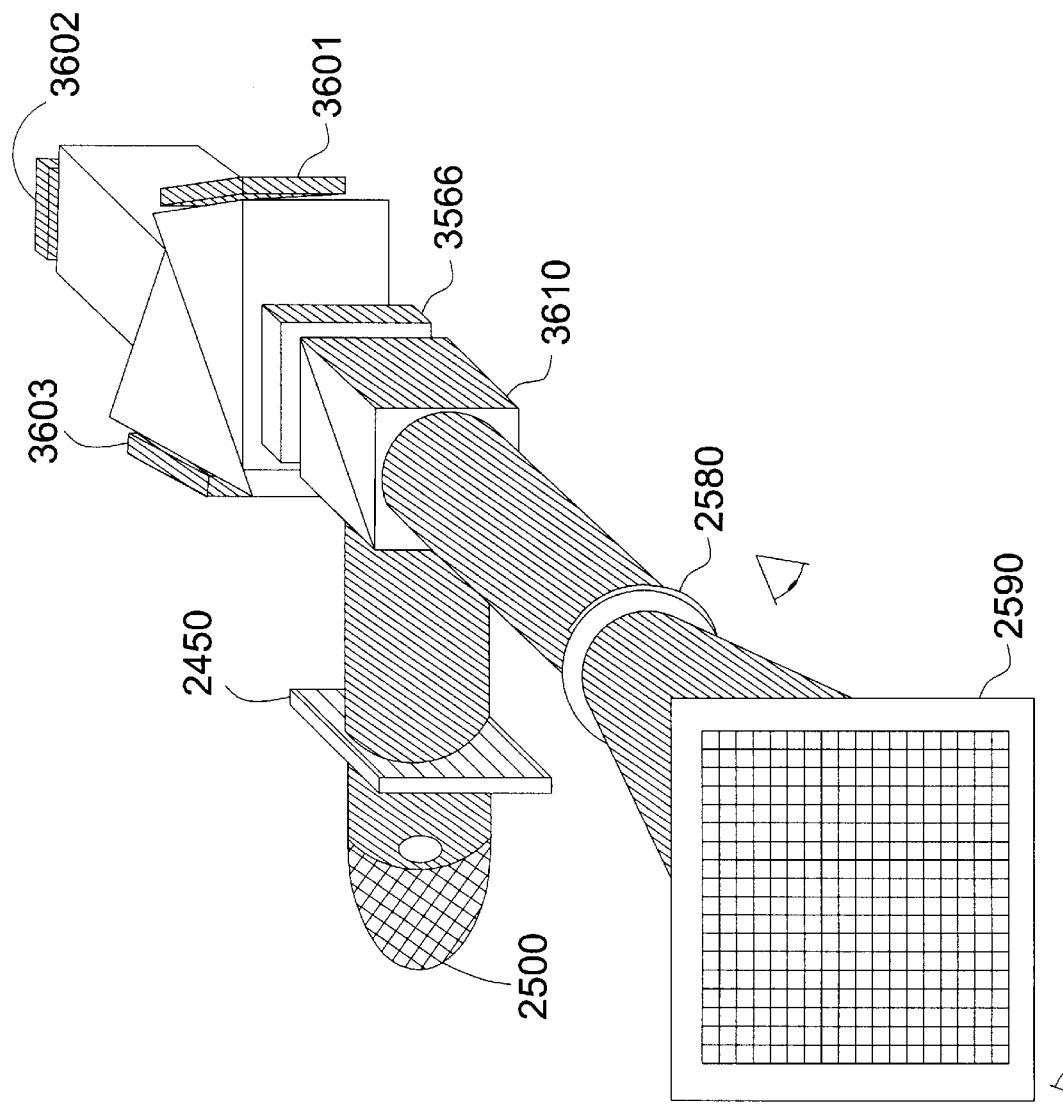

FIG. 46 shows another display using a reflective liquid display and utilizing an achromatic inverter according to the invention. FIG. 46 is similar to the display shown in FIG. 45 except the three reflective liquid displays 3601, 3602, 3603 are utilized. Beamsplitter 3610 divides white light into the primary colors, red, green and blue, which are displayed at displays 3601, 3602, 3603. The inverter 3566 working in combination with the displays 3601, 3602, 3603 provide four states of brightness, two high and two low. The inverter 3566 effectively doubles the brightness of the displays 3601, 3602, 3603 by allowing the negative image frame to be viewed, as previously discussed.

Figure 47:
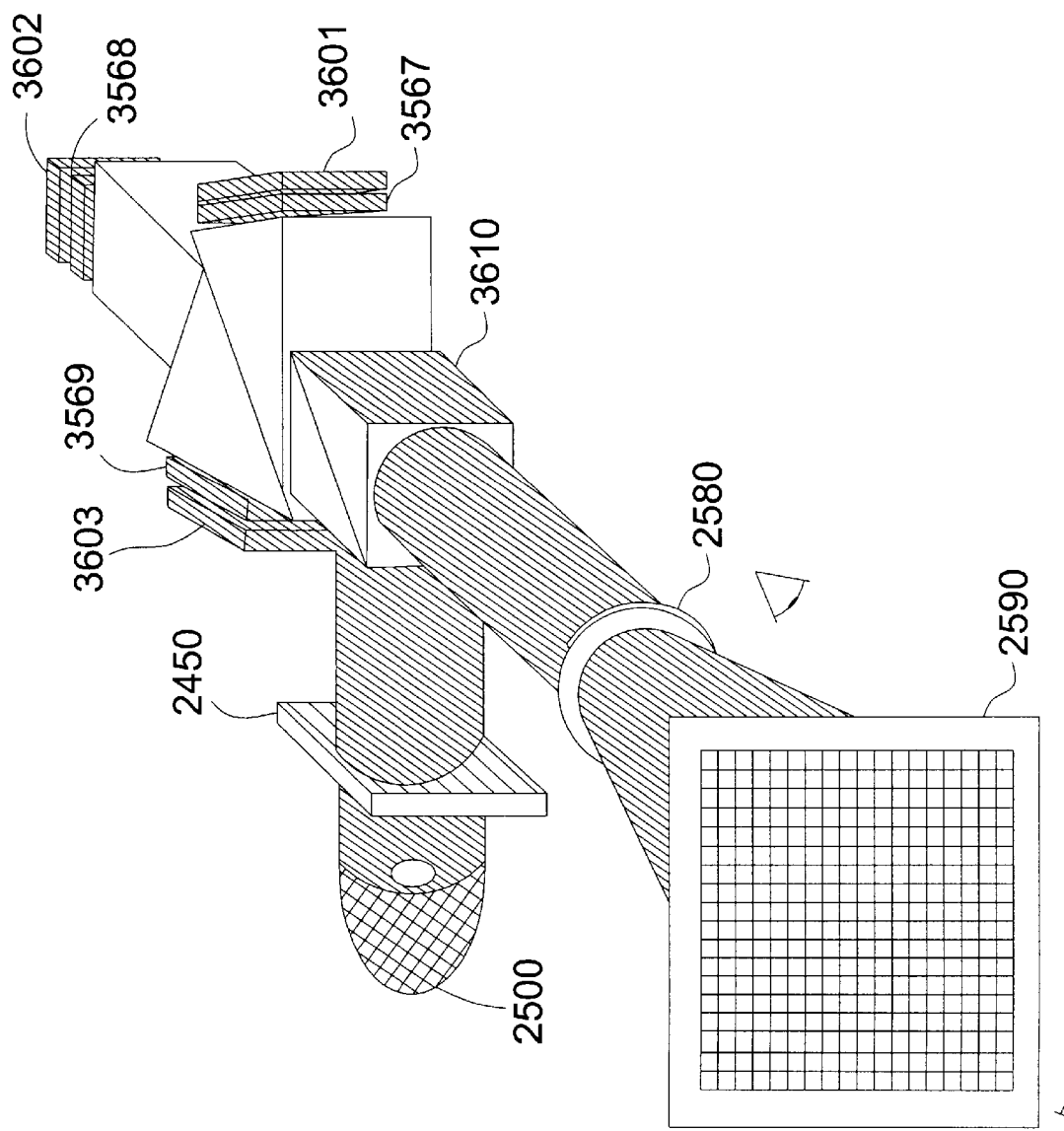

FIG. 47 shows still another display using a reflective liquid display and utilizing achromatic inverter according to the invention. FIG. 47 is similar to the display shown in FIG. 45, with the exception that achromatic inverters 3567, 3568, 3569 is provided for each of the three liquid crystal displays 3601, 3602, 3603. The beamsplitter 3610 divides white light into the primary colors, red, green and blue, which are displayed at displays 3601, 3602, 3603. The inverters 3567, 3568, 3569 work in combination with the respective displays 3601, 3602, 3603 to provide four states of brightness, two high and two low. The inverters 3567, 3568, 3569 effectively double the brightness of their corresponding displays 3601, 3602, 3603 by allowing the negative image frame to be viewed, as previously discussed.

In the displays shown in FIGS. 44 and 45, the digital color sequencer 2455 is position between the light source 2500 and the liquid crystal display (2560 in FIG. 44 and 3600 in FIG. 45). However, the digital color sequencer 2455 can be positioned at other locations in the display system, provided that it effectively controls the illuminating color at the output, i.e., the screen 2590.

By placing the digital color sequencer 2455 between the light source 2500 and the liquid crystal display 2560 or 3600, the image at the screen 2590 is not sensitive to any wave-front distortion caused by the digital color sequencer 2505.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although quartz and mylar may not be structural equivalents in that quartz is a crystalline material, whereas mylar is a polymeric material, in the area of birefringent materials, quartz and mylar may be equivalent structures.

What is claimed is:

1. A display, comprising:
   a polarizer;
   a reflective pixelated ferroelectric liquid crystal panel with a single pass retardance of a quarter-wave, wherein an optic axis orientation of each pixel of the reflective pixelated ferroelectric liquid crystal panel is switchable between a first orientation $+\alpha_2$ and a second orientation $-\alpha_2$; and a ferroelectric liquid crystal retarder, positioned between the polarizer and the reflective pixelated ferroelectric liquid crystal panel, with an optic axis switchable between a first orientation $+\alpha_1$ and a second orientation $-\alpha_1$, and with a single-pass retardance of a half-wave.

2. The display of claim 1, wherein the reflective pixelated ferroelectric liquid crystal panel and the ferroelectric liquid crystal retarder are positioned so that a rubbing direction of the reflective pixelated ferroelectric liquid crystal panel is orthogonal to a rubbing direction of the ferroelectric liquid crystal retarder.

3. The display of claim 1, wherein the polarizer and the ferroelectric liquid crystal retarder are positioned so that a rubbing direction of the ferroelectric liquid crystal retarder is parallel or perpendicular to a polarization direction of input light.

4. The display of claim 1, wherein the reflective pixelated ferroelectric liquid crystal panel and the ferroelectric liquid crystal retarder have respective tilt angles, and wherein the tilt angle of the reflective pixelated ferroelectric liquid crystal panel is approximately twice the tilt angle of the ferroelectric liquid crystal retarder.

5. The display of claim 4, wherein the tilt angle of the reflective pixelated ferroelectric liquid crystal panel is approximately 22.5 degrees and the tilt angle of the ferroelectric liquid crystal retarder is approximately 11.25 degrees.

6. The display of claim 1, wherein the polarizer comprises a linear polarizer.

7. The display of claim 1, wherein the polarizer comprises a polarizing beamsplitter.

8. The display of claim 1, wherein the optic axis orientations of the reflective pixelated ferroelectric liquid crystal panel and the ferroelectric liquid crystal retarder are symmetrically switchable to provide four display states.

9. The display of claim 8, wherein the four display states are two achromatic white states and two high contrast black states.

10. A reflective display, comprising:

a polarizer;

a reflective pixelated ferroelectric liquid crystal panel with a single pass retardance of a quartet-wave, wherein an optic axis orientation of each pixel of the reflective pixelated ferroelectric liquid crystal panel is switchable between first and second orientations; and a first nematic liquid crystal retarder, positioned between the polarizer and the reflective pixelated ferroelectric liquid crystal panel, with a single-pass retardance switchable between approximately zero and approximately a half-wave.

11. The reflective display of claim 10, wherein the first nematic liquid crystal retarder has an optic axis orientation of approximately −67.5 degrees with respect to an orientation of the polarizer.

12. The reflective display of claim 10, wherein the polarizer comprises a linear polarizer.

13. The reflective display of claim 10, wherein the polarizer comprises a polarizing beamsplitter.

14. The reflective display of claim 10, further comprising an in-line compensator positioned between the polarizer and the first nematic liquid crystal retarder.

15. The reflective display of claim 10, wherein the optic axis orientation of the reflective pixelated ferroelectric liquid crystal panel and the single-pass retardance of the first nematic liquid crystal retarder are symmetrically switchable to provide four display states.

16. The reflective display of claim 15, wherein the four display states comprise two on states and two off states.

17. The reflective display of claim 16, wherein the two on states comprise a normal on state and an inverted on state, and the two off states comprise a normal off state and an inverted off state.

18. The reflective display of claim 10, further comprising a second nematic liquid crystal retarder, positioned between the polarizer and the first nematic liquid crystal retarder, with a single-pass retardance switchable between approximately zero and approximately a half-wave, and with an optic axis orientation that is substantially orthogonal to an optic axis orientation of the first nematic liquid crystal retarder.

19. The reflective display of claim 10, further comprising a passive retarder positioned between the first nematic liquid crystal retarder and the reflective pixelated ferroelectric liquid crystal panel.

20. The reflective display of claim 19, wherein the passive retarder has a single-pass retardance of approximately a half-wave.

21. The reflective display of claim 19, wherein an optic axis of the passive retarder is oriented such that two achromatic high reflectivity states and two achromatic low reflectivity states are obtainable by symmetrically switching the optic axis orientation of the reflective pixelated ferroelectric liquid crystal panel and the single-pass retardance of the first nematic liquid crystal retarder.

22. The reflective display of claim 10, wherein the first nematic liquid crystal retarder comprises a pi-cell, and further comprising:

a first passive retarder, positioned between the polarizer and the first nematic liquid crystal retarder, with a single-pass retardance of approximately a quarter-wave; and a second passive retarder, positioned between the first nematic liquid crystal retarder and the reflective pixelated ferroelectric liquid crystal panel, with a single-pass retardance of approximately a quarter-wave.

23. The reflective display of claim 22, wherein an optic axis orientation of the first passive retarder is orthogonal to an optic axis orientation of the second passive retarder.

24. A transmissive display, comprising:

an input polarizer;

an output polarizer;

a transmissive pixelated ferroelectric liquid crystal panel, positioned between the input and output polarizers, with a single-pass retardance of approximately a half-wave, wherein an optic axis orientation of each pixel of the transmissive ferroelectric liquid crystal panel is switchable between a first orientation $+\alpha_2$ and $-\alpha_2$;

a first ferroelectric liquid crystal retarder, positioned between the input polarizer and the transmissive pixelated ferroelectric liquid crystal panel, with an optic axis switchable between a first orientation $+\alpha_1$ and a second orientation $-\alpha_1$, and with a single-pass retardance of approximately a half-wave; and a second ferroelectric liquid crystal retarder, positioned between the transmissive pixelated ferroelectric liquid crystal panel and the output polarizer, with an optic axis switchable between a first orientation $+\alpha_1$ and a second orientation $-\alpha_1$, and with a single-pass retardance of approximately a half-wave.

25. The transmissive display of claim 24, wherein the optic axis orientations of the transmissive pixelated ferroelectric liquid crystal panel and the first and second ferroelectric liquid crystal retarders are symmetrically switchable to provide four display states.

26. The transmissive display of claim 25, wherein the four display states comprise two on states and two off states.

27. The transmissive display of claim 26, wherein the two on states comprise a normal on state and an inverted on state, and the two off states comprise a normal off state and an inverted off state.

28. A display, comprising:
- a pixelated ferroelectric liquid crystal panel with a single pass retardance of either a quarter-wave or a half-wave, wherein an optic axis orientation of each pixel of the pixelated ferroelectric liquid crystal panel is switchable between first and second orientations; and
- at least one ferroelectric or nematic liquid crystal retarder optically coupled to the pixelated ferroelectric liquid crystal panel, wherein an optic axis orientation or a single pass retardance of the at least one ferroelectric or nematic liquid crystal retarder is switchable between first and second orientations or first and second values, respectively.

29. A reflective display, comprising:
- a reflective pixelated ferroelectric liquid crystal panel with a single pass retardance of a quarter-wave, wherein an optic axis orientation of each pixel of the reflective pixelated ferroelectric liquid crystal panel is switchable between first and second orientations; and
- a first ferroelectric or nematic liquid crystal retarder optically coupled to the reflective pixelated ferroelectric liquid crystal panel, wherein an optic axis orientation or a single pass retardance of the at least one ferroelectric or nematic liquid crystal retarder is switchable between first and second orientations or first and second values, respectively.

* * * * *